(12) United States Patent
Finnan et al.

(10) Patent No.: US 12,395,485 B2
(45) Date of Patent: Aug. 19, 2025

(54) FRAUD RESISTANT PASSCODE ENTRY SYSTEM

(71) Applicant: ARCANUM TECHNOLOGY LLC, Athens, GA (US)

(72) Inventors: Brian G. Finnan, Athens, GA (US); Frank Patrick Brice, Tallahassee, FL (US); William Brooks Brown, Cornelia, GA (US)

(73) Assignee: ARCANUM TECHNOLOGY LLC

( * ) Notice: Subject to any disclaimer, the term of this patent is extended or adjusted under 35 U.S.C. 154(b) by 290 days.

(21) Appl. No.: 17/792,357

(22) PCT Filed: Jan. 14, 2021

(86) PCT No.: PCT/US2021/013466
§ 371 (c)(1),
(2) Date: Jul. 12, 2022

(87) PCT Pub. No.: WO2021/146444
PCT Pub. Date: Jul. 22, 2021

(65) Prior Publication Data
US 2023/0057862 A1    Feb. 23, 2023

Related U.S. Application Data

(60) Provisional application No. 62/961,480, filed on Jan. 15, 2020.

(51) Int. Cl.
*H04W 12/02* (2009.01)
*H04L 9/40* (2022.01)
(Continued)

(52) U.S. Cl.
CPC ......... *H04L 63/0838* (2013.01); *H04W 12/00* (2013.01); *H04W 12/02* (2013.01);
(Continued)

(58) Field of Classification Search
CPC ........ G06F 3/013; G06F 21/32; G06F 1/1673; H04W 12/065; H04W 12/06;
(Continued)

(56) References Cited

U.S. PATENT DOCUMENTS 6,720,860 B1    4/2004 Narayanaswami
8,520,848 B1    8/2013 Liu et al.
(Continued)

FOREIGN PATENT DOCUMENTS

EP    3 136 275 A1    3/2017

OTHER PUBLICATIONS

International Search Report and Written Opinion of the International Searching Authority for International Patent Application No. PCT/US2021/013466 mailed Apr. 6, 2021, 13 pages.

*Primary Examiner* — Jung W Kim
*Assistant Examiner* — Howard H. Louie
(74) *Attorney, Agent, or Firm* — Merchent & Gould P.C.

(57) ABSTRACT

A method for user passcode authentication is provided. The method includes accessing a user information database with predefined user input option parameters and generating a random arrangement of input options from the predefined user input option parameters. The method includes manifesting the random arrangement of input options on an interactive display interface and receiving a selection of the interactive display interface input options. The method also includes comparing the received selection of interactive display interface options to the predefined user input option parameters.

20 Claims, 45 Drawing Sheets

(51) Int. Cl.
*H04W 12/00* (2021.01)
*H04W 12/06* (2021.01)
*G06F 1/16* (2006.01)

(52) U.S. Cl.
CPC ......... *H04W 12/06* (2013.01); *H04W 12/068* (2021.01); *G06F 1/1673* (2013.01); *H04L 2463/082* (2013.01)

(58) Field of Classification Search
CPC ... H04W 12/068; H04W 12/00; H04W 12/02; H04L 63/0838; H04L 2463/082
See application file for complete search history.

(56) References Cited

U.S. PATENT DOCUMENTS

| | | | | |
|---|---|---|---|---|
| 2005/0010759 | A1* | 1/2005 | Wakiyama | H04L 63/08 713/160 |
| 2011/0191591 | A1* | 8/2011 | Cheng | G06Q 30/02 713/182 |
| 2013/0291096 | A1* | 10/2013 | Finnan | G06F 21/36 726/19 |
| 2014/0157382 | A1* | 6/2014 | Ford | H04W 12/128 726/7 |
| 2014/0181683 | A1* | 6/2014 | Lim | H04L 63/108 715/740 |
| 2014/0250490 | A1* | 9/2014 | Baca | H04L 63/0263 726/1 |
| 2020/0036749 | A1* | 1/2020 | Ferres | G06F 16/95 |

\* cited by examiner

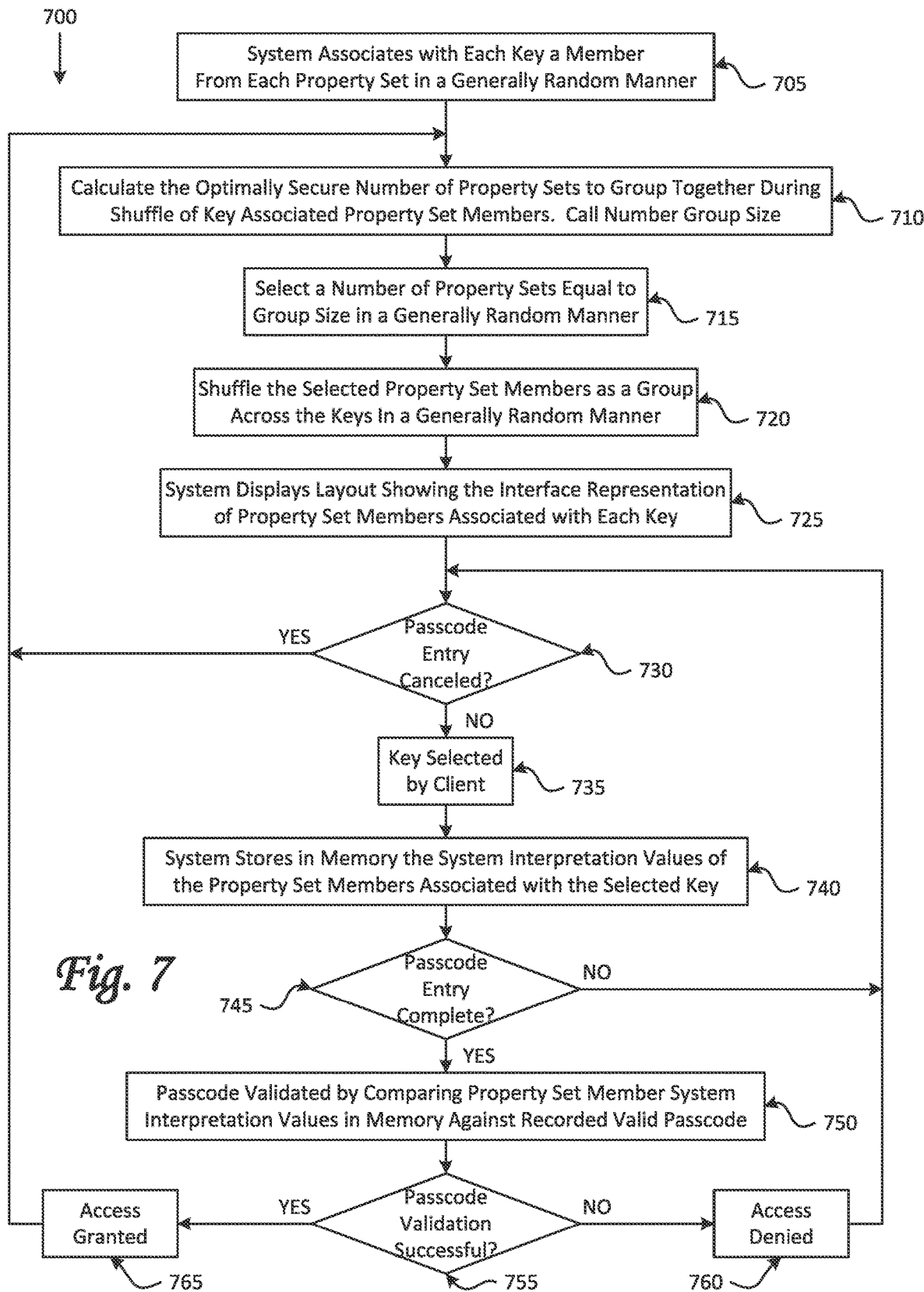

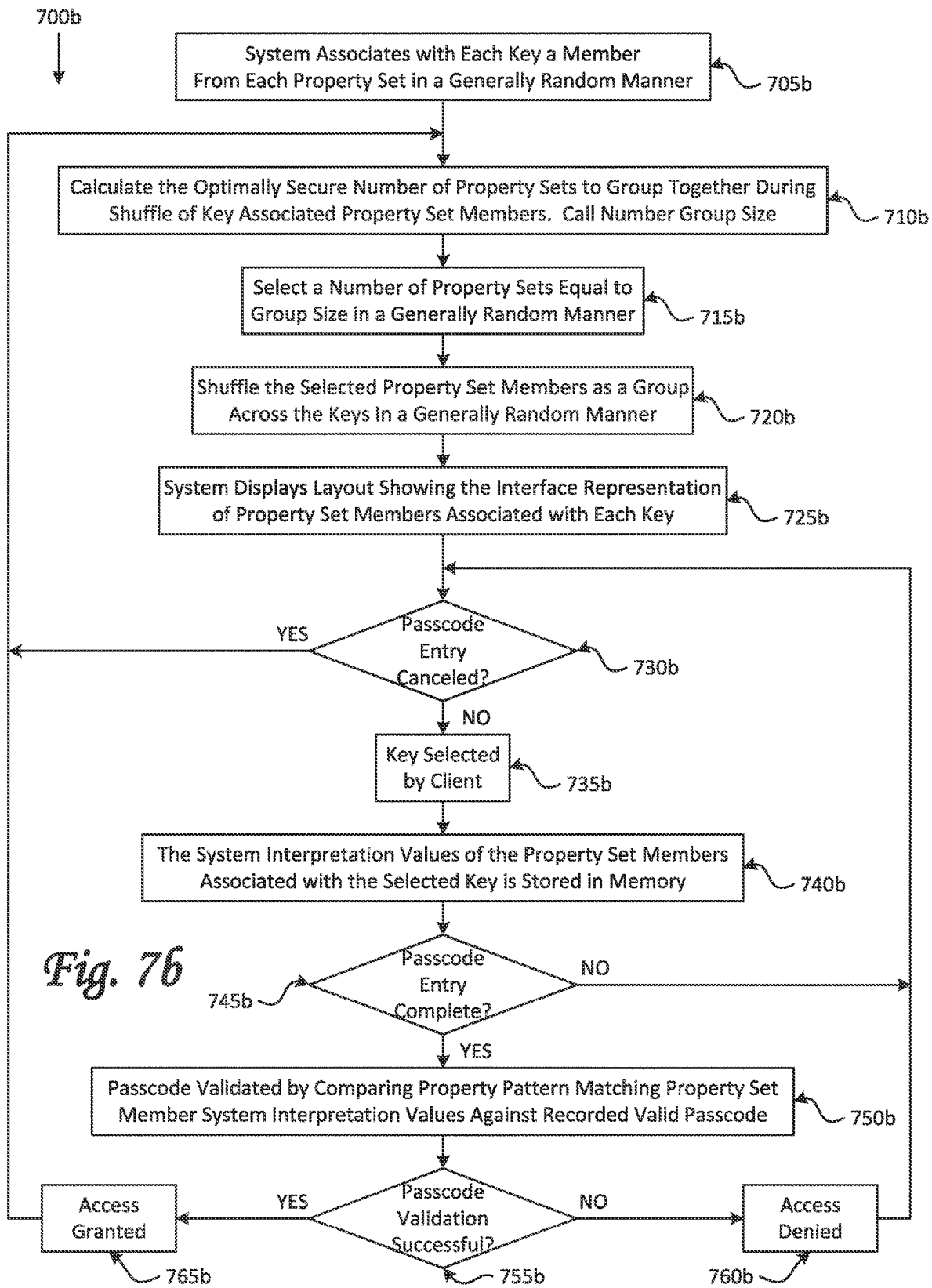

| Set Name | Set Identifier (Decimal) | Set Size | Set Member Size (bytes) | Set Members | | | | | | | | | |
|---|---|---|---|---|---|---|---|---|---|---|---|---|---|
| | | | | Member Name / Property Interface Representation / System Interpretation Value in Hexadecimal (Decimal) | | | | | | | | | |
| | | | | Triangle | Square | Pentagon | Hexagon | Circle | Heart | Club | Diamond | Spade | Star |
| Shape | 1 | 10 | 1 | ▲ A (10) | ■ B (11) | ⬟ C (12) | ⬢ D (13) | ● E (14) | ♥ F (15) | ♣ 10 (16) | ♦ 11 (17) | ♠ 12 (18) | ★ 13 (19) |
| | | | | One | Two | Three | Four | Five | Six | Seven | Eight | Nine | Zero |
| Number | 2 | 10 | 1 | 1 / 14 (20) | 2 / 15 (21) | 3 / 16 (22) | 4 / 17 (23) | 5 / 18 (24) | 6 / 19 (25) | 7 / 1A (26) | 8 / 1B (27) | 9 / 1C (28) | 0 / 1D (29) |
| | | | | Latin A | Latin B | Latin C | Latin D | Latin E | Latin F | Latin G | Latin H | At | Exclamation |
| Alpha A | 3 | 10 | 1 | A / 1E (30) | B / 1F (31) | C / 20 (32) | D / 21 (33) | E / 22 (34) | F / 23 (35) | G / 24 (36) | H / 25 (37) | @ / 26 (38) | ! / 27 (39) |
| | | | | Latin I | Latin J | Latin K | Latin L | Latin M | Latin N | Latin O | Latin P | Latin Q | Dollar |
| Alpha I | 4 | 10 | 1 | I / 28 (40) | J / 29 (41) | K / 2A (42) | L / 2B (43) | M / 2C (44) | N / 2D (45) | O / 2E (46) | P / 2F (47) | Q / 30 (48) | $ / 31 (49) |
| | | | | Latin R | Latin S | Latin T | Latin U | Latin V | Latin W | Latin X | Latin Y | Latin Z | Ampersand |
| Alpha R | 5 | 10 | 1 | R / 32 (50) | S / 33 (51) | T / 34 (52) | U / 35 (53) | V / 36 (54) | W / 37 (55) | X / 38 (56) | Y / 39 (57) | Z / 3A (58) | & / 3B (59) |
| | | | | Yellow | Green | Blue | Orange | Black | Purple | Brown | Grey | Red | White |
| Color | 6 | 10 | 1 | 3C (60) | 3D (61) | 3E (62) | 3F (63) | 40 (64) | 41 (65) | 42 (66) | 43 (67) | 44 (68) | 45 (69) |
| | | | | 0,0 | 0,1 | 0,2 | 1,0 | 1,1 | 1,2 | 2,0 | 2,1 | 2,2 | 3,1 |
| Position | 7 | 10 | 1 | 46 (70) | 47 (71) | 48 (72) | 49 (73) | 4A (74) | 4B (75) | 4C (76) | 4D (77) | 4E (78) | 4F (79) |

| Set Name | Set Identifier (Decimal) | Set Size | Set Member Size (bytes) | Set Members |||||||||||
|---|---|---|---|---|---|---|---|---|---|---|---|---|---|
| | | | | Member Name / Property Interface Representation / System Interpretation Value in Hexadecimal (Decimal) ||||||||||
| Shape | 4 | 10 | 1 | Triangle ▲ 28 (40) | Square ■ 29 (41) | Pentagon ⬟ 2A (42) | Hexagon ⬢ 2B (43) | Circle ● 2C (44) | Heart ♥ 2D (45) | Club ♣ 2E (46) | Diamond ♦ 2F (47) | Spade ♠ 30 (48) | Star ★ 31 (49) |
| Number | 5 | 10 | 1 | One 1 32 (50) | Two 2 33 (51) | Three 3 34 (52) | Four 4 35 (53) | Five 5 36 (54) | Six 6 37 (55) | Seven 7 38 (56) | Eight 8 39 (57) | Nine 9 3A (58) | Zero 0 3B (59) |
| Alpha A | 6 | 10 | 1 | Latin A A 3C (60) | Latin B B 3D (61) | Latin C C 3E (62) | Latin D D 3F (63) | Latin E E 40 (64) | Latin F F 41 (65) | Latin G G 42 (66) | Latin H H 43 (67) | At @ 44 (68) | Exclamation ! 45 (69) |
| Alpha I | 7 | 10 | 1 | Latin I I 46 (70) | Latin J J 47 (71) | Latin K K 48 (72) | Latin L L 49 (73) | Latin M M 4A (74) | Latin N N 4B (75) | Latin O O 4C (76) | Latin P P 4D (77) | Latin Q Q 4E (78) | Dollar $ 4F (79) |
| Alpha R | 8 | 10 | 1 | Latin R R 50 (80) | Latin S S 51 (81) | Latin T T 52 (82) | Latin U U 53 (83) | Latin V V 54 (84) | Latin W W 55 (85) | Latin X X 56 (86) | Latin Y Y 57 (87) | Latin Z Z 58 (88) | Ampersand & 59 (89) |
| Color | 10 | 10 | 1 | Yellow 64 (100) | Green 65 (101) | Blue 66 (102) | Orange 67 (103) | Black 68 (104) | Purple 69 (105) | Brown 6A (106) | Grey 6B (107) | Red 6C (108) | White 6D (109) |
| Position | 11 | 10 | 1 | 0,0 ⠿ 6E (110) | 0,1 ⠿ 6F (111) | 0,2 ⠿ 70 (112) | 1,0 ⠿ 71 (113) | 1,1 ⠿ 72 (114) | 1,2 ⠿ 73 (115) | 2,0 ⠿ 74 (116) | 2,1 ⠿ 75 (117) | 2,2 ⠿ 76 (118) | 3,1 ⠿ 77 (119) |

|     | 0 | 1 | 2 | 3 | 4 | 5 | 6 | 7 | 8 | 9 |
|-----|---|---|---|---|---|---|---|---|---|---|
|  30 |   |   | Space | ! | " | # | $ | % | & | ' |
|  40 | ( | ) | * | + | , | - | . | / | 0 | 1 |
|  50 | 2 | 3 | 4 | 5 | 6 | 7 | 8 | 9 | : | ; |
|  60 | < | = | > | ? | @ | A | B | C | D | E |
|  70 | F | G | H | I | J | K | L | M | N | O |
|  80 | P | Q | R | S | T | U | V | W | X | Y |
|  90 | Z | [ | \ | ] | ^ | _ | ` | a | b | c |
| 100 | d | e | f | g | h | i | j | k | l | m |
| 110 | n | o | p | q | r | s | t | u | v | w |
| 120 | x | y | z | { | \| | } | ~ |   |   |   |

FRAUD RESISTANT PASSCODE ENTRY SYSTEM

This application is a National Stage Application of PCT/US2021/013466, filed Jan. 14, 2021, which claims the benefit of and priority to U.S. Provisional patent application Ser. No. 62/961,480, filed Jan. 15, 2020, the entire disclosures of which are incorporated by reference in their entireties. To the extent appropriate, a claim of priority is made to each of the above disclosed applications.

BACKGROUND

Over the past few decades, the value of data and systems relying upon vast amounts of accumulated data has skyrocketed. As a result, data and systems are under attack as never before, and the security surrounding data access, transmission, and storage is more important than ever. Widely used methods for securing transmitted and stored data are robust, but authentication to access systems and data has been a continuous struggle and has become one of the weakest links in any secured environment.

BRIEF DESCRIPTION OF THE DRAWINGS

The present invention may take form in various components and arrangements of components, and/or in various steps and arrangements of steps. The drawings are only for purposes of illustrating preferred embodiments and are not to be construed as limiting the invention.

FIG. 7 illustrates an example flow diagram for an entry and verification of a passcode.

FIG. 7b illustrates an alternative flow diagram showing the entry and verification of a passcode.

FIG. 14b illustrates the remainder of the flow diagram example of the property dispersion algorithm started in FIG. 14a.

FIG. 22 illustrates an example of property sets configured to be utilized in a passcode system.

FIG. 31 illustrates an example of property sets configured to be utilized in a passcode system.

FIG. 32 illustrates an example ASCII chart for printable alphanumeric characters.

DETAILED DESCRIPTION

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

The following is intended to provide a detailed description of examples of the invention and should not be taken to be limiting of the invention itself. Rather, any number of variations may fall within the scope of the invention, which is defined in the claims following the description.

Figure 1:
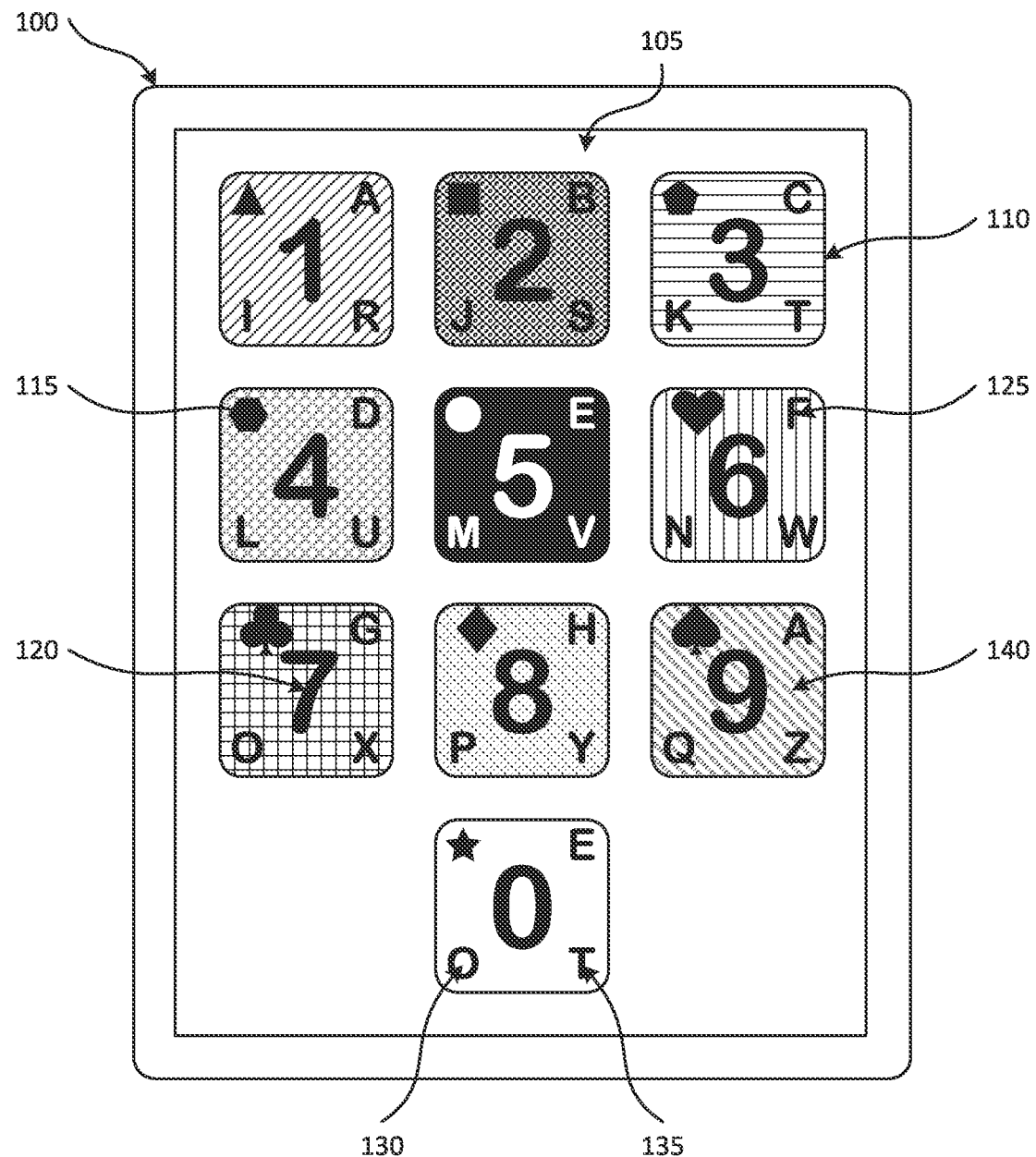
FIG. 1 illustrates an example virtual key arrangement.

FIG. 1 illustrates an example virtual key arrangement for passcode entry. The example depicts a display device 100 having the capabilities to manifest an arrangement of virtual keys 110, in this case via a graphical interface 105. Display device 100 may be any computer, system, or attached peripheral capable of dynamically altering its interface and presenting to users of the system different interface configurations through which the users may provide a passcode. Examples of display device 100 may include, but are not limited to handheld devices used during data collection, cellular phones and smart devices, ATM machines, personal computers, credit/debit systems used at gas pumps and checkout lines, physical security access terminals, etc. Each virtual keys 110 is shown to be associated with six property sets, however, any number of property sets may be employed. The property sets used in virtual key 110 are: shape 115, number 120, Latin characters A through H 125, Latin characters I through Q 130, Latin characters R through Z 135, and color 140 (represented as a pattern). The property sets can include groups of any properties allowing virtual key 110 to be distinguishable from another within the capabilities of display device 100. Each property set includes a plurality of distinguishable properties, which may be less than or equal to the number of virtual keys 110 utilized by interface 105. Each property is defined as a combination of interface 105 representation, which is manifested via display device 100, and an interpretation value, which is used in identification of the property by a system.

In example embodiments, a property may be associated with more than one virtual key. For example, the virtual keys associated with the number properties "1" and "9" in FIG. 1 share an association to the Latin character property "A". Also, the virtual key associated with the number property "0" shares an association to the Latin character properties "E", "O", and "T" with a number of other virtual keys. In this particular embodiment, these four properties are repeated because they are the most commonly used letters in the English language. To prevent confusion by users, any shared property interface representation may also share a same interpretation value.

Figure 10:
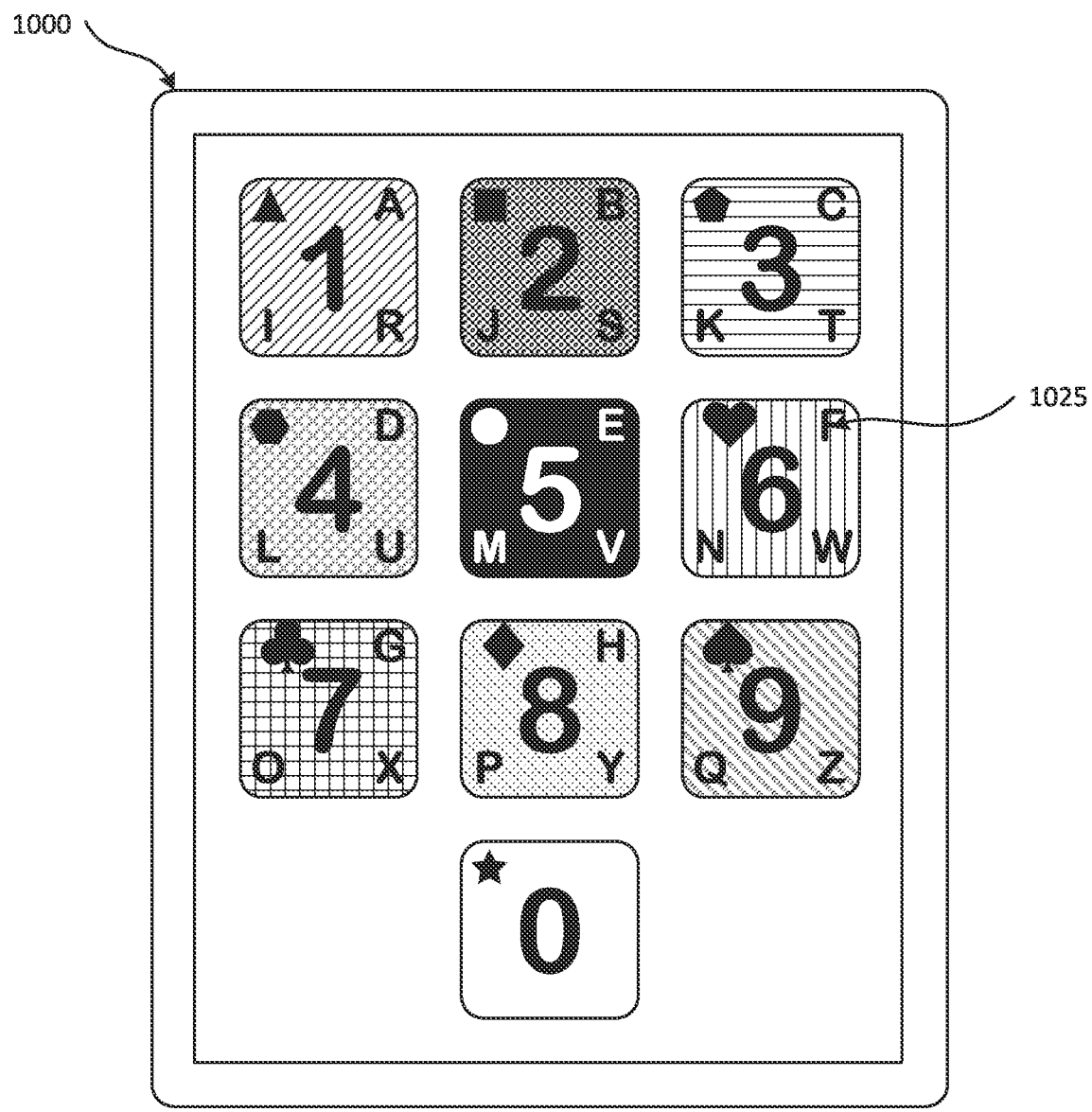
FIG. 10 illustrates a third alternative exemplary embodiment of a virtual key arrangement.

In examples embodiments, a property set may contain fewer properties than the number of virtual keys utilized by interface configuration 1000, as is demonstrated in FIG. 10. As shown in FIG. 10, the upper right corner of the virtual key associated with the number property "9" does not show a property where the property set of Latin characters A through H 1025 would otherwise be located. Also, the virtual key associated with the number property "0" is not associated with any of the three Latin character property sets. Upon shuffling the associated properties among the virtual keys, these empty property values are treated in an identical manner as they are contained an interface representation. However, when a virtual key is chosen during passcode entry, any missing properties are omitted from the recorded selection.

When passcode entry is used, the properties associated with the virtual keys are shuffled as depicted by a method 700 of FIG. 7. This process begins with the arrangement depicted in FIG. 1 and can result in the arrangement depicted in FIG. 4. At block 705 of method 700, a member from each property set is associated with each virtual key in a generally random manner, for which an example is depicted in a method 1100 of FIG. 11, resulting in the arrangement depicted in FIG. 1. Then, at block 710 of method 700, an optimally secure number of property sets to group together is calculated. In an example embodiment, the number of property sets to group together is a whole number equal to half of the number of property sets. Many system factors may require alterations to this calculation dependent upon each specific implementation. In the case of this example having six property sets, the calculated number is three. At block 715 of method 700, a number of property sets equal to the previously-calculated values are selected in a generally random manner for which an example is depicted in a method 1200 of FIG. 12. The property sets number 120 and 420, Latin characters R through Z 135 and 435, and color 140 and 430 are selected in the present example. Then, at block 720 of method 700, the properties within the selected property sets are re-associated collectively as a group across the multiple virtual keys in a random manner for which an example is depicted in a method 1300 of FIG. 13. Finally, at block 725 of method 700, display device 100 manifests the updated interface shown in FIG. 4.

Figure 4:
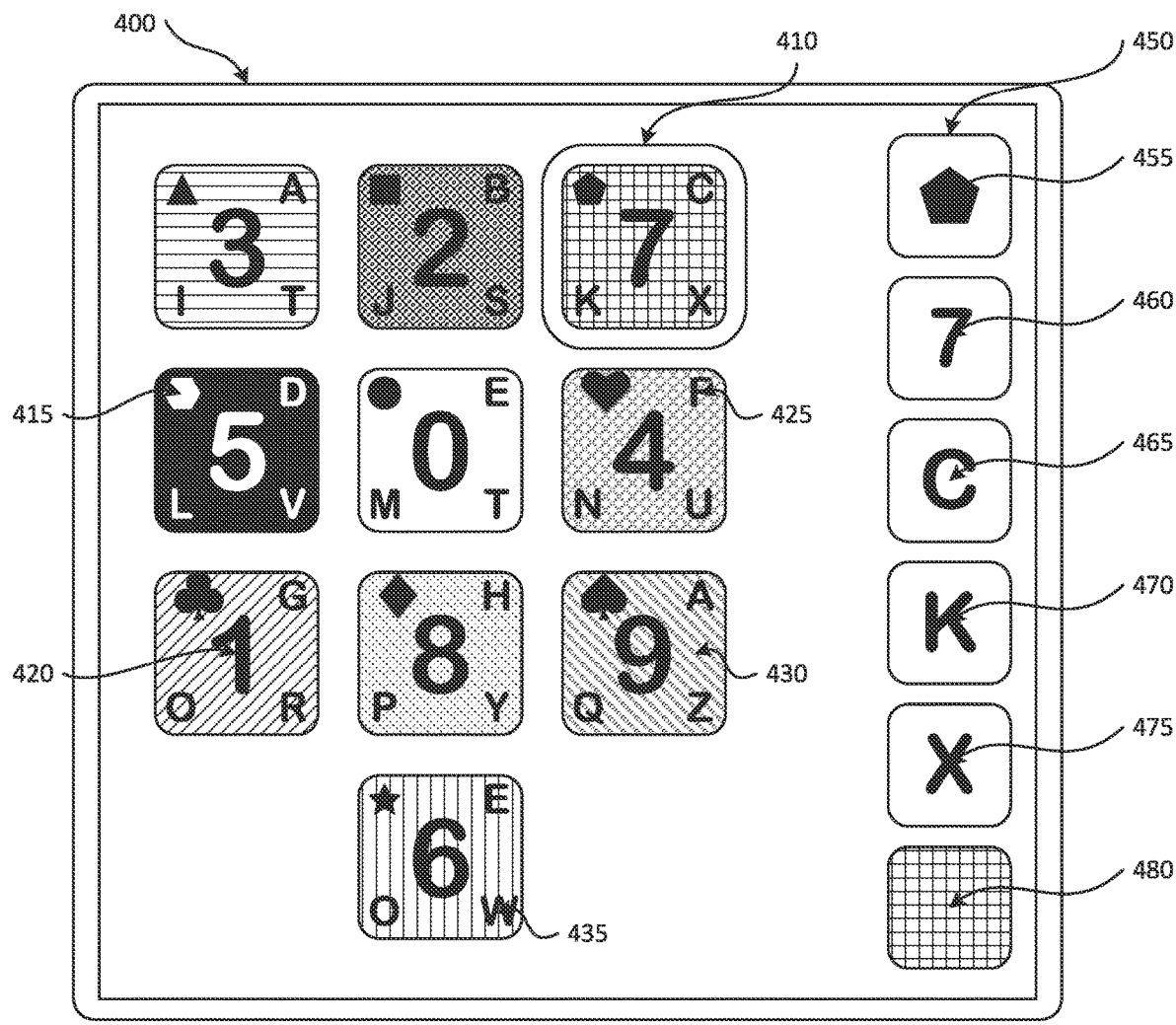
FIG. 4 illustrates a second example of a virtual key arrangement.
Figure 8:
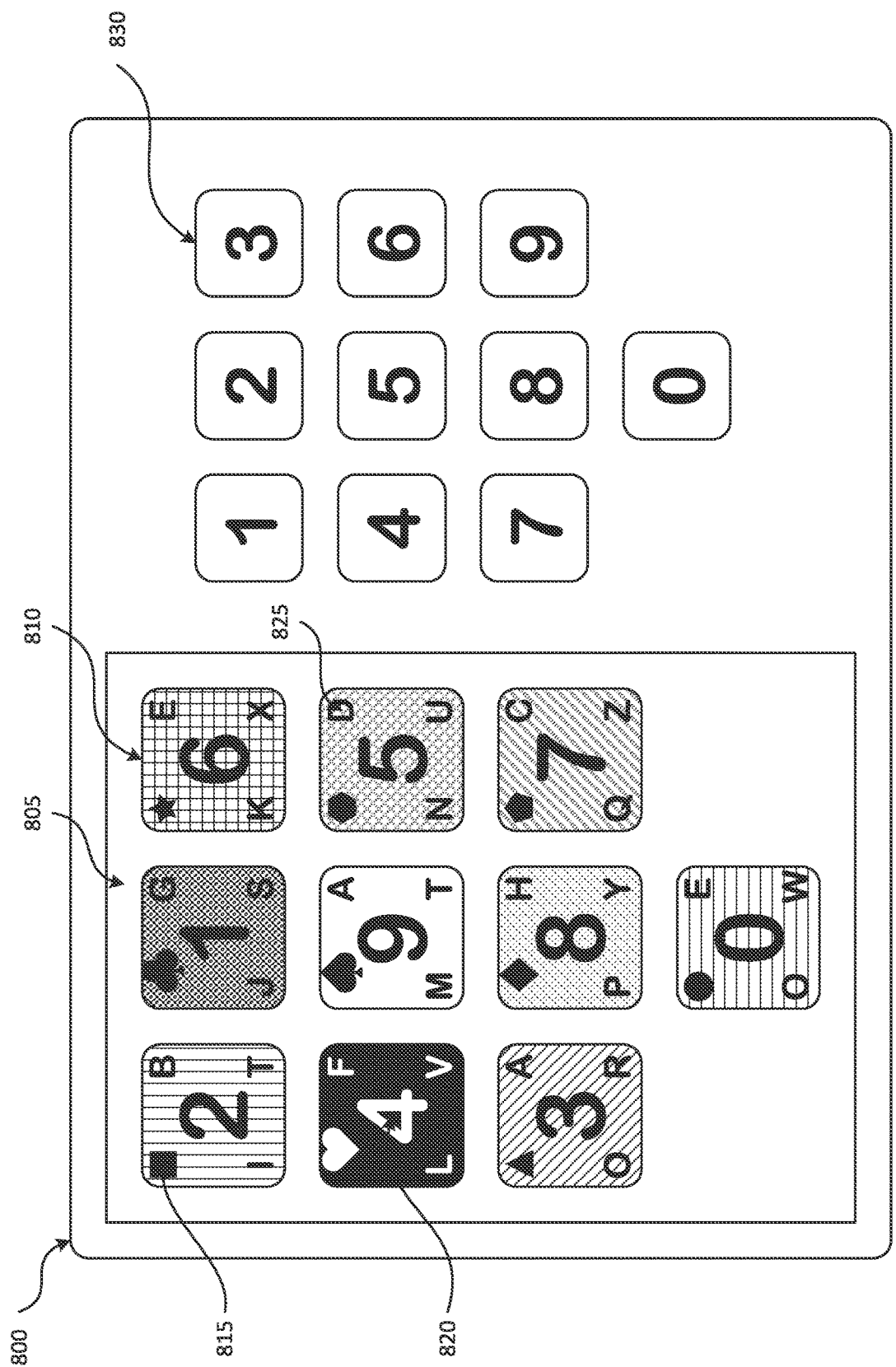
FIG. 8 illustrates a first alternative example of a virtual key arrangement.

The arrangement depicted in FIG. 8 depicts the results of this process having been executed once again using the arrangement depicted in FIG. 4 as the starting point. In the case of the arrangement depicted in FIG. 8, the randomly selected property sets are shape 815, number 820, and Latin characters A through H 825.

A passcode entry method 700 is also described in FIG. 7. At any point during passcode entry, a user can, at block 730, choose to cancel the process, thereby clearing any previously selected properties and beginning the process anew. At block 735, upon the selection of one of the virtual keys by a user, it is not obvious to an observer which of the properties is being chosen, as it may be any one of the plurality of properties associated with the selected virtual key. At this time, at block 740, the system records or stores all of the interpretation values of the properties associated with the selected virtual key for the present position in the passcode. Blocks 735 and 740 are repeated until passcode entry is complete at block 745, at which time the system performs a comparison, at block 750, between a valid passcode which was previously created, and the passcode provided by the user. This comparison determines, at block 755, if the entered passcode mates with a stored valid password. If the entered passcode does not match the valid passcode, then at block 760, access to the system is denied. If the comparison is successful, then at block 765, any access which the system is designed to grant is provided to the user.

In accordance with example embodiments, each device utilized by a user may be identified through a digital fingerprinting procedure, and a separate interface arrangement is maintained by the system for each device. Digital fingerprinting is not intended to uniquely identify or track devices globally, but rather to provide a reasonable sense of device recognition specifically within the devices utilized by a given user and has become common practice to help systems recognize devices previously used by system users for various reasons. An example benefit of maintaining separate interface arrangements for each device becomes apparent when considering multiple device scenarios. In such a scenario, if the same interface arrangement were used and only one of the multiple devices were to be compromised by malware, then if the user were to authenticate once from the compromised device, then multiple times from other devices, the interface arrangement would change numerous times, as depicted from FIG. 1 to FIG. 4 to FIG. 8. The problem arises when, after multiple authentications from other devices, the user again authenticates from the compromised device, the interface arrangement may have changed enough across the numerous authentications that the user's passcode may be able to be determined by comparing the entries from the compromised device, alone. Because the compromise of multiple devices utilized by a specific user is necessarily much more difficult to accomplish than that of a single device, the vast majority of password compromises occur through a single compromised device. By maintaining separate interface arrangements for each device, the security of the user's passcode is also optimized for each device.

Due to the use of all property interpretation values associated with selected virtual keys during passcode entry, if an implementation requires transmission of the entered passcode data between the passcode entry interface and a server for validation, interception of the data will not compromise the passcode. In the same manner that the association of a plurality of properties to each virtual key prevents passcode disclosure in the event of passcode entry observation, the collection of transmitted data having a plurality of property interpretation values representing each position within the passcode also prevents disclosure.

Additionally, the disparate nature of the interface representation from interpretation value for a property provides further protection from passcode disclosure if transmitted data is intercepted. The capture of property interpretation values does not provide any indication as to the interface representations utilized by the system in association with the values, essentially rendering the collected data meaningless.

Furthermore, the techniques disclosed herein are not restricted to the character value space limitations inherent in traditional text-based password systems. In traditional systems this limitation occurs because each available character has a fixed value used by the system. For example, the validated values associated with a numeric PIN must all originate from a fixed ten value set, and likewise, a typical alphanumeric password consisting of a subset of the ninety-five printable ASCII characters must necessarily originate from a fixed set of ninety-five fixed values. The security of traditional encrypted stored passwords is based on the difficulty to break the encryption to reveal the actual password, and the difficulty of this breaking process is in turn limited by the number of possible values which could potentially comprise the password. Due to the independence of property visual representations from system interpretation values in the present invention, each number in a PIN known to a user can be interpreted by the system to be one of any value in any range of possibilities. One exemplary embodiment may use a byte of data to assign the interpretation value for each property, thereby allowing ten properties visually represented by numeric digits to be interpreted by the system to each be one of two-hundred-fifty-six possible values, a great improvement over the ten possible value limitation of traditional systems.

An alternative approach can be employed to validate passcodes which provides further security than methods described previously. This method leverages globally unique identifiers (GUIDs) to create a method of passing an entered passcode from the interface to a server for validation, thus eliminating the transmission of any information which could be used to gain information about the passcode. GUIDs are currently used for numerous purposes in software and database applications to ensure that values are unique both within and without a system in the present as well as in the future.

Figure 34:
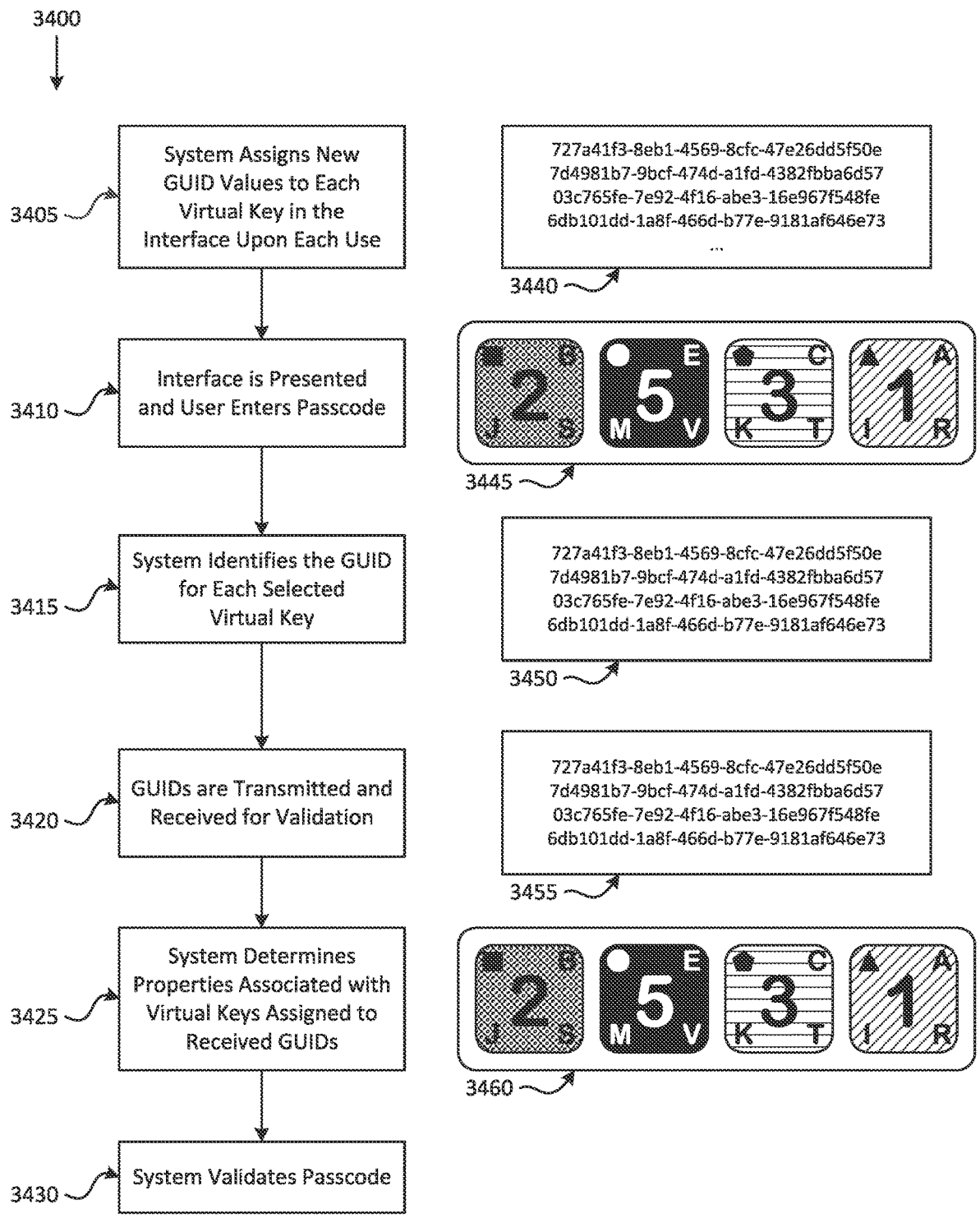
FIG. 34 illustrates a method for assigning globally unique identifiers to passcode interface virtual keys.

A diagram showing a method 3400 such an embodiment might use utilizing GUIDs is depicted in FIG. 34. At block 3405 of method 3400, a GUID, shown as 3440, is assigned by the server to each virtual key. The server then passes to the interface the GUIDs along with the interface representations, shown as 3445, for each key to the interface to be presented to the user for passcode entry, at block 3410. The GUIDs and the interface representations may be sent as separate transmissions if desired. The interface then identifies the GU ID assigned to each of the virtual keys selected, shown as 3450, during passcode entry, at block 3415, and transmits only the GUIDs, shown as 3455, back to the server for validation, at block 3420. The server then, at block 3425, identifies the properties, shown as 3460, associated to each of the virtual keys matching the transmitted GUIDs and validates, at block 3430, the passcode through methods previously described.

FIG. 34 can also represent an embodiment in which the property values rather than the interface representations for each key are transmitted to the passcode entry interface. Once the property values are received, the interface is presented, and passcode entry progresses as previously described.

Figure 9:
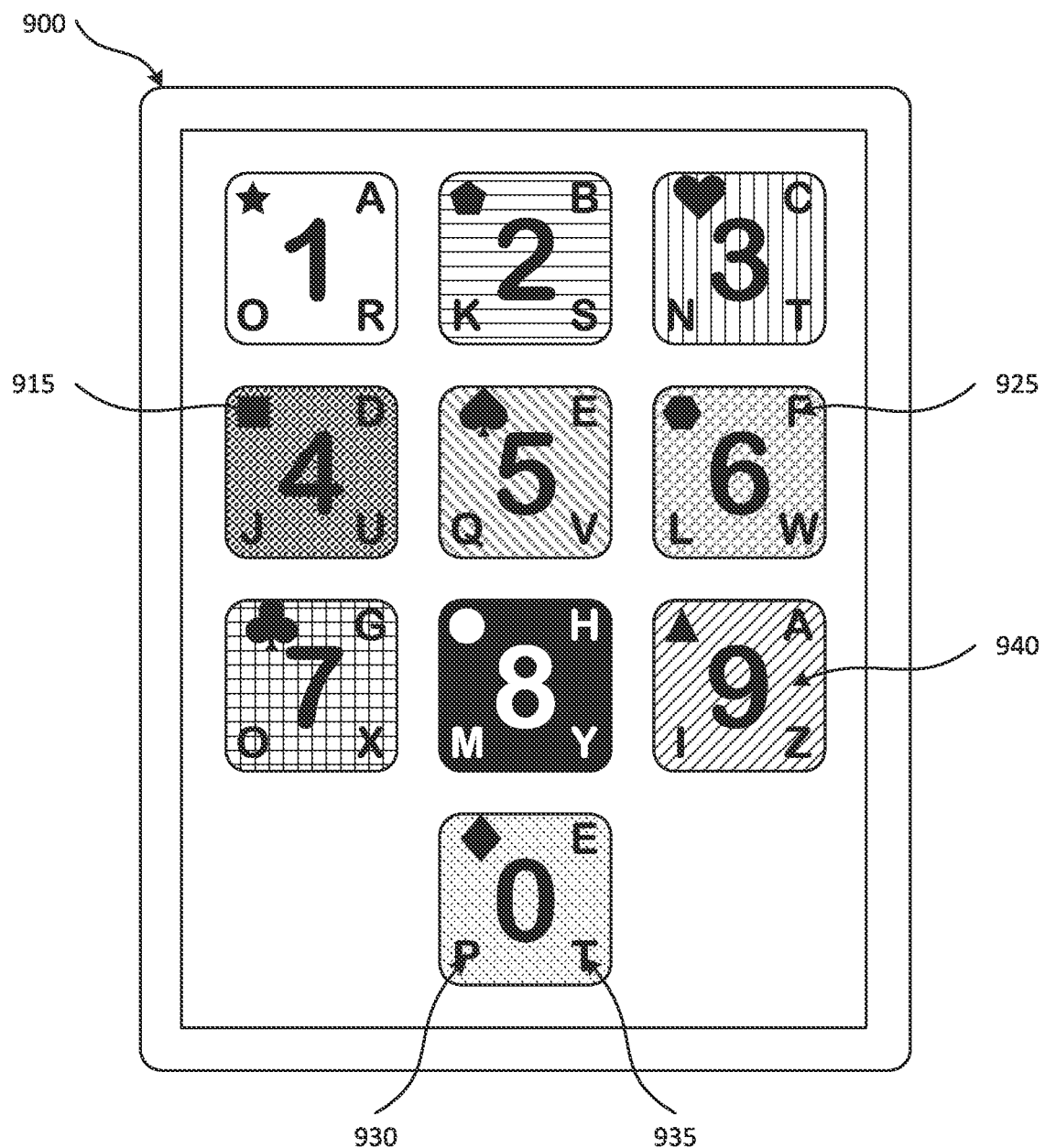
FIG. 9 illustrates a second alternative example of a virtual key arrangement.

Another exemplary embodiment allows an interface 900 shown in FIG. 9 in which one of the property sets is static, in which case the property set is excluded from the random selection of property sets to re-associate. FIG. 9 shows an example of such an embodiment following the shuffling process beginning with the arrangement depicted in FIG. 1. The chosen properties to shuffle are shape 115 and 915, Latin characters I through Q 130 and 930, and color 140 and 940.

Figure 11:
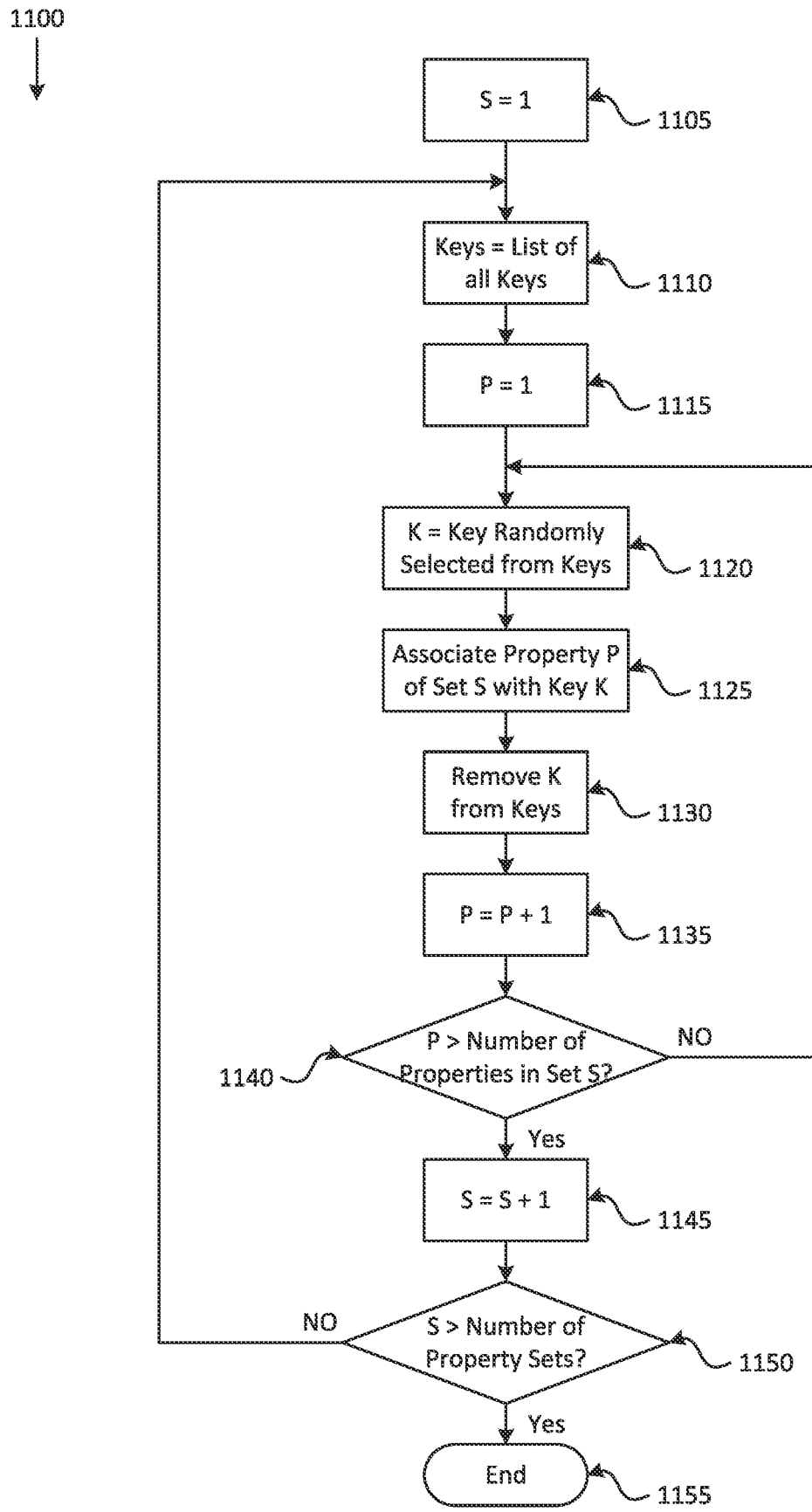
FIG. 11 illustrates a flow diagram as an example for associating properties to virtual keys.

FIG. 11 depicts the results of this shuffling process having been executed once again using the arrangement depicted in FIG. 9 as the starting point. In the case of FIG. 11, the randomly selected property sets are Latin characters A through H 925 and 1125, Latin characters I through Q 930 and 1130, and Latin characters R through Z 935 and 1135.

Figure 2:
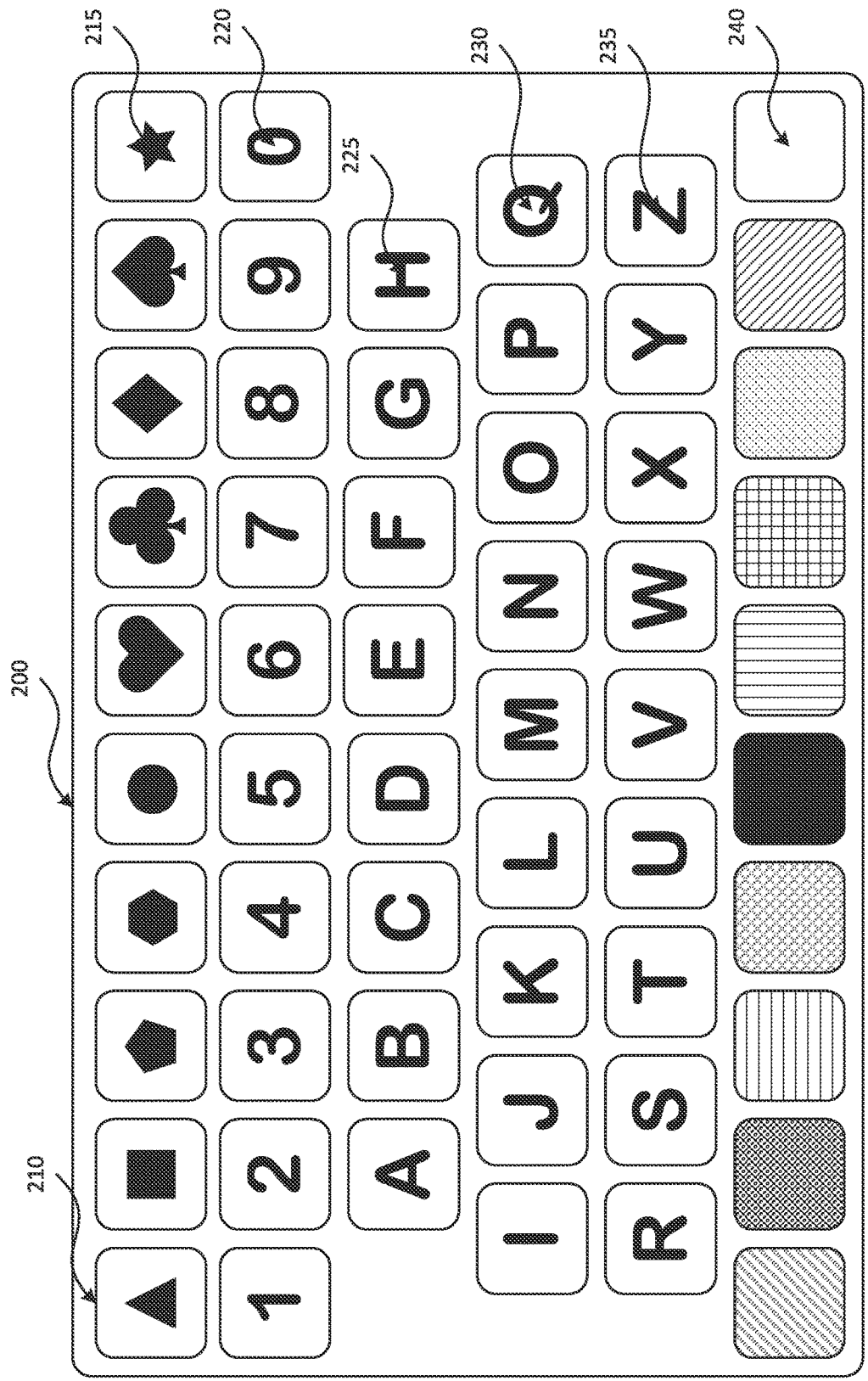
FIG. 2 illustrates an example physical or virtual key arrangement.

FIG. 2 depicts an exemplary embodiment of the passcode creation process, in which each key of a physical or virtual keyboard 200 is associated with a single property. In this embodiment keys 210 can be virtual, being manifested by a device, or the keys may be physical components of a device whose purpose is to be used for passcode creation. The specific example shown in FIG. 2 utilizes a row of keys for each property set; the top row being shape 215 property set, the second row being number 220 property set, the property set of Latin characters A through H 225 in the third row, the property set of Latin characters I through Q 230 in the fourth row; row five being the property set of Latin characters R through Z 235; and the property set of colors 240 (represented as patterns) in the last row.

Figure 3:
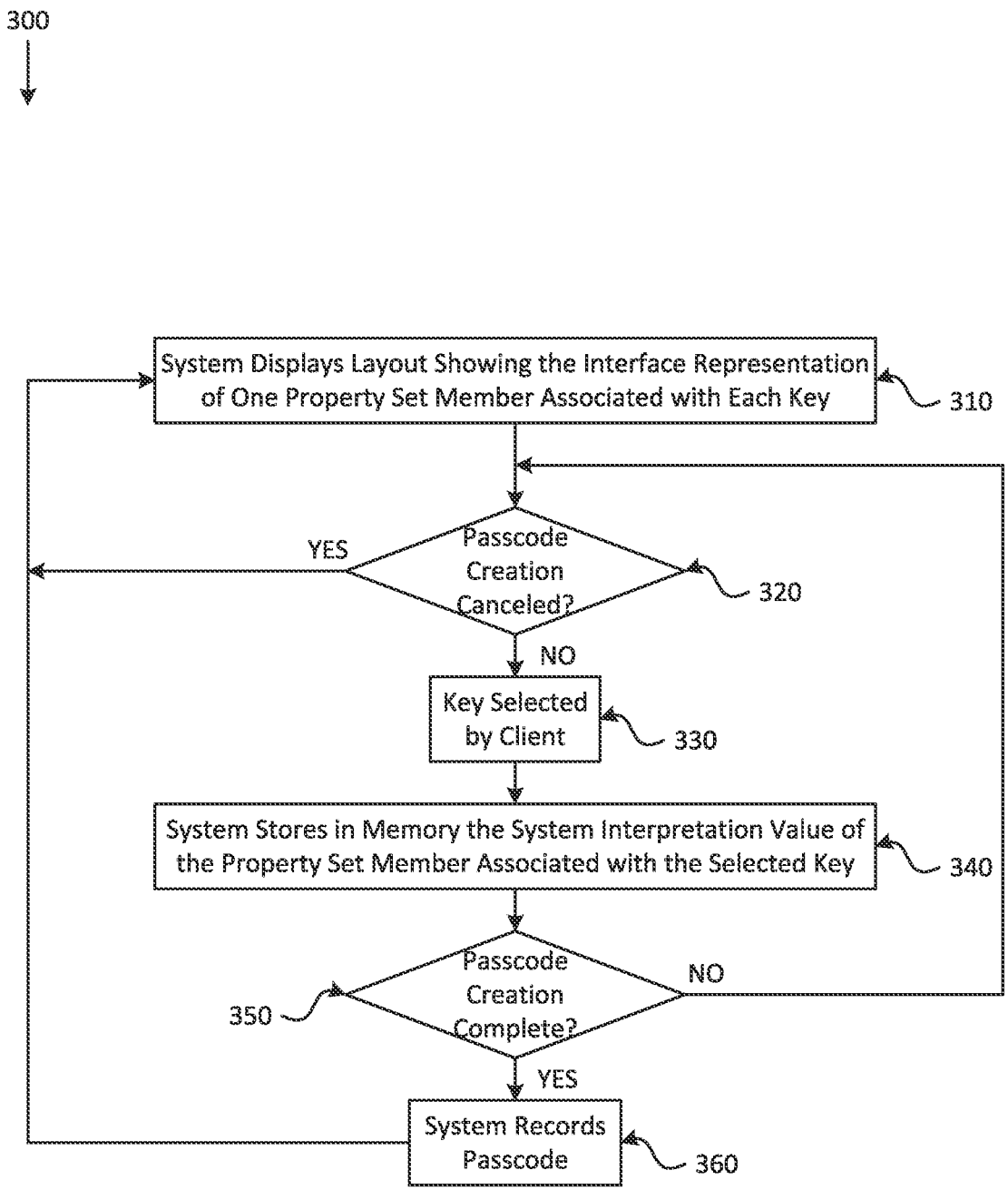
FIG. 3 illustrates a first example flow diagram for creating a passcode.

The process by which this embodiment creates the passcode is outlined in method 300 in FIG. 3. At block 310 of method 300, the system either manifests the interface or the interface is built as a physical component of a device to be used for passcode creation. At any point during passcode creation, a user may choose to cancel the process at block 320, thereby clearing any previously selected properties and beginning the process anew. Upon the selection of one of the keys at block 330, the system, at block 340, records the interpretation value of the property associated with the selected key for the present position in the passcode. This process is repeated until passcode creation is complete at block 350, at which time the system saves the interpretation values as a valid passcode for future use during passcode entry at block 360.

Another example of passcode creation is shown in FIG. 4. In this embodiment, each virtual key is presented on interface 400 is associated with a plurality of properties. Upon selection of one of virtual keys 410, a virtual key 450 associated with each of the properties associated with the selected key is manifested 455, 460, 465, 470, 475, and 480. The property associated with a manifested key is added to the present position in the passcode being created when the manifested virtual key is selected.

Figure 5:
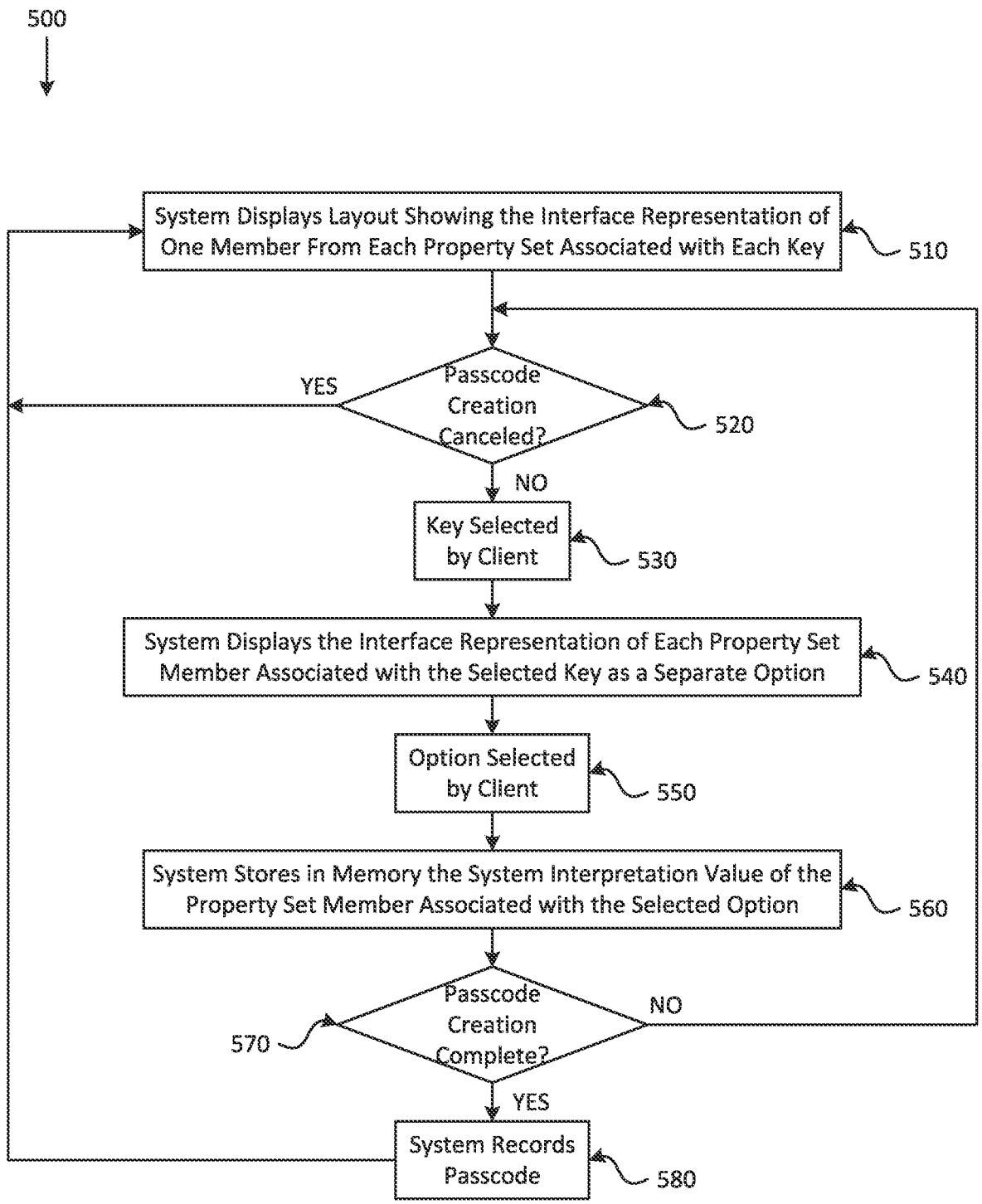
FIG. 5 illustrates a second example flow diagram for creating a passcode.

The process by which the passcode is created for this embodiment is described by method 500 in FIG. 5. The system, at block 510 of method 500, either manifests the interface or the interface is built as a physical component of a device to be used for passcode creation. At any point during passcode creation, a user can choose to cancel the process at block 520, thereby clearing any previously selected properties and beginning the process anew. Upon the selection of one of the keys at block 530, the system, at block 540, manifests a virtual key for each of the properties associated with the selected key. When one of the newly manifested virtual keys is selected at block 550, the system, at block 560, records the interpretation value of the property associated with the selected key for the present position in the passcode. This process is repeated until passcode creation is complete at block 570, at which time the system saves the interpretation values as a valid passcode for future use during passcode entry at block 580.

Figure 6:
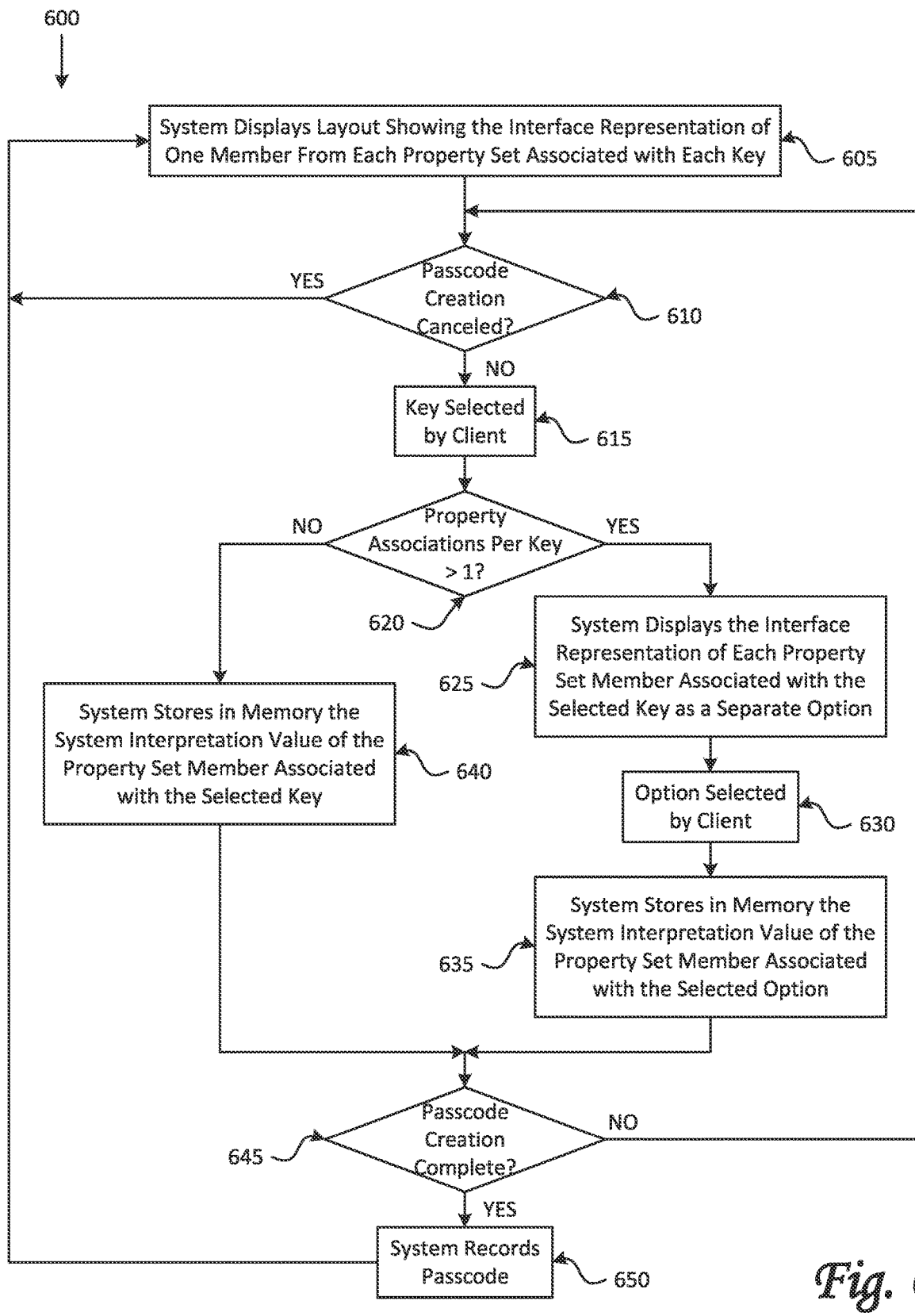
FIG. 6 illustrates a third example flow diagram for creating a passcode.

FIG. 6 demonstrates an example of a method 600 by which the exemplary embodiments depicted in FIG. 3 and FIG. 5 can be combined into a single process. The system, at block 605, either manifests the interface or the interface is built as a physical component of a device to be used for passcode creation. At any point during passcode creation, a user can choose to cancel method 600 at block 610, thereby clearing any previously selected properties and beginning the process anew. Upon the selection of one of the keys at block 615, the system, at block 620, checks the number of properties associated with the selected virtual key. If the virtual key is associated with multiple properties, the system, at block 625, manifests a virtual key for each of the properties associated with the selected key. Then, at block 630, when one of the newly manifested virtual keys is selected, the system, at block 635, records the interpretation value of the property associated with the selected key for the present position in the passcode. If the originally selected virtual key is associated with a single property, the system, at block 640, records the interpretation value of the property associated with the selected key for the present position in the passcode. This process is repeated until passcode creation is complete at block 645, at which time the system saves the interpretation values as a valid passcode for future use during passcode entry at block 650.

Figure 25:
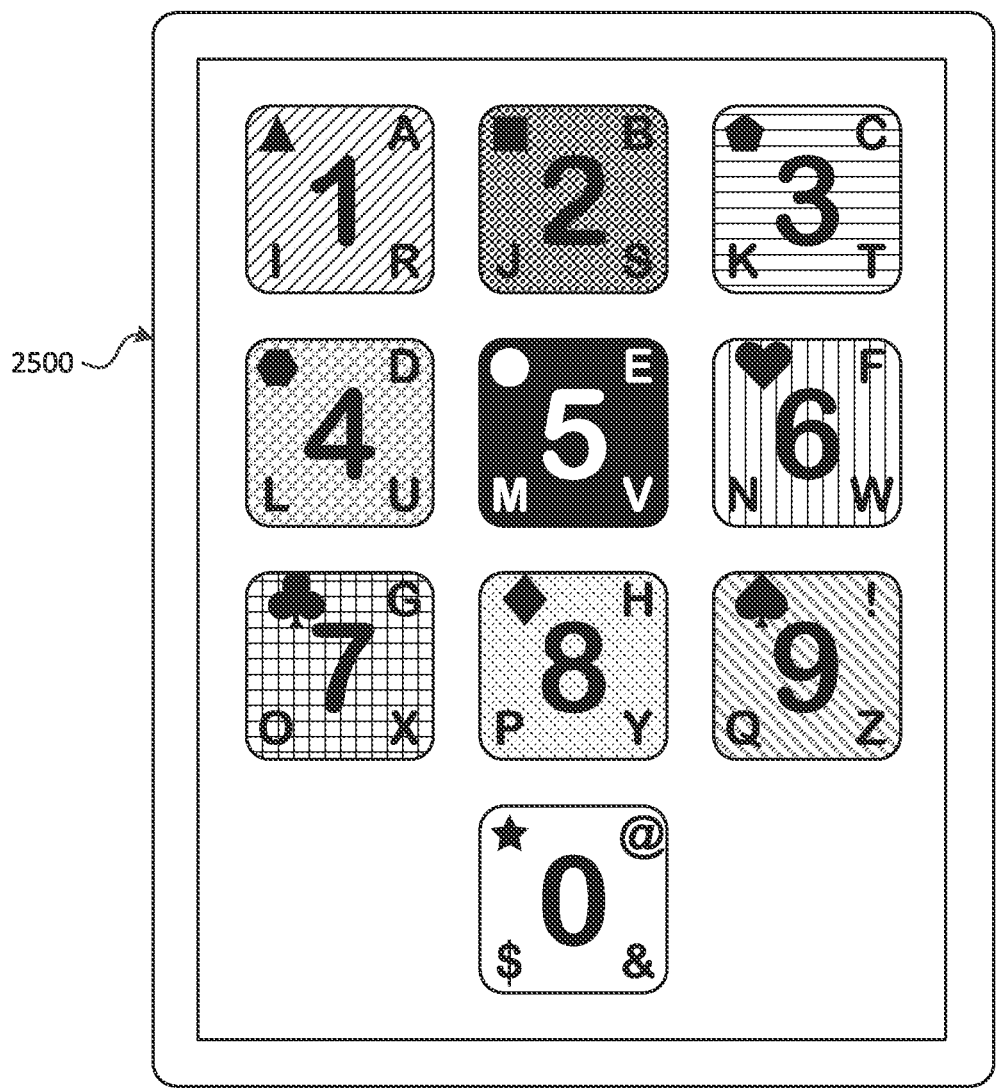
FIG. 25 illustrates an additional example of a virtual key arrangement.
Figure 26:
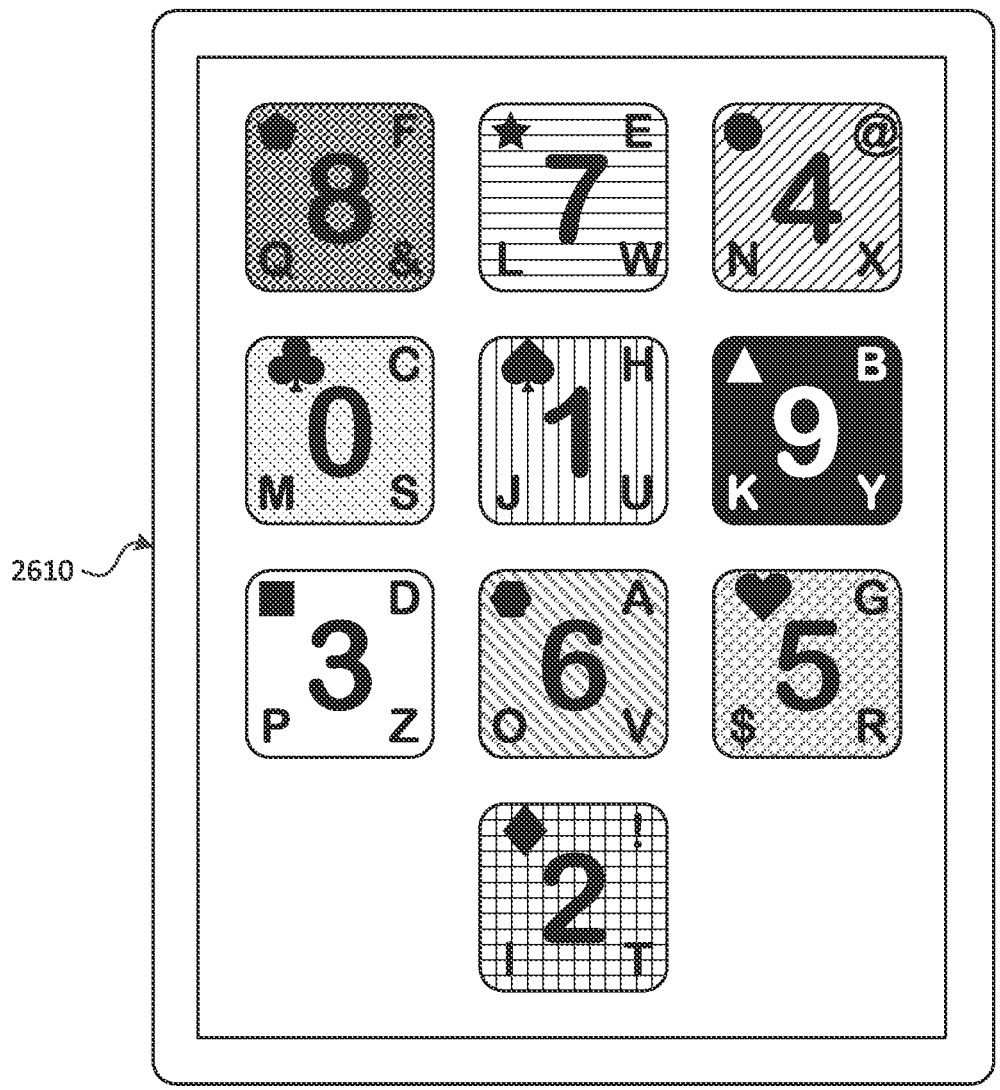
FIG. 26 illustrates an example of the virtual key arrangement utilizing property sets depicted in FIG. 22.

Another exemplary embodiment of passcode creation provides a secure means of setting the passcode which would make it extremely difficult for an observer to determine the new passcode, even if the observer is allowed an optimal view while the passcode is being entered. FIGS. 14a-21 provide a property dispersion processes which shuffle the properties associated with the virtual keys in a generally random manner such that the resulting configuration of associated properties on any virtual key will include at most a single property that was associated with a virtual key immediately prior to the execution of the process. An example of the configuration shown in FIG. 26 is one possible result after the execution of the process having been executed from the initial configuration 2500 shown in FIG. 25. The comparison of any virtual key in FIG. 25 with any virtual key in FIG. 26 will show that the compared virtual keys share at most a single property, including the position of the key within the interface.

Figure 27:
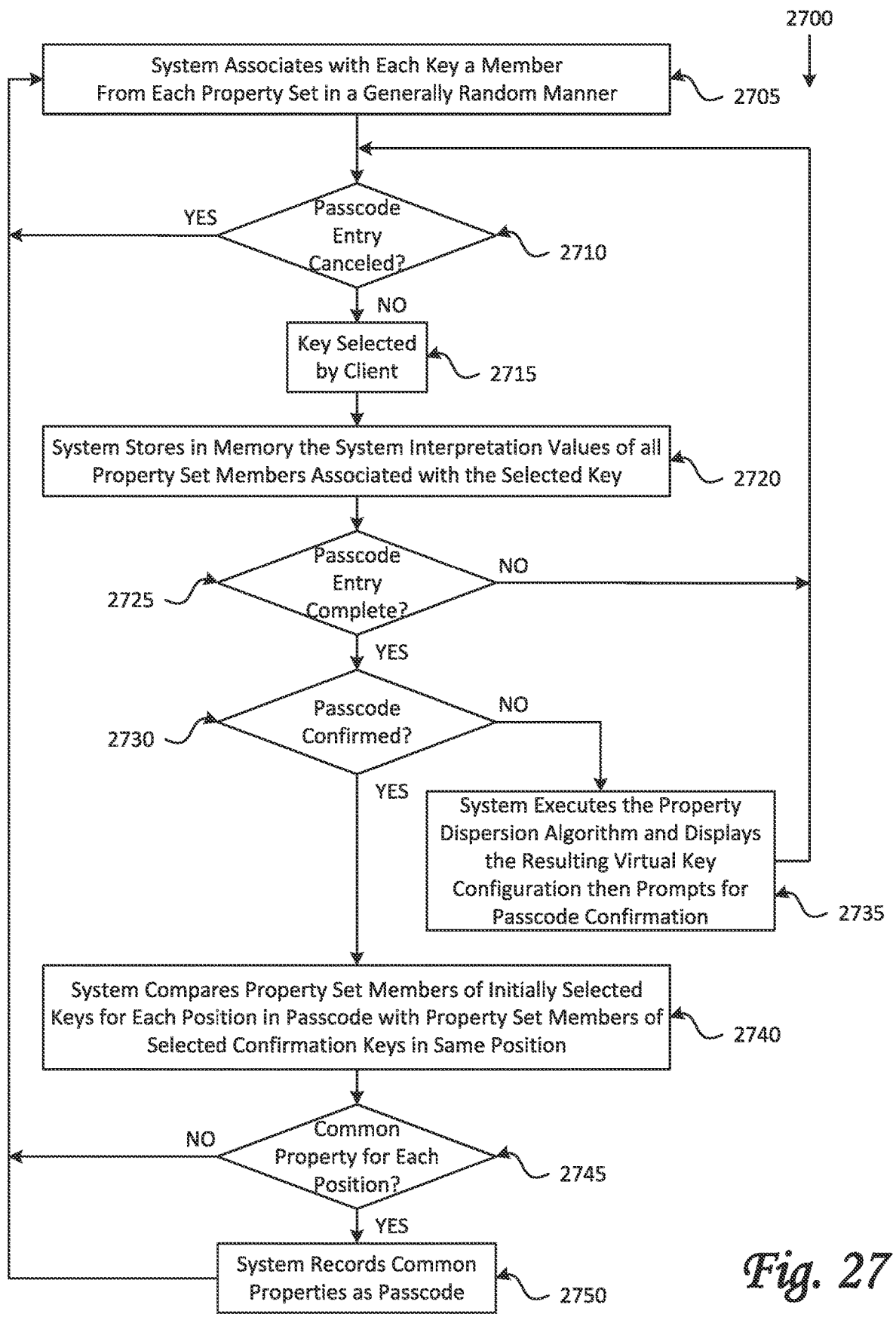
FIG. 27 illustrates a flow diagram for secure creation of a passcode.

When a user of the system chooses to create a new passcode, a method 2700 depicted in FIG. 27 will be executed. At block 2705 of method 2700, each virtual key is associated with a plurality of properties. At any point during passcode creation, a user can choose to cancel the process at block 2710, thereby clearing any previously selected properties and beginning the process anew. Upon the selection of one of the keys at block 2715, the system, at block 2720, records the interpretation value of all properties associated with the selected key for the present position in the passcode. This process is repeated until passcode entry is complete at block 2725, at which time the system executes the property dispersion algorithm block 2735 shown in FIGS. 14a-21, after which the resulting configuration is displayed, and the user is prompted to confirm the previously entered passcode.

After the passcode entry process is repeated for confirmation at block 2730, a comparison between the properties associated with each initially selected key and the key selected during confirmation is made for each position of the entered passcode at block 2740. The property dispersion algorithm may ensure that there can be no more than one property in common between the keys for each comparison. If the user correctly selected the keys having a common property for each position of the passcode during confirmation at block 2745, the system saves the interpretation values as a valid passcode for future use during passcode entry at block 2750. Otherwise, if the user did not select keys during confirmation having the same properties in the same sequence as during the initial passcode entry, the passcode creation process is canceled, and the user may have to start the process again from the beginning. This embodiment is dependent upon the condition that the number of properties associated with each key is equal to or less than the total number of keys used by the interface implemented by the embodiment.

Figure 14A:
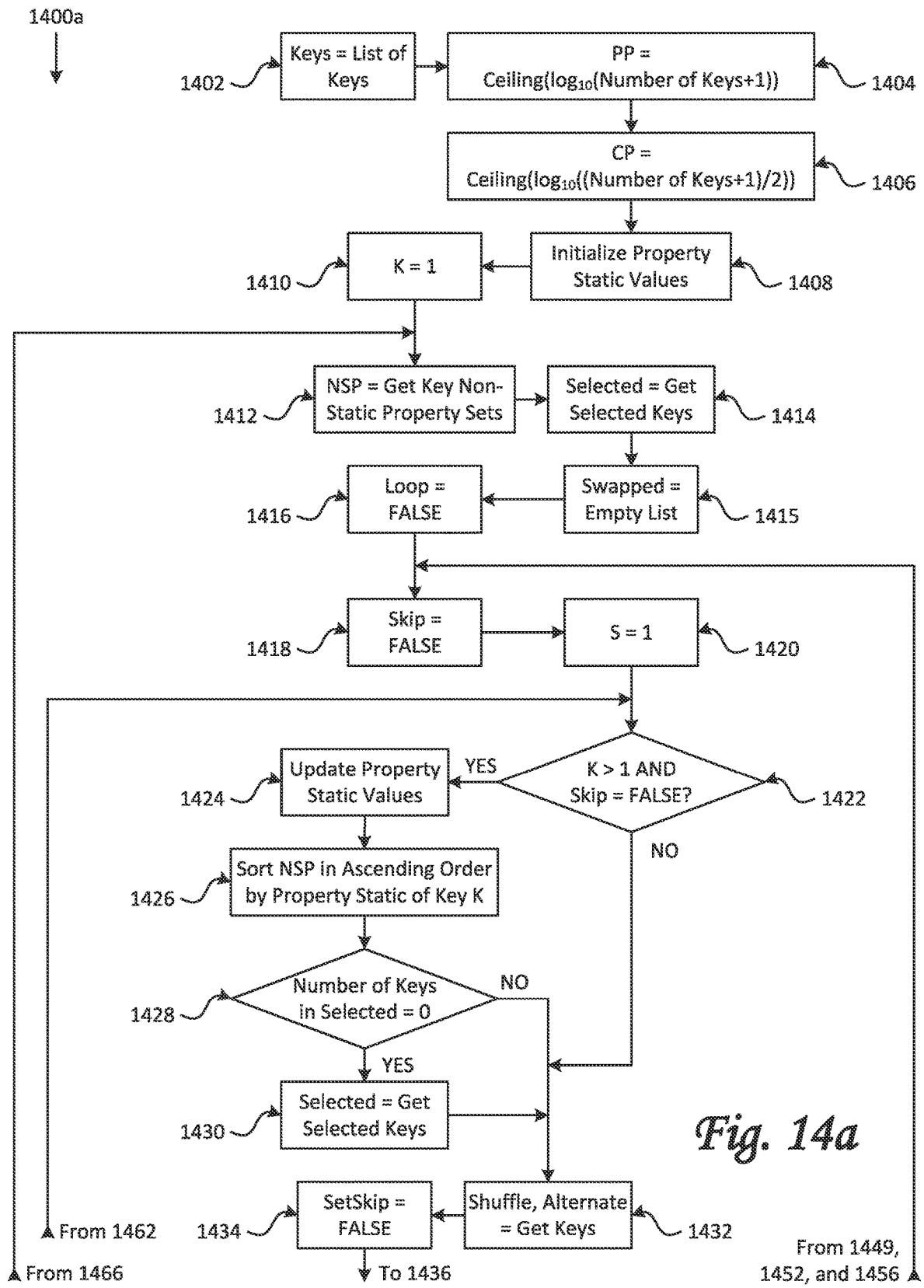
FIG. 14a partially illustrates a flow diagram of a property dispersion algorithm.
Figure 14B:
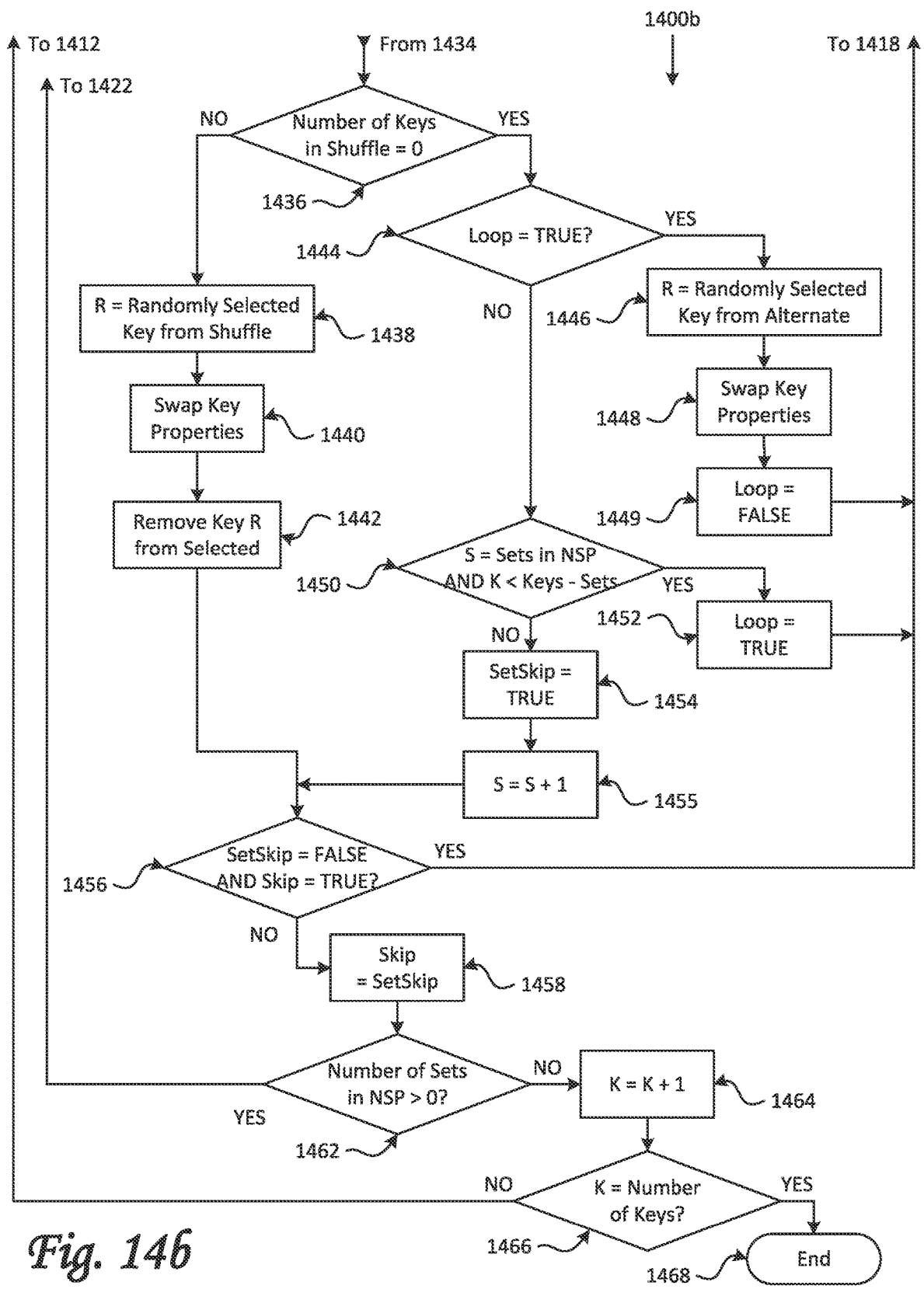
Figure 17:
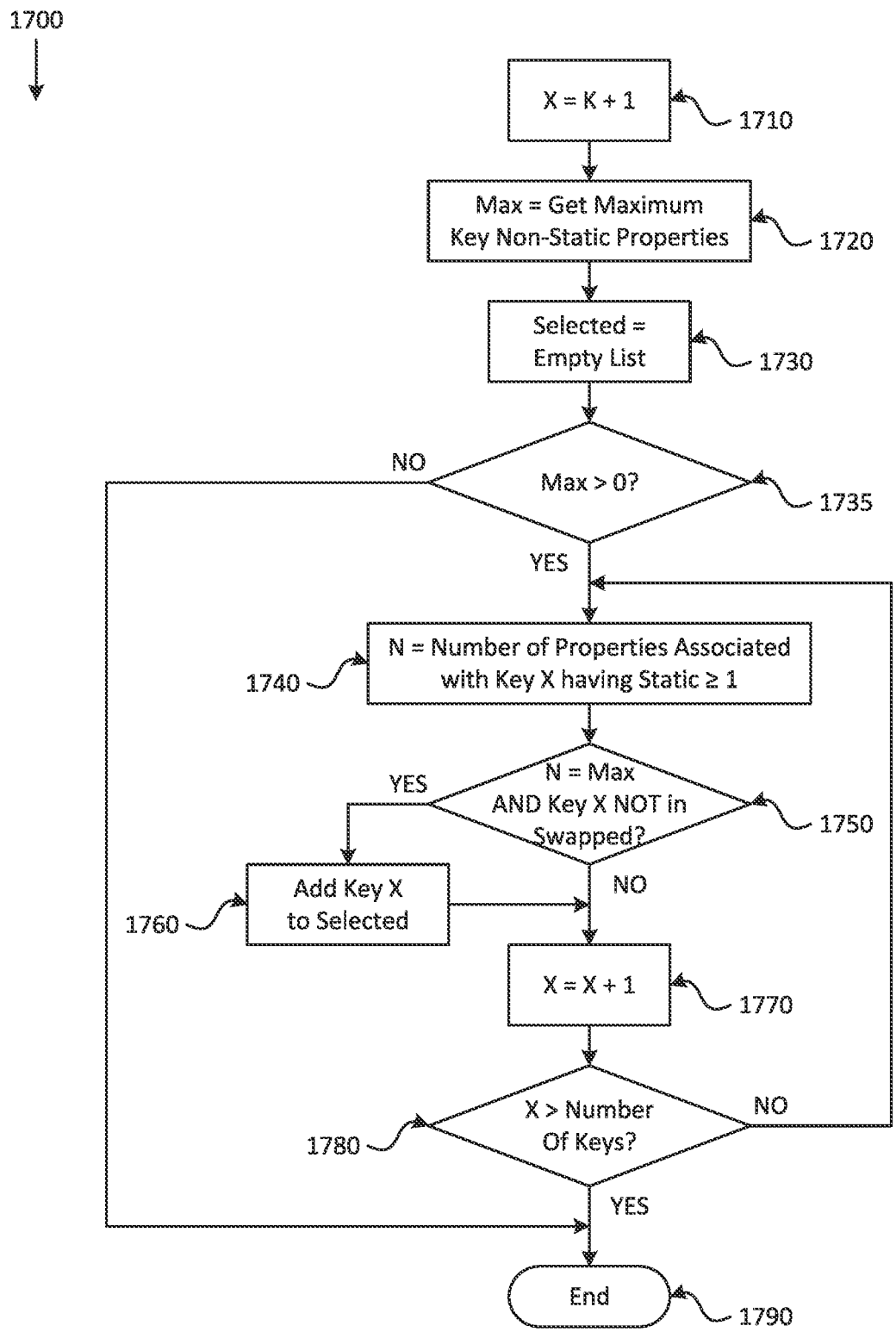
FIG. 17 illustrates a flow diagram of a method to fetch selected keys.

An example of a property dispersion methods 1400a and 1400b are depicted in FIGS. 14a-14b. At block 1402 of method 1400a, a list comprising all of the virtual keys is stored in system memory as variable Keys. Then, at block 1404, a variable PP is calculated as Ceiling($\log_{10}$(number of Keys in the list variable Keys+1)) and, at block 1406, a variable CP is calculated as Ceiling($\log_{10}$((number of Keys in the list variable Keys+1)/2). Property static values are then initialized at block 1408 following the Initialize Property Static Values process shown in FIG. 15 and the value one is assigned to variable K at block 1410. At block 1412, a variable NSP is set to a list of property sets using the Get Key Non-Static Property Sets process depicted in FIG. 6, and then the list of selected keys created following the Get Selected Keys process shown in FIG. 17 is assigned to variable Selected at block 1414. Next, at block 1415, a list variable Swapped is set to an empty list. Then, at block 1416, a variable Loop is given a Boolean value of FALSE and, at block 1418, a variable Skip is also given a Boolean value of FALSE.

At block 1420 of method 1400, a value one is assigned to a variable S. At block 1422 it is determined if variable K is greater than one and the Skip is equal to FALSE. If the variable K is greater than one and the Skip is equal to FALSE at block 1422, then, at block 1424, property static values are updated using the Update Property Static Values process shown in FIG. 19. At block 1426, a property set variable list NSP is sorted in ascending order based on the Static value of each property and the property set to which each property belongs of the key in the position equal to variable K in the Keys variable list. At block 1428 it is determined if a number of keys Selected is zero. If at block 1428 it is determined that zero is the number of keys in the variable list Selected, the list created using the Get Selected Keys process depicted in FIG. 17 is assigned to the variable list Selected at block 1430. At block 1432, the list variables Shuffle and Alternate are then set to the list created following the Get Keys process shown in FIG. 20. At block 1434, the Boolean value FALSE is assigned to variable SetSkip.

This process continues in FIG. 14b where, at block 1436 it is determined if the number of keys in the variable list Shuffle is not equal to zero. If the number of keys in the variable list Shuffle is not equal to zero at block 1436, then, at block 1438, a variable R is set to a key which is randomly selected from the variable list Shuffle. At block 1440, properties of keys stored in variable R and K are swapped as depicted in the Swap Key Properties process in FIG. 21. At block 1442, the key assigned to variable R is removed from the variable list Selected. If the number of keys in the variable list Shuffle is equal to zero at block 1436, then, at block 1444 it is determined if the variable Loop is true. If the variable Loop is not equal to TRUE at block 1444, then at block 1450, it is determined if the number of property sets in list variable NSP is not equal to variable S or variable K is not less than the number of keys in list variable Keys minus the number of Sets. If the number of property sets in list variable NSP is not equal to variable S or variable K is not less than the number of keys in list variable Keys minus the number of Sets at block 1450, then, at block 1454, variable SetSkip is set to the Boolean value TRUE and, at block 1455, variable S is incremented by one.

At block 1456 of method 1400, it determined if the variable SetSkip is equal to FALSE and variable Skip is equal to TRUE. If the variable SetSkip is equal to FALSE and variable Skip is equal to TRUE at block 1456, execution returns to block 1418 in the process in which the variable Skip is set to FALSE and continues from there. If, however, the value of variable Loop is TRUE at block 1444, then, at block 1446, variable R is set to a key which is randomly selected from the variable list Alternate. At block 1448, properties of keys stored in variable R and K are swapped as depicted in the Swap Key Properties process in FIG. 21. Variable Loop is set to FALSE at block 1449. If variable Loop is not equal to TRUE at block 1444, but variable S is equal to the number of property sets in list variable NSP and variable K is less than the number of keys in list variable Keys minus the number of Sets at block 1450, then variable Loop is set to the Boolean value TRUE at block 1452. At this point the process also returns to block 1418 at which the variable Skip is set to FALSE and continues from there. If the variable SetSkip is not equal to FALSE or the variable Skip is not equal to TRUE at block 1456, then, at block 1458, the variable Skip is set to the value of variable SetSkip.

At block 1462 of method 1400, it is determined if the number of property sets in the list variable NSP is greater than zero. If the number of property sets in the list variable NSP is greater than zero at block 1462, then method 1400b returns to block 1422 of method 1400a, at which the variable K is compared to the value of one and the variable Skip is compared to the Boolean value of FALSE and continues from there. Otherwise, if the number of property sets in the list variable NSP is not greater than zero at block 1462, the variable K is incremented by one at block 1464. Then, at block 1466, it is determined if the variable K is not equal to the number of keys in the list variable Keys. if the variable K is not equal to the number of keys in the list variable Keys at block 1466, method 1400b returns to block 1412 of method 1400a where the variable NSP is set to a list of property sets using the Get Key Non-Static Property Sets process depicted in FIG. 16 and continues from there. Otherwise, the process is complete and ends at block 1568.

Figure 15:
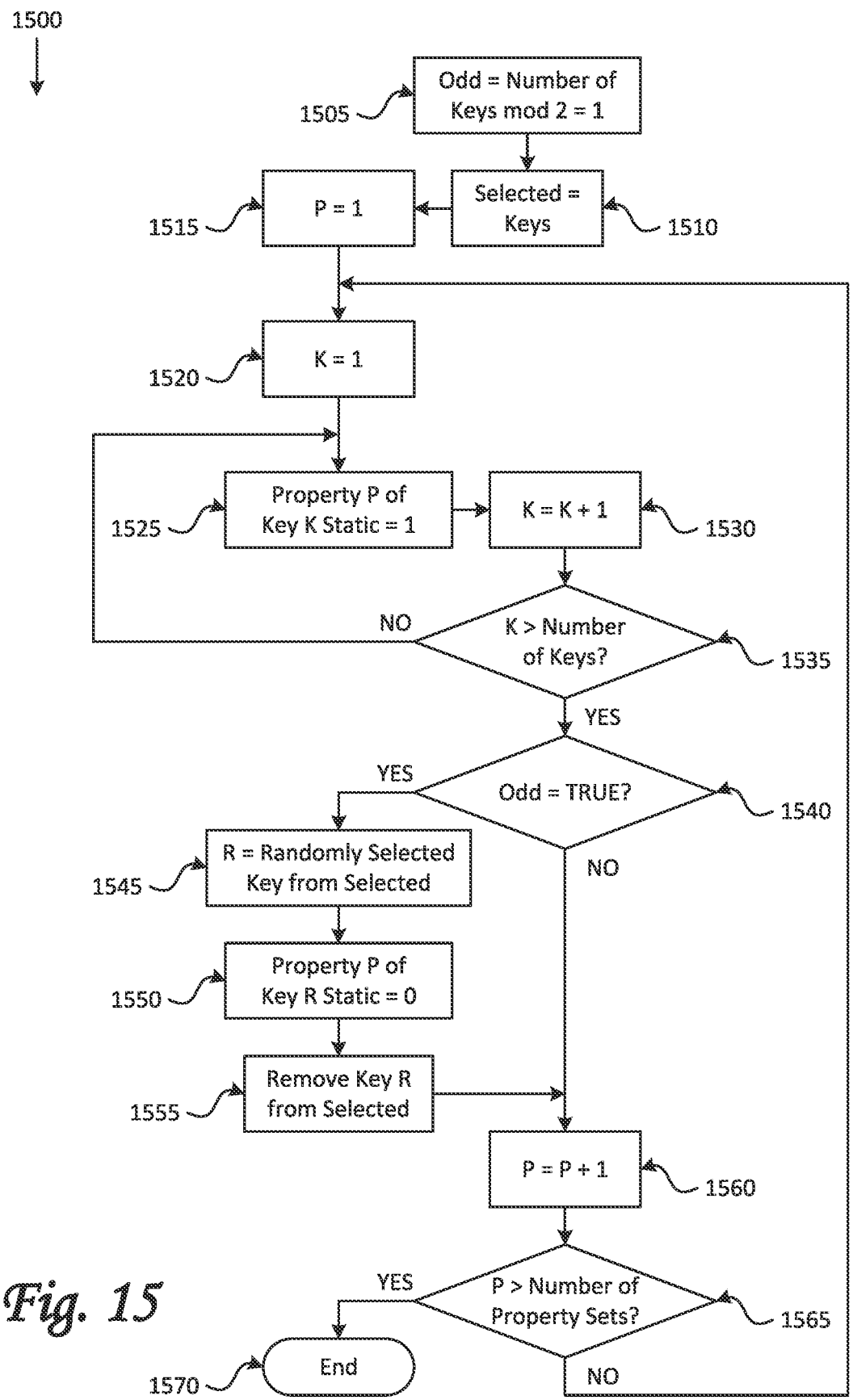
FIG. 15 illustrates a flow diagram of a property static value initialization routine.

A method 1500 to initialize Property Static Values, which is referenced by the Property Dispersion process diagram shown in FIGS. 14a-14b, is depicted in FIG. 15. At block 1505, a Variable Odd is assigned a Boolean value of TRUE if a number of keys in list variable Keys is odd, and FALSE if the number of keys in the list variable Keys is even. At block 1510 of method 1500, the list variable Selected is then assigned values equivalent to the list variable Keys and, at block 1515, the variable P is set to the value of one and, at block 1520, variable K is also set to the value of one. At block 1525, the value of one is assigned to the Static value of the property at the position equal to variable P in the list of properties belonging to the key at the position equal to variable K in the list variable Keys. At block 1530, the variable K is incremented by one.

At block 1535 of method 1500, it is determined if the variable K is not greater than the number of keys in the list variable Keys. If the variable K is not greater than the number of keys in the list variable Keys at block 1535, then method 1500 returns to block 1525 where the value of one is assigned to the Static value of the property at the position equal to variable P in the list of properties belonging to the key at the position equal to variable K in the list variable Keys and continues from there. Otherwise, if the variable K is greater than the number of keys in the list variable Keys at block 1535, then, at block 1540 it is determined if the variable Odd is TRUE. If the variable Odd is TRUE at block 1540, the variable R is set to a key which is randomly selected from the variable list Selected at block 1545. At block 1550, the value of zero is assigned to the Static value of the property at the position equal to variable P in the list of properties belonging to the key equal to variable R. At block 155, the key is removed from the list variable Selected that is equal to the key at the position equal to variable R in the list variable Keys. The variable P is then incremented by one at block 1560. At block 1565 it is determined if the variable P is not greater than the number of property sets used by the keys within the interface. If the variable P is not greater than the number of property sets used by the keys within the interface at block 1565, then method 1500 returns to block 1520 where the variable K is assigned a value of one and continues from there. Otherwise, if the variable P is greater than the number of property sets used by the keys within the interface at block 1565, method 1500 is completed at block 1570 and returns to the referencing process.

Figure 16:
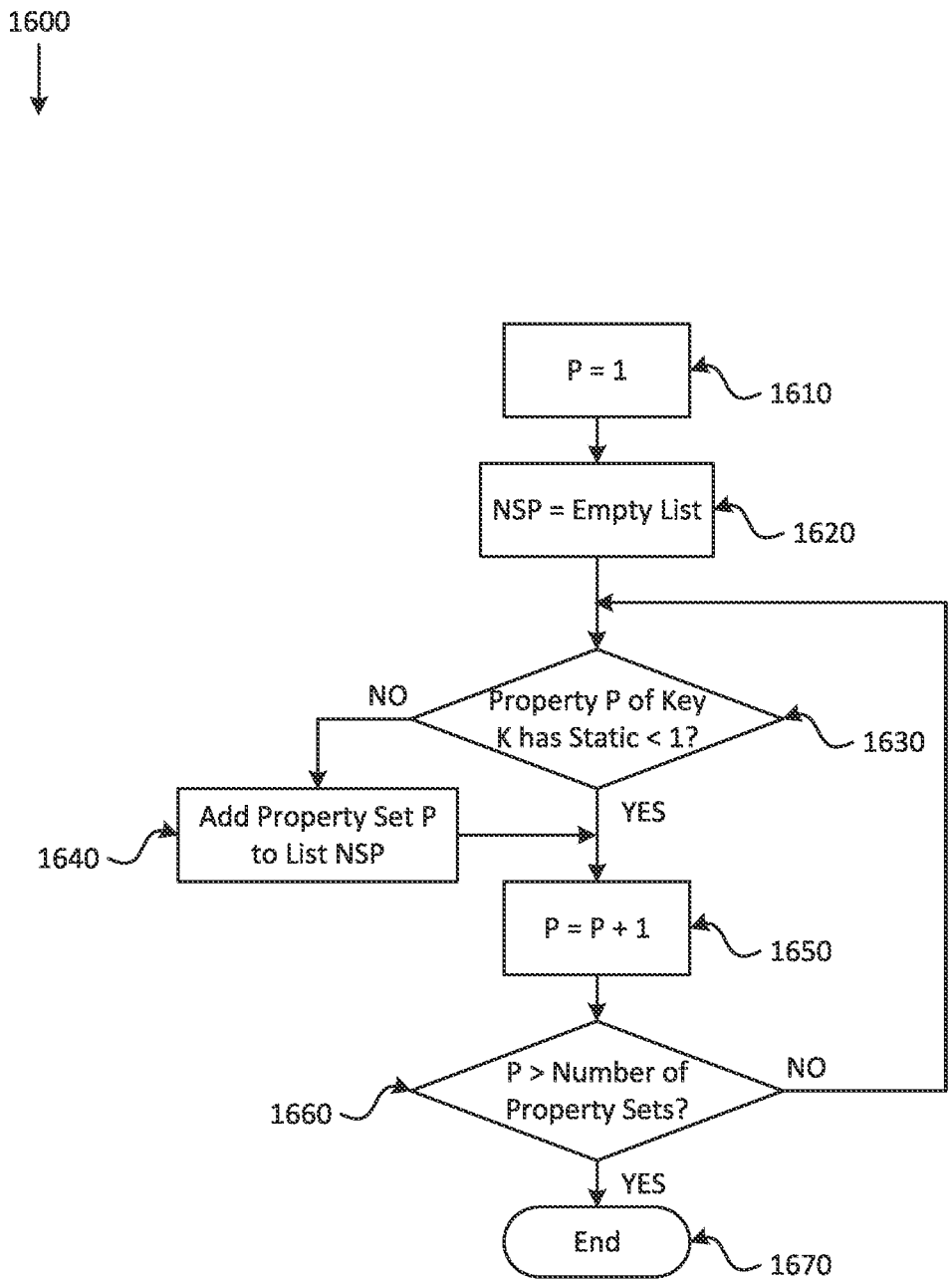
FIG. 16 illustrates a flow diagram of a routine to get key non-static property sets.

FIG. 16 illustrates a method 1600 to Get Key Non-Static Property Sets, which is referenced by the Property Dispersion process diagram shown in FIGS. 14a-14b. At block 1610 of method 1600, a value of one is assigned to the variable P. At block 1620, the variable list NSP is set to an empty list. At block 1630, it is determined if the Static value of the property at the position equal to variable P in the list of properties belonging to the key at the position equal to variable K in the list variable Keys is not less than one. If the Static value of the property at the position equal to variable P in the list of properties belonging to the key at the position equal to variable K in the list variable Keys is not less than one at block 1630, then the property set, to which the property at the position equal to variable P in the list of properties belonging to the key at the position equal to variable K in the list variable Keys belongs, is added to the variable list NSP at block 1640. The variable P is then incremented by one at block 1650. At block 1660 it is determined if the variable P is not greater than the number of property sets used by the keys within the interface. If the variable P is not greater than the number of property sets used by the keys within the interface at block 1660, then method 1600 returns to block 1630 where the Static value of the property at the position equal to variable P in the list of properties belonging to the key at the position equal to variable K in the list variable Keys is compared to the value of one and continues from there. Otherwise, if the variable P is greater than the number of property sets used by the keys within the interface at block 1660, method 1600 is completed at block 1670 and returns to the referencing process.

Figure 18:
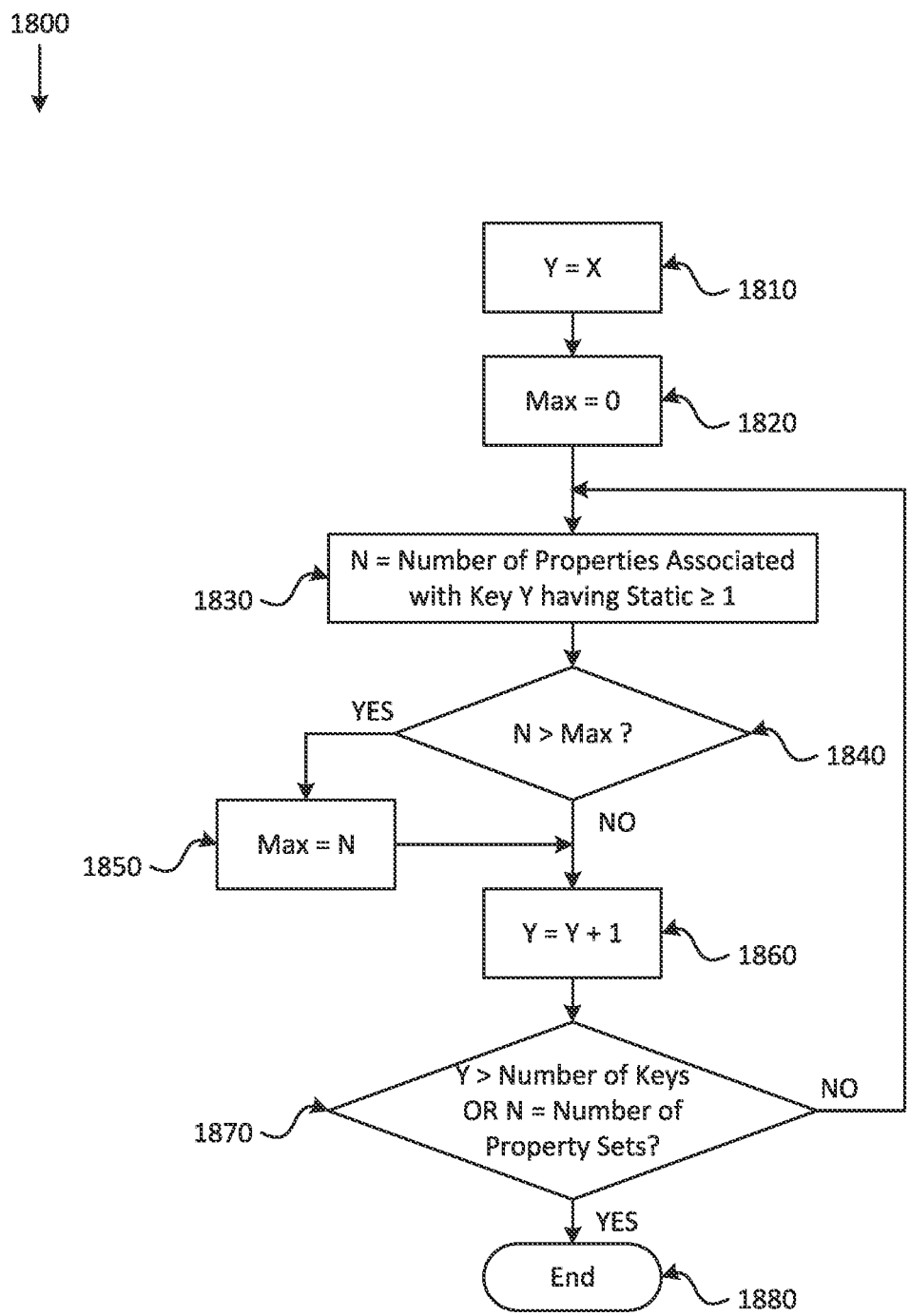
FIG. 18 illustrates a flow diagram of a method to fetch key maximum non-static properties.

FIG. 17 illustrates a method 1700 to Get Selected Keys, which is referenced by the Property Dispersion process diagram shown in FIGS. 14a-14b. At block 1710 of method 1700, the value of variable K+1 is assigned to variable X. At block 1720, the variable Max is set to a value which is calculated through the Get Maximum Key Non-Static Properties process as shown in FIG. 18. Then, at block 1730, the variable list Selected is set to an empty list. At block 1735 it is determined if the variable Max is greater than zero. If the variable Max is greater than zero at block 1735, a value equal to the number of properties associated with the key at the position equal to variable X in the list variable Keys having a static value which is greater than or equal to one is assigned to variable N at block 1740. Otherwise, method 1700 is completed at block 1790 and returns to the referencing process.

At block 1750 of method 1700, it is determined If the variable N is equal to the variable Max and the key at the position equal to variable X in the list variable Keys does not exist in the list variable Swapped. If the variable N is equal to the variable Max and the key at the position equal to variable X in the list variable Keys does not exist in the list variable Swapped at block 1750, then the key at the position equal to variable X in the list variable Keys is added to the list variable Selected at block 1760. The variable X is then incremented by one at block 1770. At block 1780, it is determined if the variable X is not greater than the number of keys in the list variable Keys. If the variable X is not greater than the number of keys in the list variable Keys at block 1780, then method 1700 returns to block 1740 where a value equal to the number of properties associated with the key at the position equal to variable X in the list variable Keys having a static value which is greater than or equal to one is assigned to variable N and continues from there. Otherwise, if the variable X is greater than the number of keys in the list variable Keys at block 1780, method 1700 is ends at block 1790 and returns to the referencing process.

FIG. 18 illustrates a method 1800 to Get Maximum Key Non-Static Properties, which is referenced by the Get Selected Keys process diagram shown in FIG. 17. At block 1810 of method 1800, the variable Y is set to equal the value of variable X. At block 1820, a value of zero is assigned to the variable Max. Then a value equal to the number of properties associated with the key at the position equal to variable Y in the list variable Keys having a static value which is greater than or equal to one is assigned to variable N at block 1830. At block 1840 it is determined if the variable N is greater than the variable Max. If the variable N is greater than the variable Max at block 1840, then the variable Max is set to the value of variable N at block 1850. The variable Y is then incremented by one at block 1860. At block 1870 it is determined if the variable Y is not greater than the number of keys in the list variable Keys, and the variable N is not equal to the number of property sets used by the keys within the interface. If the variable Y is not greater than the number of keys in the list variable Keys, and the variable N is not equal to the number of property sets used by the keys within the interface at block 1870, then method 1800 returns to block 1830 where a value equal to the number of properties associated with the key at the position equal to variable Y in the list variable Keys having a static value which is greater than or equal to one is assigned to variable N and continues from there. Otherwise, if the variable Y is greater than the number of keys in the list variable Keys, or the variable N is equal to the number of property sets used by the keys within the interface at block 1870, method 1800 is completed at block 1880 and returns to the referencing process.

Figure 19:
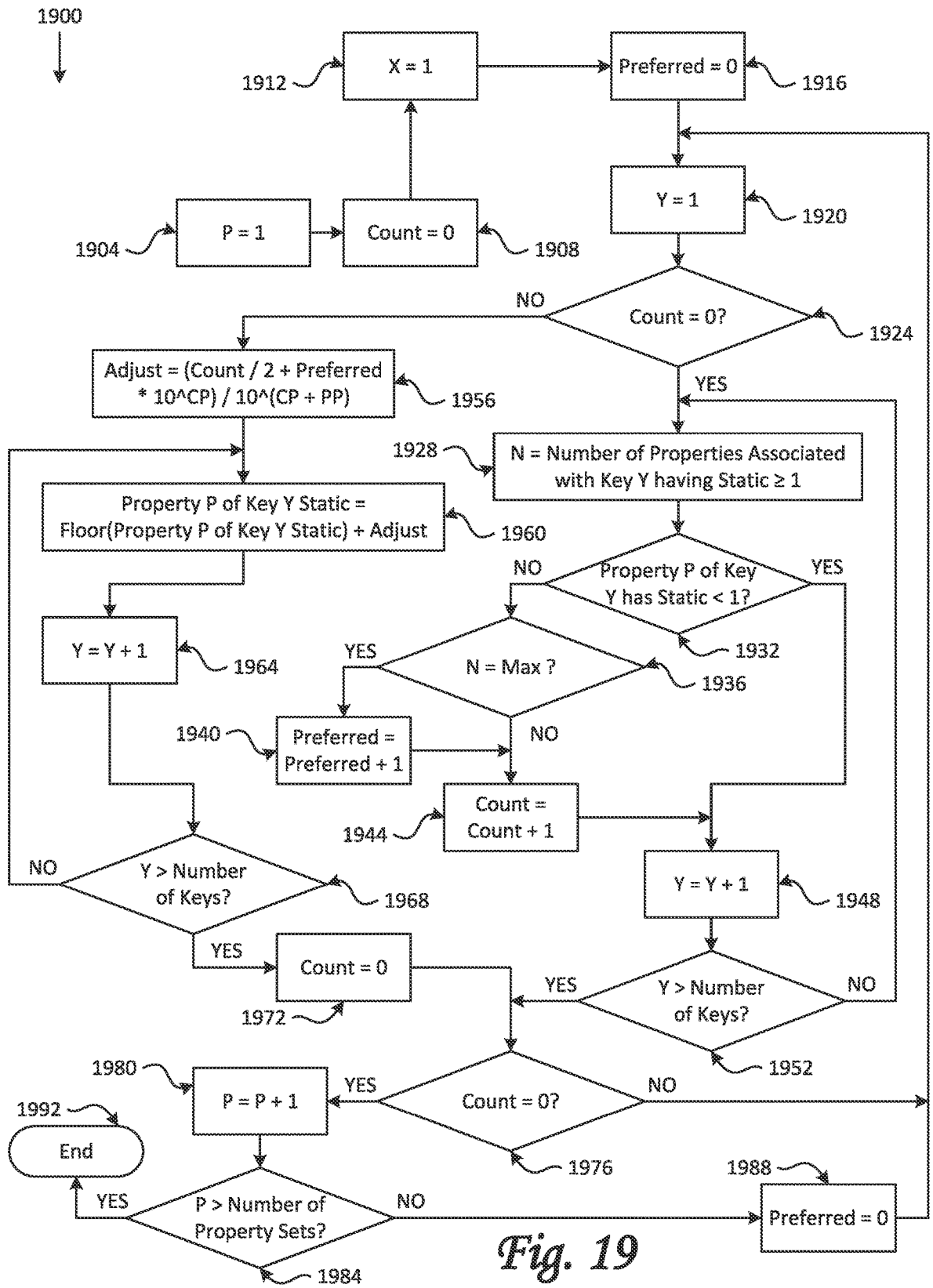
FIG. 19 illustrates a flow diagram of a method to update property static values.

FIG. 19 illustrates a method 1900 to Update Property Static Values, which is referenced by the Property Dispersion process diagram shown in FIGS. 14a-14b. At block 1904 of method 1900, a value of one is assigned to a variable P. At block 1908, a value of zero is assigned to a variable Count. At block 1912, a value of one is assigned to a variable X. At block 1916, a value of zero is assigned to a variable Preferred 1916. At block 1920, a value of one is assigned to a variable Y. At block 1924 it is determined if the variable Count is equal to zero. If the variable Count is equal to zero at block 1924, then a value equal to the number of properties associated with the key at the position equal to variable Y in the list variable Keys having a static value which is greater than or equal to one is assigned to variable N at block 1928. At block 1932 it is determined if the Static value of the property at the position equal to variable P in the list of properties belonging to the key at the position equal to variable Y in the list variable Keys is not less than one. If the Static value of the property at the position equal to variable P in the list of properties belonging to the key at the position equal to variable Y in the list variable Keys is not less than one 1932, then, at block 1936 it is determined if the variable N is equal to the variable Max. If the variable N is equal to the variable Max at block 1936, then the variable Preferred is incremented by one at block 1940. Regardless of whether the value of N is equal to the variable Max, the variable Count is incremented by one at block 1944. And regardless of whether or not the Static value of the property at the position equal to variable P in the list of properties belonging to the key at the position equal to variable Y in the list variable Keys is less than one at block 1932, the variable Y is incremented by one at block 1948. At block 1952, it is determined if the value of variable Y is not greater than the number of keys in the list variable Keys. If the value of variable Y is not greater than the number of keys in the list variable Keys at block 1952, then method 1900 returns to block 1928 where a value equal to the number of properties associated with the key at the position equal to variable Y in the list variable Keys having a static value which is greater than or equal to one is assigned to variable N, and continues from there. Otherwise if the value of Count is not equal to zero at block 1924, then, at block 1956, the variable Adjust is assigned a value equal to $(\text{Count}/2+\text{Preferred}*10^{CP})/10^{(CP+PP)}$. At block 1960, the Static value of the property at the position equal to variable P in the list of properties belonging to the key at the position equal to variable Y in the list variable Keys is assigned a value equal to Floor(the Static value of the property at the position equal to variable P in the list of properties belonging to the key at the position equal to variable Y in the list variable Keys)+Adjust. At block 1964, the variable Y is incremented by one. At block 1968 it is determined if the value of variable Y is not greater than the number of keys in the list variable Keys. If the value of variable Y is not greater than the number of keys in the list variable Keys at block 1968, then method 1900 returns to block 1960 where the Static value of the property at the position equal to variable P in the list of properties belonging to the key at the position equal to variable Y in the list variable Keys is assigned a value equal to Floor(the Static value of the property at the position equal to variable P in the list of properties belonging to the key at the position equal to variable Y in the list variable Keys)+Adjust and continues from there. Otherwise if the value of variable Y is greater than the number of keys in the list variable Keys at block 1968, then a value of zero is assigned to the variable Count at block 1972. In either case, whether or not the initial value of the variable Count is equal to zero at block 1924, if the value of variable Y is greater than the number of keys in the list variable Keys at block 1952, then at block 1976 it is determined then if the value of variable Count is not equal to zero. If the value of variable Count is not equal to zero at block 1976, then method 1900 returns to block 1920 where the variable Y is assigned a value of one and continues from there. Otherwise if the value of variable count is equal to zero at block 1976, the value of variable P is incremented by one at block 1980. At block 1984 it is determined if the variable P is not greater than the number of property sets used by the keys within the interface. If the variable P is not greater than the number of property sets used by the keys within the interface at block 1984, the variable Preferred is assigned value of zero at block 1988, and method 1900 returns to block 1920 where the variable Y is assigned a value of one and continues from there. Otherwise if the variable p is greater than the number of property sets used by the keys within the interface at block 1984, method 1900 is completed at block 1992 and returns to the referencing process.

Figure 20:
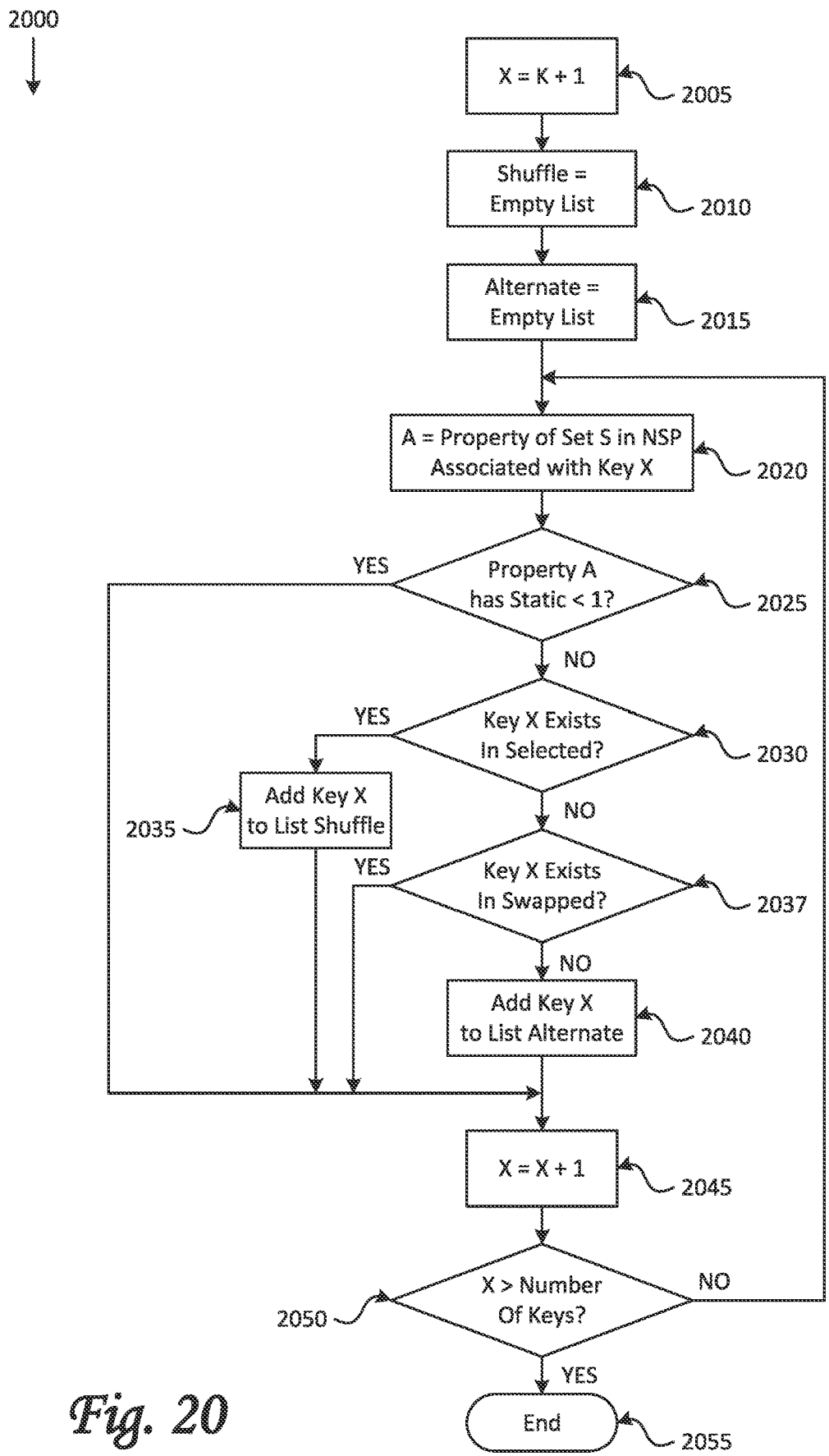
FIG. 20 illustrates a flow diagram of a method to get keys.

FIG. 20 illustrates a method 2000 to Get Keys, which is referenced by the Property Dispersion process diagram shown in FIGS. 14*a*-14*b*. At block 2005, a value equal to the value variable K+1 is assigned to a variable X. At block 2010, a list variable Shuffle is assigned empty list value. At block 2015, a list variable Alternate is also assigned empty list value. At block 2020, a variable A is assigned the property belonging to the property set assigned to variable S within the list variable NSP which is associated with the key at the position equal to variable X in the list variable Keys. At block 2025 it is determined if the Static value of the property assigned to the variable A is not greater than one. If the Static value of the property assigned to the variable A is not greater than one at block 2025, then at block 2030 it is determined if the key at the position equal to variable X in the list variable Keys exists within the list variable Selected. If the key at the position equal to variable X in the list variable Keys exists within the list variable Selected at block 2030, the key at the position equal to variable X in the list variable Keys is added to the list variable Shuffle at block 2035. If the key at the position is not equal to variable X in the list variable Keys exists within the list variable Selected at block 2030, then at block 2037 it is determined if the key at the position equal to variable X in the list variable Keys exists within the list variable Swapped. If the key at the position equal to variable X in the list variable Keys exists within the list variable Swapped at block 2037, the key at the position equal to variable X in the list variable Keys is added to the list variable Alternate at block 2040. Regardless of whether or not the Static value of the property assigned to the variable A is greater than one at block 2025, the variable X is incremented by one at block 2045. At block 2050, it is determined if the value of variable X is not greater than the number of keys in the list variable Keys. If the value of variable X is not greater than the number of keys in the list variable Keys block 2050, method 2020 returns to block 2020 where the variable A is assigned the property belonging to the property set assigned to variable S within the list variable NSP which is associated with the key at the position equal to variable X in the list variable Keys and continues from there. Otherwise if the value of variable X is greater than the number of keys in the list variable Keys at block 2050, method 2000 is completed at block 2055 and returns to the referencing process.

Figure 21:
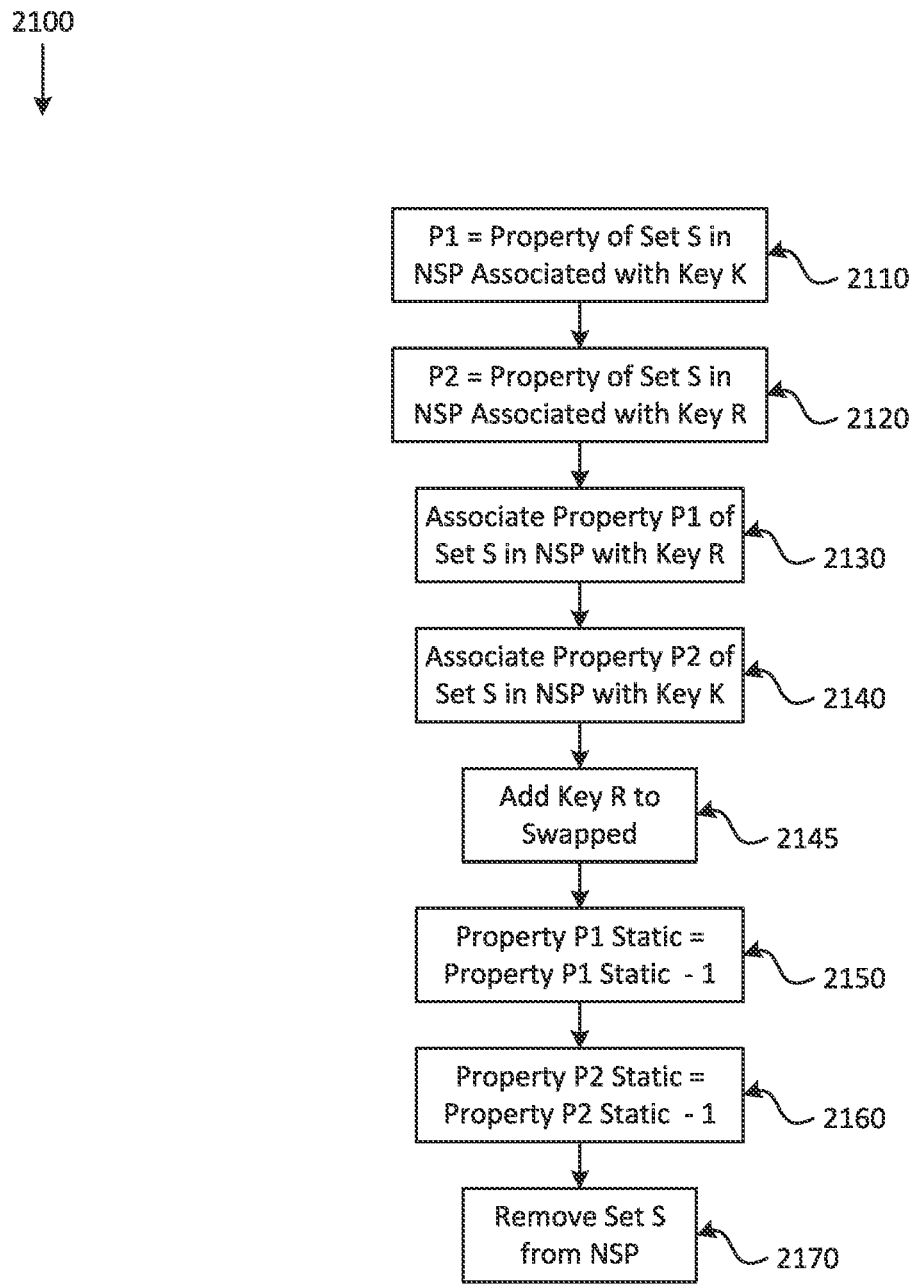
FIG. 21 illustrates a flow diagram of a method to swap key properties.

FIG. 21 illustrates a method 2100 to Swap Key Properties, which is referenced by the Property Dispersion process diagram shown in FIGS. 14*a*-14*b*. At block 2110, the property belonging to the property set assigned to variable S within the list variable NSP which is associated with the key at the position equal to variable K in the list variable Keys is assigned to variable P1. At block 2120, the property belonging to the property set assigned to variable S within the list variable NSP which is associated with the key at the position equal to variable R in the list variable Keys is assigned to variable P2. Next, the property assigned to variable P1 is associated to the key at the position equal to variable R in the list variable Keys at block 2130. At block 2140, the property assigned to variable P2 is associated to the key at the position equal to variable K in the list variable Keys. Then, at block 2145, the key at the position equal to variable R in the list variable Keys is added to the list variable Swapped. At block 2150, the Static value of the properties assigned to the variable P1 is assigned a value of negative one. At block 2160, the Static values of the properties assigned to the variable P2 is assigned a value of negative one. Finally, at block 2170, the property set assigned to variable S is removed from the list property NSP. The process is completed and returns to the referencing process.

Several methods are possible for passcode validation. The system can iterate through each of the properties associated with each of the selected virtual keys in sequence, comparing the interpretation value of each property at each position in the entered passcode with the interpretation value of the property at the same position in the stored passcode. A match for all positions will indicate a valid passcode.

Password encryption can be implemented by identifying all possible passcode combinations based on the properties of each virtual key selected for each position in the entered passcode. Each of these combinations could then be encrypted and compared to the encrypted value of the stored passcode, which was previously encrypted at the time it was created. A successful match for any of the combinations indicates a valid passcode.

Figure 3A:
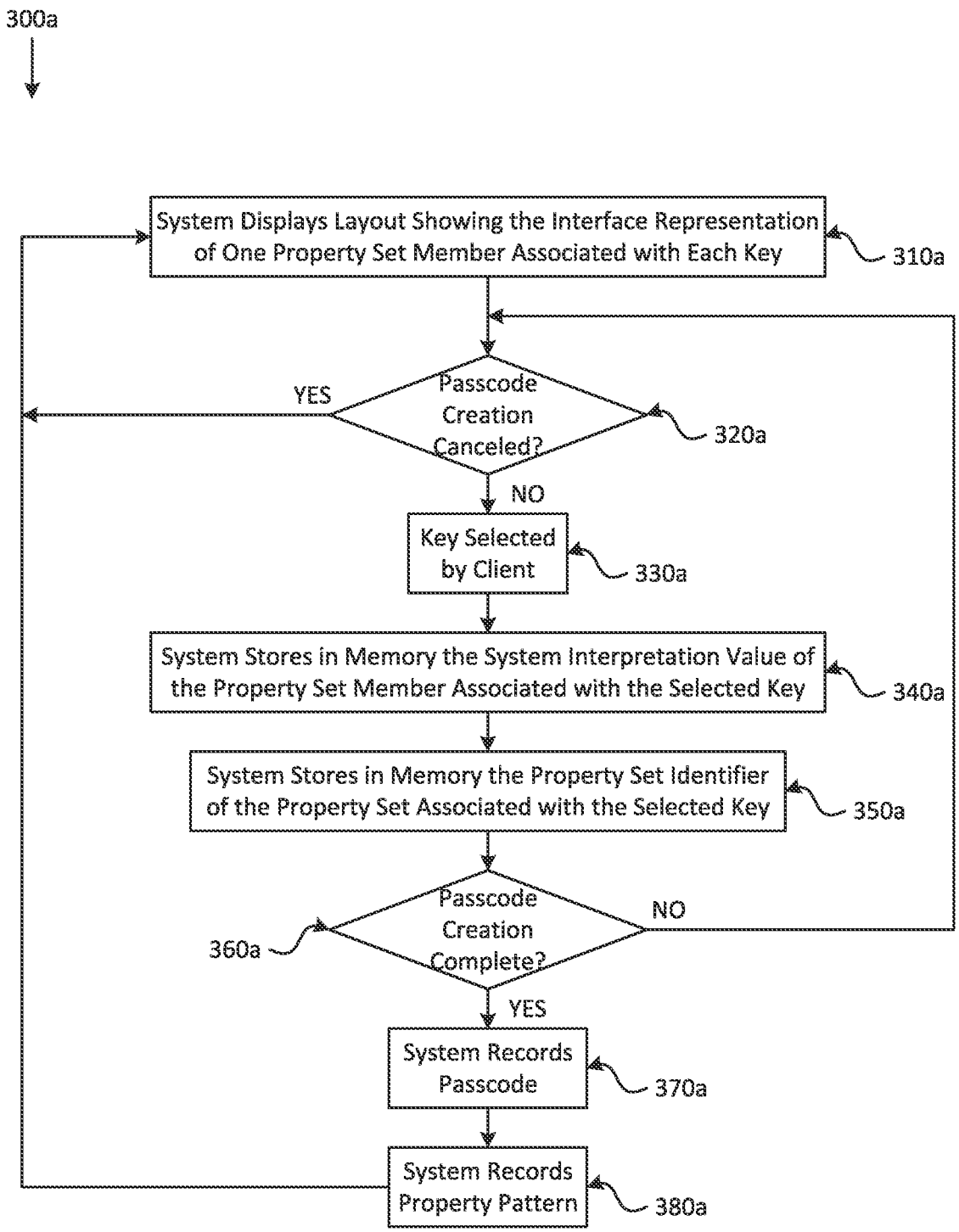
FIG. 3a illustrates an alternative flow diagram for creating a passcode.

The passcode validation process can be augmented by adding the use of a property pattern. FIG. 3*a* illustrates a method 300*a* for a passcode creation which captures the property pattern in addition to the passcode. At block 310*a* of method 300, the system either manifests the interface or the interface is built as a physical component of a device to be used for passcode creation. At any point during passcode creation, a user can choose to cancel method 300 at block 320*a*, thereby clearing any previously selected properties and beginning the process anew. Upon the selection of one of the keys at block 330*a*, the system records the interpretation value of the property at block 340*a* as well as the property set identifier at block 350*a* associated with the selected key for the present position in the passcode. At block 360*a* it is determined if the passcode creation is complete. If the passcode creation is complete at block 360*a*, then at block 370*a*, the system saves the interpretation values as a valid passcode for future use during passcode entry. The system also stores the property set identifier from which each property is chosen during passcode creation as the property pattern at block 380*a*.

For example, referencing FIG. 2, a row of keys is utilized for each property set; the top row being the shape 215 property set; the second row being the number 220 property set; the property set of Latin characters A through H 225 in the third row; the property set of Latin characters I through Q 230 in the fourth row; row five being the property set of Latin characters R through Z 235; and the property set of colors 240 (represented as patterns) in the last row. During passcode creation, if a number is chosen from the second row, an identifier representing the number property set is stored in the property pattern for the current position in the passcode. This is performed for each property selected, and once passcode creation is complete, each position of the passcode will be identified by a property set identifier.

Figure 5A:
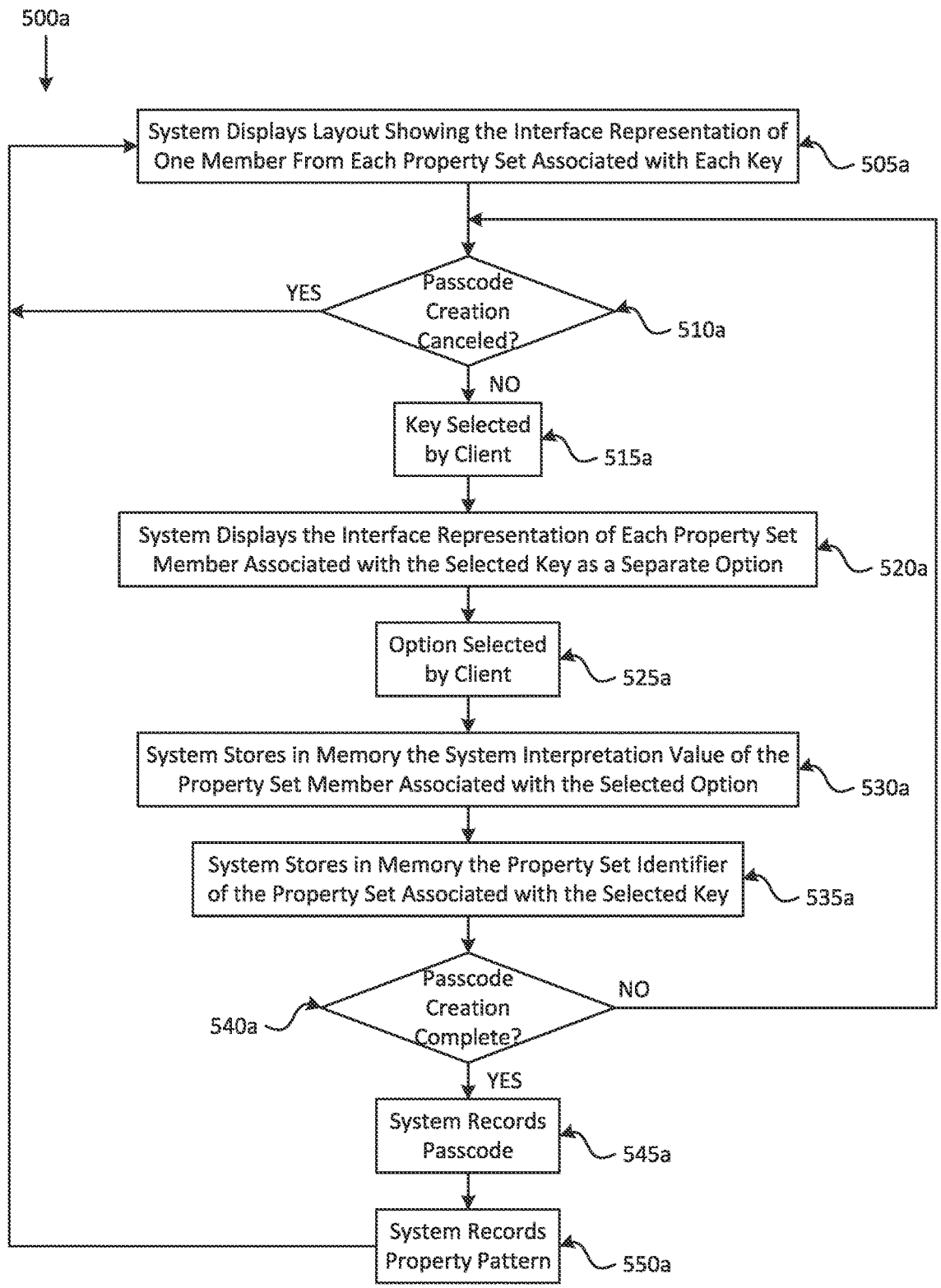
FIG. 5a illustrates an alternative flow diagram for creating a passcode.

FIG. 5*a* illustrated a method 500*a* for creating a password which captures the property pattern in addition to the passcode during passcode creation using virtual keys with multiple property associations. At block 505*a* of method 500, the system either manifests the interface or the interface is built as a physical component of a device to be used for passcode creation. At any point during passcode creation, a user can choose to cancel method 500*a* at block 510*a*, thereby clearing any previously selected properties and beginning the process anew. At block 515*a*, a user selects one of the keys. Upon the selection of one of the keys at block 515*a*, the system, at block 520*a*, manifests a virtual key for each of the properties associated with the selected key. At block 525*a*, a user selects one of the newly manifested virtual keys. When one of the newly manifested virtual keys is selected block 525*a*, the system records the interpretation value at block 530*a*. Moreover, at block 535*a*, the system records the property set identifier associated with the selected key for the present position in the passcode. At block 540*a*, it is determined if the password creation is complete. If the password creation is not complete at block 540*a*, method 500*a* proceeds to block 510*a*. If the password creation is complete at block 540*a*, method 500*a* proceeds to block 545*a* where the system saves the interpretation values as a valid passcode for future use during passcode entry. At block 550*a*, the system also stores the property set identifier from which each property is chosen during passcode creation as the property pattern.

In the above example using FIG. 4 as a passcode creation interface, each of the virtual keys manifested along the right 450, upon the selection of one of the initial virtual keys 410, represents the property from each of the property sets used during passcode creation. When one of the property specific virtual keys 450 is selected, the property set identifier for the property set to which the property belongs is stored in the property pattern for the current position in the passcode. This is performed for each property selected. Once passcode creation is complete, each position of the passcode can be identified by a property set identifier.

Figure 6A:
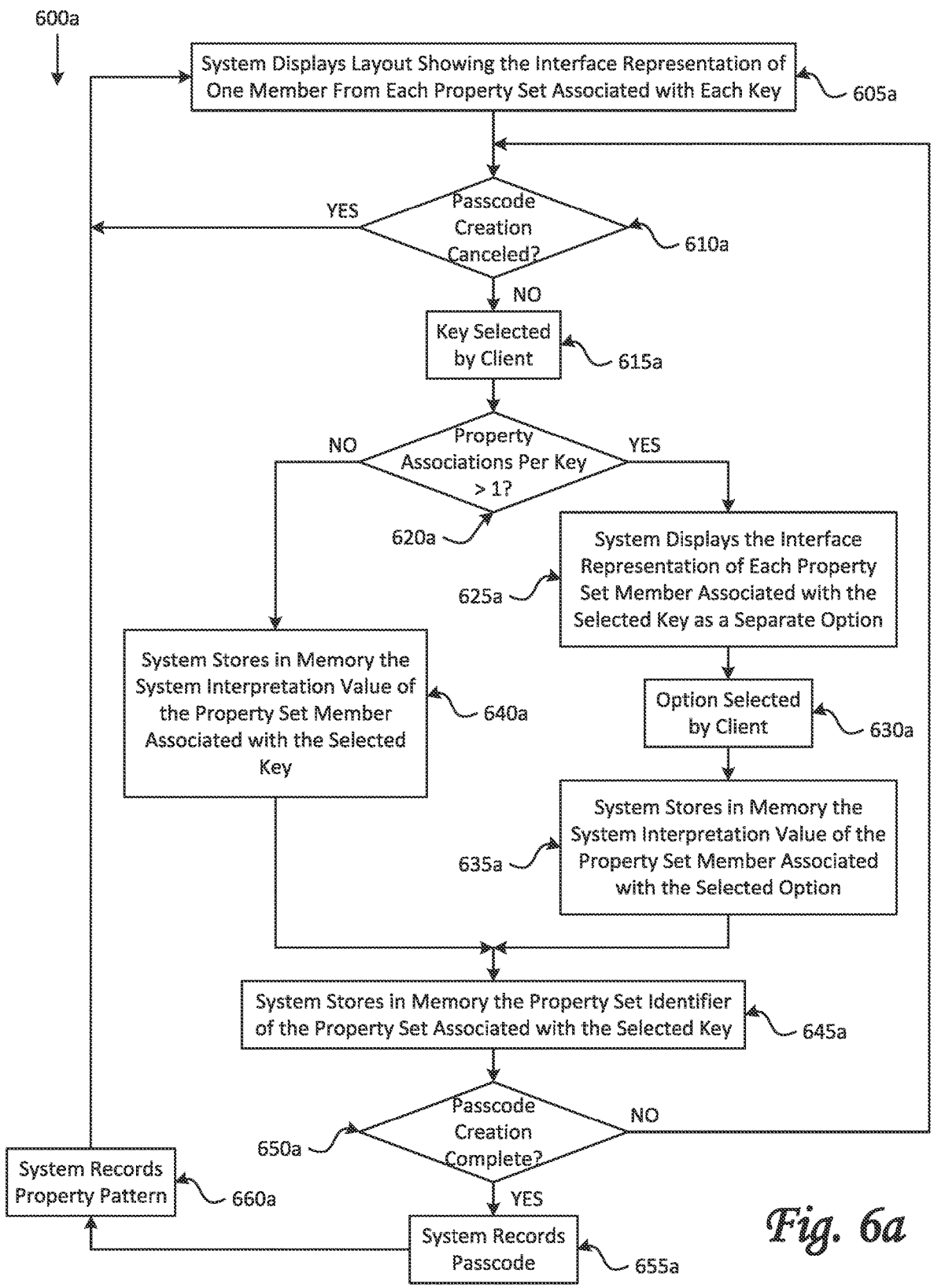
FIG. 6a illustrates an alternative flow diagram for creating a passcode.

FIG. 6*a* illustrates a method 600*a* shown in describes a scenario in which the processes described in FIG. 3*a* and FIG. 5*a* can be combined to accommodate passcode creation regardless of the number of properties associated with each virtual key. At block 605*a*, the system either manifests the interface or the interface is built as a physical component of a device to be used for passcode creation. At any point during passcode creation, a user can choose to cancel method 600*a* at block 610*a*, thereby clearing any previously selected properties and beginning the process anew. At block 615*a*, a user selected one of the keys. Upon the selection of one of the keys at block 615*a*, the system checks the number of properties associated with the selected virtual key at block 620*a*. For example, at block 620*a* it is determined if the number of properties associated with the selected virtual key is greater than one. If the virtual key is associated with multiple properties, that is, greater than one, the system, at block 625*a*, manifests a virtual key for each of the properties associated with the selected key. Then, at block 630*a* a user selects one of the newly manifested virtual keys. When one of the newly manifested virtual keys is selected at block 630*a*, the system records the interpretation value of the property associated with the selected key at block 635*a* for the present position in the passcode. If the originally selected virtual key is associated with a single property, the system records the interpretation value at block 640*a*. After the interpretation value is recorded, at block 645*a*, the property set identifier associated with the selected key is also recorded for the present position in the passcode. At block 650*a* it is determined if the password creation is complete. If the password creation is not complete at block 650*a*, method 600*a* proceeds to block 610*a*. This process is repeated until passcode creation is complete at block 650*a*, at which time the system saves the interpretation values as a valid passcode for future use during passcode entry at block 655*a*. The system also stores the property set identifier from which each property is chosen during passcode creation as the property pattern at block 660*a*.

Figure 7A:
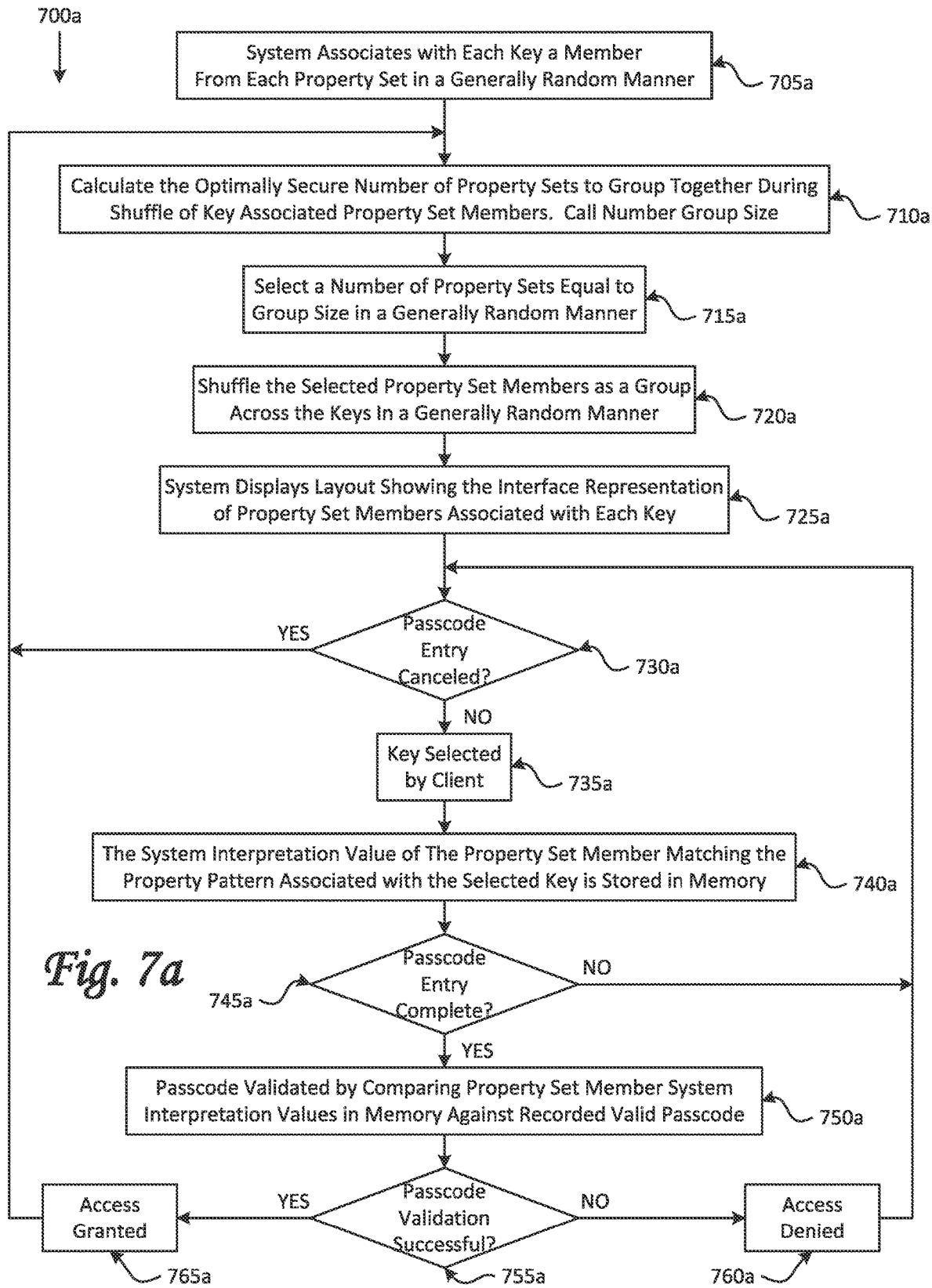
FIG. 7a illustrates an alternative flow diagram for the entry and verification of a passcode.
Figure 12:
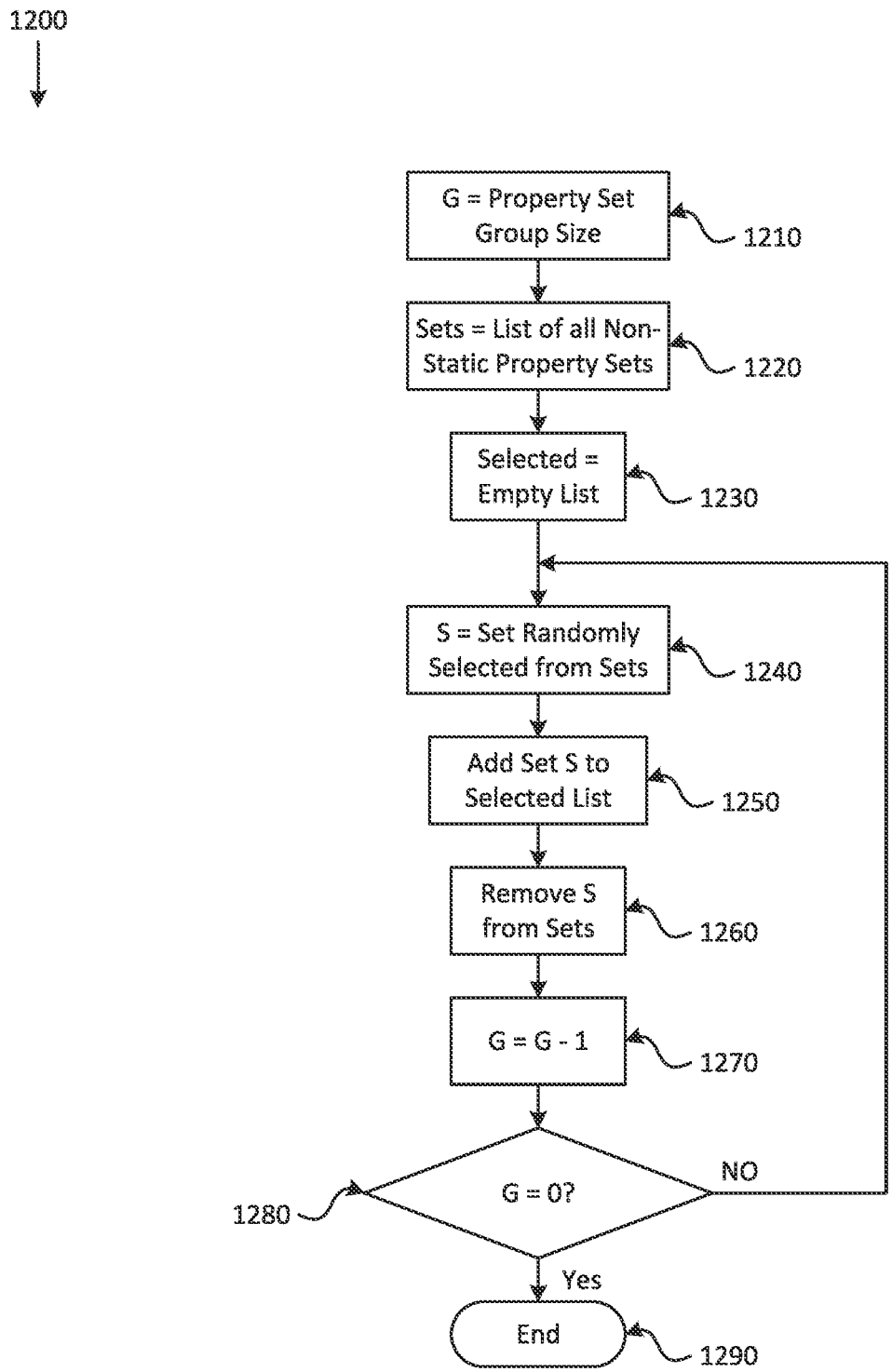
FIG. 12 illustrates a flow diagram as an example for selecting property sets to group during property shuffling.
Figure 13:
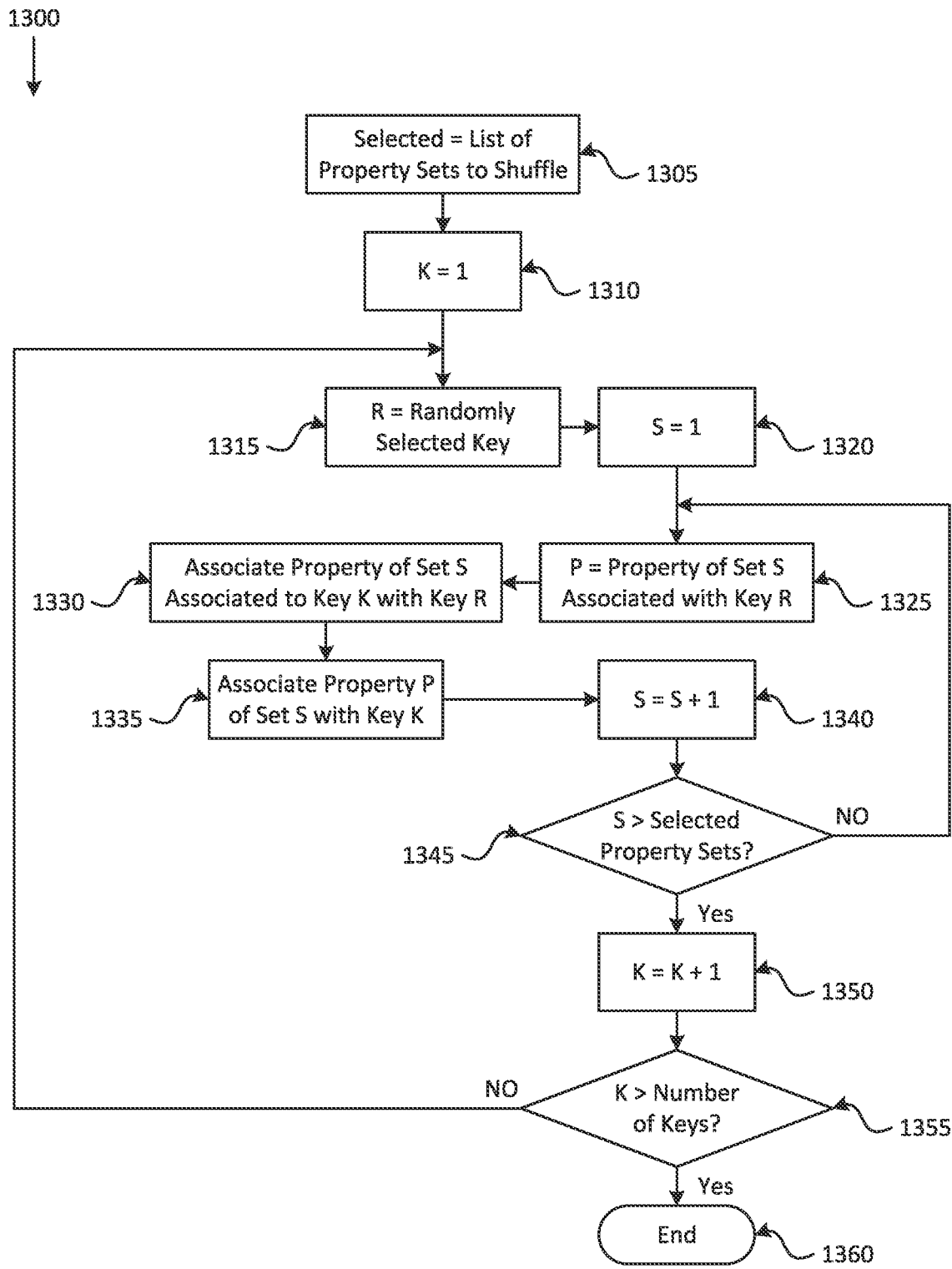
FIG. 13 illustrates a process flow diagram for shuffling of properties across virtual keys.

FIG. 7*a* illustrates a method 700*a* by which passcode entry could utilize a property pattern. At block 705*a* of method 700, the system associates a member from each property set with each virtual key in a generally random manner for which an example is depicted in FIG. 11. At block 710*a*, an optimally secure number of property sets to group together is calculated based on the number of property sets utilized. In an example embodiment, the number of property sets to group together is a whole number equal to half of the number of property sets. Many system factors may require alterations to this calculation dependent upon each specific implementation. At block 715*a*, a number of property sets equal to the previously calculated value are selected in a generally random manner for which an example is depicted in FIG. 12. The properties within the selected property sets are then re-associated collectively as a group across the plurality of virtual keys in a generally random manner at block 720*a* for which an example is depicted in FIG. 13. The updated interface is then manifested by the device at block 725*a* and is ready for passcode entry.

At any point during passcode entry, a user can choose to cancel method 700*a* at block 730*a*, thereby clearing any previously selected properties and beginning the process anew. At block 735*a*, a user selects one of the virtual keys. Upon the selection of one of the virtual keys by a user at block 735*a*, it is not obvious to an observer which of the properties is being chosen, as it may be any one of the plurality of properties associated with the selected virtual key. At this time, the system records the interpretation value of the property associated with the selected virtual key matching the property set of the stored property pattern at block 740*a* for the present position in the passcode. At block 745*a*, the system determines if the passcode entry is complete. If the passcode entry is not complete at block 745a, method 700a proceeds to block 730a. If passcode entry is complete at block 745a, the system, at block 750a, performs a comparison between a valid passcode which was previously created, and the passcode provided by the user. At block 755a, the system may determine if the entered passcode does not match the valid passcode. If the entered passcode does not match the valid passcode at block 755a, access to the system is denied at block 760a. If the comparison is equal at block 755a, any access which the system is designed to grant is provided to the user at block 765a.

An embodiment in which the system providing the passcode entry interface is separate from the system managing and validating passcodes can use a method 700b as shown in FIG. 7b. As shown at block 705b, the system starts by associating a member from each property set with each virtual key in a generally random manner for which an example is depicted in FIG. 11. At block 710b, an optimally secure number of property sets to group together is calculated based on the number of property sets utilized. In an example embodiment, the number of property sets to group together is a whole number equal to half of the number of property sets. Many system factors may require alterations to this calculation dependent upon each specific implementation. At block 715b, a number of property sets equal to the previously calculated value are selected in a generally random manner for which an example is depicted in FIG. 12. At block 720b, the properties within the selected property sets are then re-associated collectively as a group across the plurality of virtual keys in a generally random manner for which an example is depicted in FIG. 13. The updated interface is then manifested by the device at block 725b and is ready for passcode entry.

At any point during passcode entry, a user can choose to cancel method 700b at block 730b, thereby clearing any previously selected properties and beginning the process anew. At block 735b, a user selected one of the virtual keys. Upon the selection of one of the virtual keys by a user at block 735b, it is not obvious to an observer which of the properties is being chosen, as it may be any one of the plurality of properties associated with the selected virtual key. At this time, the system, at block 740b, records all of the properties associated with the selected virtual key for the present position in the passcode. At block 745b, the system determines if the passcode entry is complete. If passcode entry is not complete at block 745b, method 700b proceeds to block 730b. If passcode entry is not complete at block 745b, the passcode entry system contacts the passcode validation system and shares the entered passcode information. The passcode validation system, at block 750b, compares the property set identifier for each property selected at each position in the passcode to the property set identifier stored in the passcode pattern for the matching position, eliminating all failed matches. This elimination leaves a single value for each position, which is then compared to the valid passcode which was previously created. At block 755b, the system determines if the password validation is successful. If the entered passcode does not match the valid passcode at block 755b, access to the system is denied at block 760b. If the comparison is equal at block 755b, any access which the system is designed to grant is provided to the user at block 765b.

Stored passcode encryption can benefit greatly from the use of property patterns. In such cases, the interpretation values of the selected properties to use in validation can be determined by eliminating the properties for each position in the passcode which do not belong to the property set specified in the property pattern stored for the same position, leaving only a single interpretation value for each position. The resulting values would then be encrypted and compared to the previously encrypted stored passcode for validation.

A measure which may be employed to further increase security beyond the standard encryption of a stored password is to apply an additional encryption step prior to the standard encryption. When taking into consideration methods used to attack traditional password systems, such an enhancement would provide marginal improvement to security. However, due to the independence of property visual representations from system interpretation values in the present invention, the additional encryption step can result in a significant security increase. An exemplary embodiment may implement such an encryption method utilizing an encryption key for each user that is generated in a generally random manner, thereby producing a different result for each user, even in cases where multiple users may independently use the same password. Additionally, such an embodiment can extend each password into a minimum length prior to the final encryption, exponentially increasing the effort required to reveal the stored value.

Embodiments in which the device presenting the dynamic interface is separate from the authentication database, the incorporation of an additional communication between the authentication database and presentation device may be used to introduce a zero-knowledge protocol. A zero-knowledge protocol is a cryptographic process which ensures that the authentication database has no information which can be used to determine a password without mathematically breaking the algorithm. Due to the dynamic nature of the present invention, a typical zero-knowledge protocol cannot be used; therefore, the additional communication is required. In an exemplary embodiment, this communication would include transmission of a value, or set of values, derived from the system interpretation values comprising a password. Once received by the presentation device, a cryptographic transformation is performed on the value which is secret to the presentation device, thereby producing a result which is completely unknown to the authentication database. This result is then input as the password component into a defined zero-knowledge protocol between the authentication database and presentation device for final verification.

Embodiments may exist in which a single passcode is used to provide access to information and/or functionality within a system or to control physical access to an area of a facility. Alternative embodiments may be implemented in which passcodes are specific to individuals or groups of individuals, requiring users to first identify themselves to the system before or during passcode entry. Further embodiments may be created in which individuals, groups, and/or points of access may utilize different property sets or interfaces through which passcodes are entered. It is also conceivable to utilize different property sets or interfaces on a contextual basis, dependent upon criteria such as the information being accessed, or transaction being performed.

Multi-factor authentication may be utilized by a system employing the present invention by assigning different property sets, or different property sets and different interfaces to system users. Such assignments may be automated by the system or by providing users of the system with configuration options from which to choose.

Figure 28:
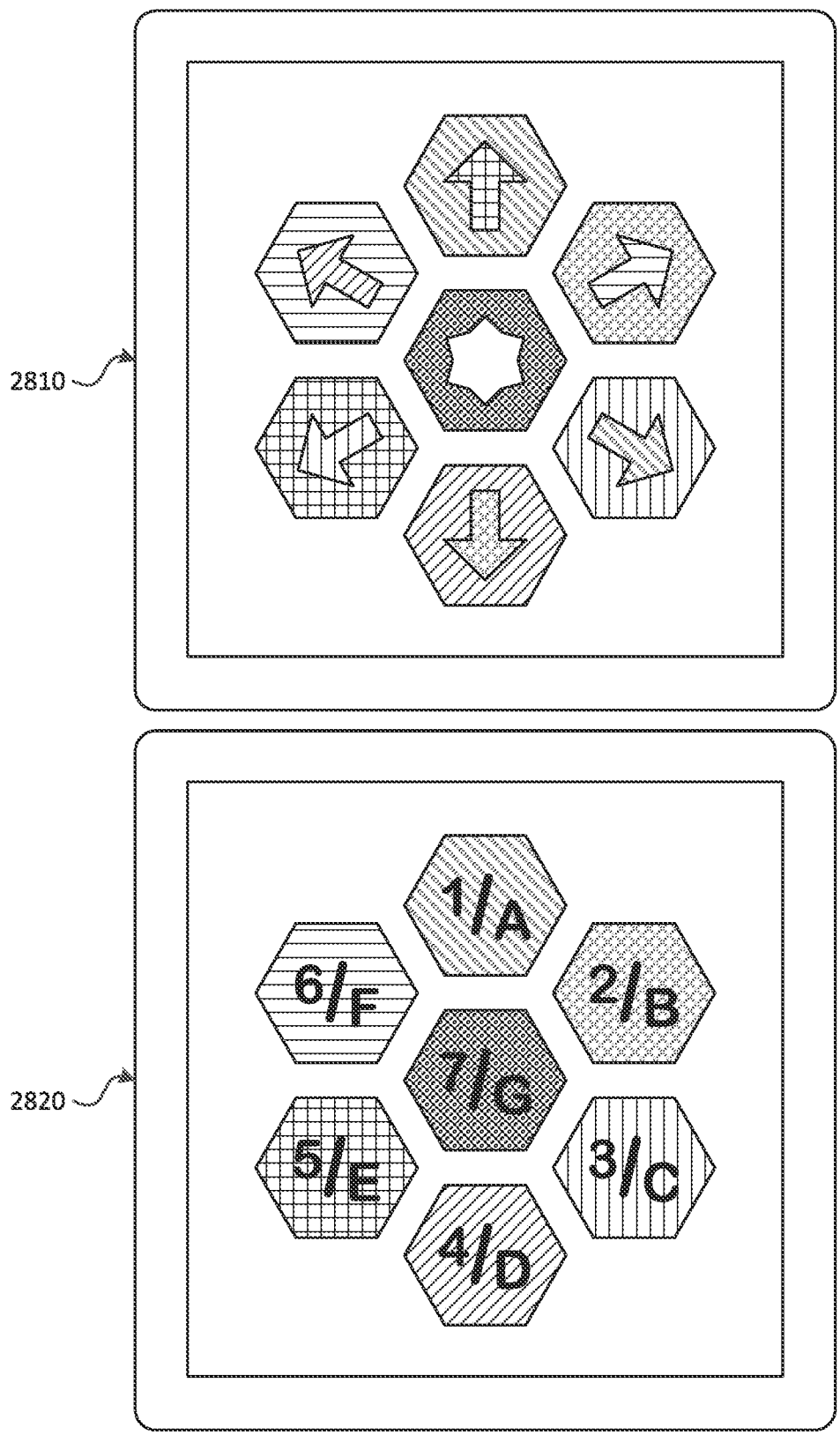
FIG. 28 illustrates an embodiment utilizing multi-factor authentication.

FIG. 28 depicts an embodiment in which the interface is shared between users while the property sets differ. While one user is configured to have an interface having seven virtual keys, each of which is associated with properties having graphical interface representations 2810, another user is configured to have an identical interface of seven virtual keys, but which utilizes properties having interface representations relating to numeric and alphabetic types 2820. In such an embodiment, the passcode of the first user may not be able to be entered on the interface provided to the second, and vice versa. To successfully pass validation, the first user would not only have to know the second user's passcode but would also be required to have access to the second user's interface for passcode entry.

Figure 29:
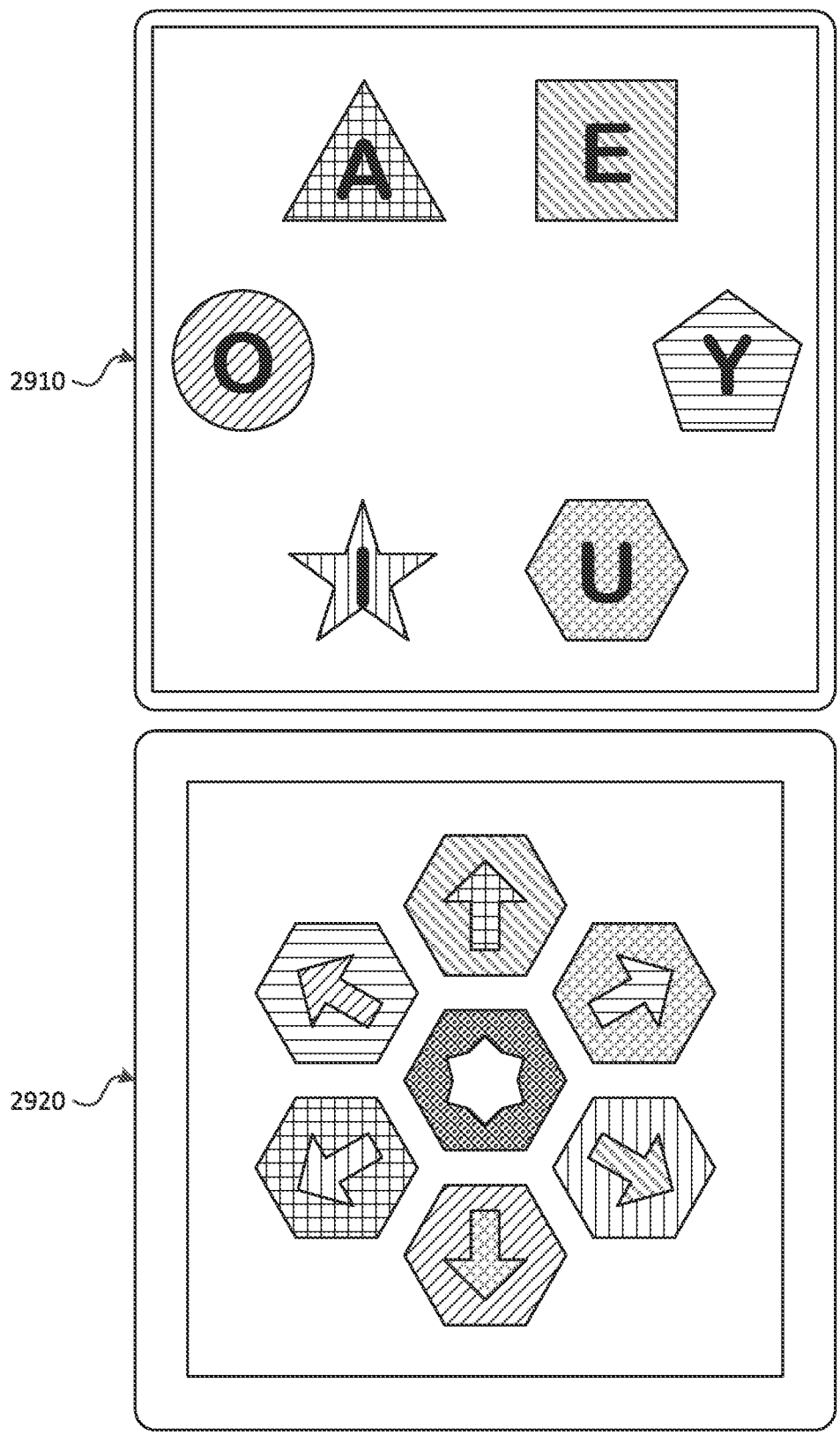
FIG. 29 illustrates another embodiment utilizing multi-factor authentication.

Another embodiment demonstrating Multi-factor authentication is shown in FIG. 29. This embodiment utilizes a plurality of separate interfaces as well as different property sets. Similar to the previous embodiment of FIG. 28, the first user's passcode can only be successfully entered using first configured interface 2910, while the same is true for the second user and second configured interface 2920.

Many current systems effectively thwart forms of fraud through the utilization of mutual authentication in the form of what has come to be known as a "site key". Essentially, mutual authentication is an indicator to the user that the system which they are presently accessing is a legitimate system, and not a malicious system designed to collect user login credentials. This form of fraud works by convincing the user that they are accessing the intended system when, in actuality, the user has been deceived into visiting a system that has been designed to emulate the target system. When the user then attempts to access the system by providing their credentials, the fraudulent system records the user's data entry, which can then be used by those other than the user to access the legitimate system in the guise of the user. Some of the more sophisticated instances of such fraudulent systems can conceal the fact that they are fraudulent by automatically directing the user to the legitimate system once their credentials have been collected, thereby being entirely transparent to the user.

The embodiments described in FIG. 28 and FIG. 29 can be used as a form of mutual authentication in addition to providing multi-factor authentication. Because individual users may be configured to use different interfaces and property sets, users can easily identify if the interface which they are provided for passcode entry is originating from a legitimate system, since only the legitimate system would have knowledge of users' configured interfaces. Additionally, depending on the interfaces and property sets used by the implementation, it may even be impossible for a user to successfully provide their passcode to a fraudulent system. The greater the number of interface and property set variations, the larger the fundamentally unique combinations will exist for use by users of the system.

Figure 30:
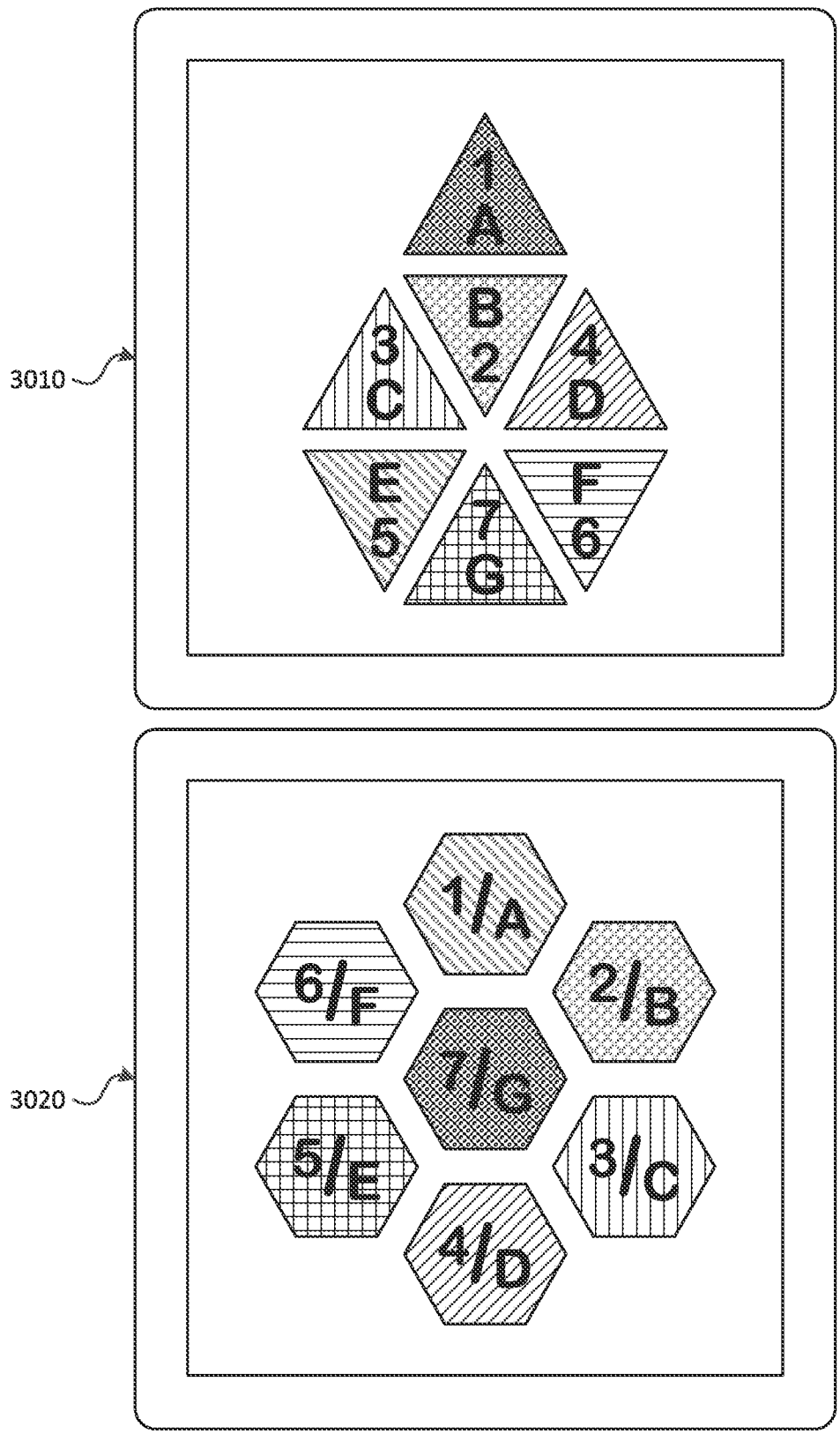
FIG. 30 illustrates an embodiment utilizing mutual authentication.

An additional embodiment taking advantage of the mutual authentication functionality is depicted in FIG. 30. This example demonstrates the use of different interfaces for the first user 3010 and the second user 3020, while sharing the same properties across both interfaces. Because the same properties are utilized for both interfaces, and both users' passcodes can be successfully entered using either interface, an exemplary embodiment of this type enforcing multi-factor authentication would include the use of a unique interface identifier assigned to each interface within the system to distinguish between interfaces. Such an embodiment would include the interface identifier assigned to the interface used for passcode entry in any transmissions for validation purposes.

An exemplary embodiment of the present invention employing a device 800 having a graphical display 805 and physical keys 830 is demonstrated in FIG. 8. As with all previously described embodiments, the selection of a key indicates the selection of one of the properties with which it is associated without disclosing the actual property selected. This embodiment demonstrates the use of the present invention on devices and systems not having touch sensitive displays. The virtual keys 810 which are manifested on the graphical display 805 are associated with the physical keys 830 through common relative positioning. For example, the virtual key having the interface representation of the number property "3" is associated with the physical key "1", the virtual key having the interface representation of the number property "4" is associated with the physical key "6", etc. It is apparent to those of ordinary skill in the art that this type of positional association allows the use of the present invention with any physical key configuration.

Properties are not limited to characters, numbers, colors, or patterns. Any distinguishable property within the capabilities of the device may be used. Some additional examples may include, but are not limited to, images, animations, sounds, textures, topography, haptic feedback, or more abstract differences such as the location or orientation of a virtual key on the interface, or the relative position of a virtual key to other components of the interface.

FIG. 11 illustrates method 1100 by which the system initially associates a member from each property set with each virtual key in a generally random manner. At block 1105 of method 1100, a variable S is initialized with a value of one. At block 1110, a variable Key is initialized with List of all Keys. At block 1115, a variable P is initialized with a value of one. Then, a value is randomly generated through the use of a random number generation function provided by the development language being utilized for system development. This random number is then used to select one of the keys K at block 1120. Then, the randomly selected key K is associated with property P of property set S at block 1125. At block 1130, the randomly selected key K is removed from the list of all keys K. The variable P is then incremented by one at block 1135. At block 1140 it is determined if the value of variable P is greater than the number of properties in set S. If the value of variable P is not greater than the number of properties in set S at block 1140, method 1100 proceeds to step 1120 where a new key K is randomly selected. If the value of variable P is greater than the number of properties in set S at block 1140, the variable S is incremented by one at block 1145. At block 1150 it is determined if the value of variable S is greater than the number of property sets. If the value of variable S is not greater than the number of property sets at block 1150, method 1100 proceeds to block 1110 where the variable Keys is initialized. If the value of variable S is greater than the number of property sets at block 1150, then method 1100 ends at block 1155.

FIG. 12 illustrates an example method 1200 through which property sets are selected to be shuffled in a generally random manner. At block 1210 of method 1200, a number of property sets to group is calculated and assigned to variable G. At block 1220, the variables Sets are initialized as list of all non-static property sets. At block 1230, variable Selected is initialized as an empty list. A value is randomly generated through the use of a random number generation function provided by the development language being utilized for system development. This random number is then used to select one of the sets S at block 1240. At block 1250, the randomly selected set S is added to the list of selected sets Selected. The randomly selected set S is then removed from the list of all non-static property sets at block 1260. The variable G is then decremented by one at block 1270. At block 1280, it is determined if a value of the variable G is equal to zero. If the value of variable G is greater or less than zero at block 1280, method 1200 proceeds to block 1240 where a new set S is randomly selected. If the value of variable G is equal to zero at block 1280, method 1200 ends at block 1290.

FIG. 13 illustrates an example method 1300 by which the system shuffles the property associations with the keys in a generally random manner. At block 1305 of method 1300, the property sets to shuffle are selected and set to the Selected variable. At block 1310, variable K is initialized. A value is randomly generated through the use of a random number generation function provided by the development language being utilized for system development. This random number is then used to select one of the keys R at block 1315. A variable S is initialized at block 1320. A variable P is set to the property of set S which is currently associated with key R at block 1325. The randomly selected key R is associated with the property of set S which is currently associated with key K at block 1330. The key K is associated with the property P of set S at block 1335. The variable S is then incremented by one at block 1340. At block 1345 it is determined if the value of variable S is greater than the number of property sets in the list Selected. If the value of variable S is not greater than the number of property sets in the list Selected at block 1345, method 1300 proceeds to block 1325 where the variable P is set. If the value of variable S is greater than the number of property sets in the list Selected at block 1345, then the variable K is incremented by one at block 1350. At block 1355 it is determined if the value of variable K is not greater or less than the number of keys. If the value of variable K is not greater or less than the number of keys at block 1355, method 1300 proceeds to block 1315 where a new key R is randomly selected. If the value of variable K is greater than the number of keys at block 1355, method 1300 ends at block 1360.

Figure 23:
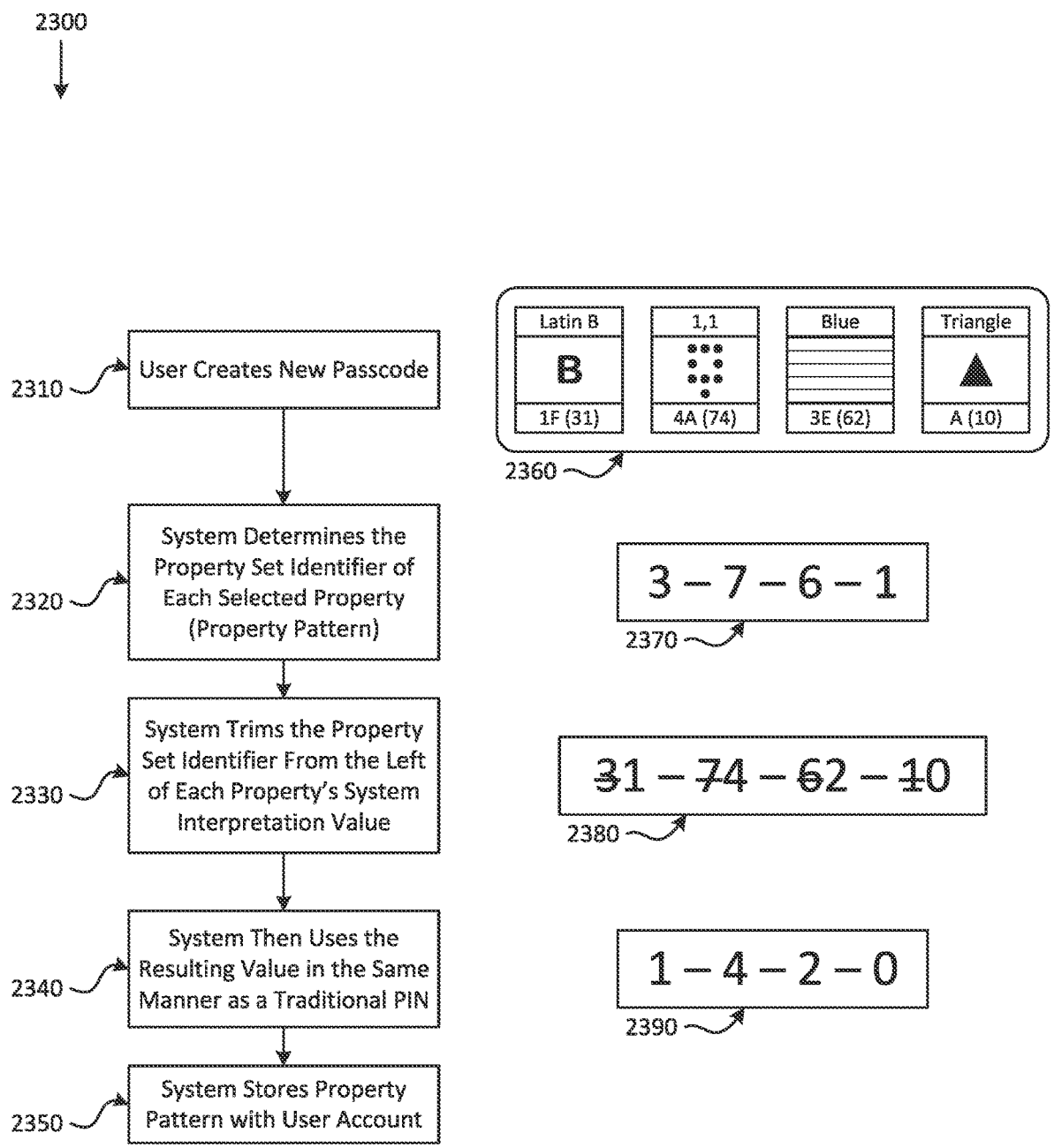
FIG. 23 illustrates a flow diagram of a method for creating and converting a passcode into a traditional PIN.

An embodiment having the condition that the system interpretation values of properties that include the set identifier of the property set to which they belong followed by a single digit decimal value can be converted into a traditional PIN during passcode creation to be utilized by current systems following method 2300 illustrated in FIG. 23. At block 2310 of method 2300, a user creates a new passcode, for example, passcode 2360. After the user creates the new passcode 2360 at block 2310, the property set identifier of each selected property, also known as the property pattern 2370, is determined at block 2320 by the system. The system then, at block 2330, trims the property set identifier from the left of the system interpretation value of each property shown as 2380. The remaining portion of each system interpretation value is a single digit, which, in a passcode system utilizing a four-property passcode, yields four decimal digits 2390 that can be utilized as a traditional PIN at block 2340. The system stores the property pattern at block 2350 in association with the user's other account information.

Figure 24:
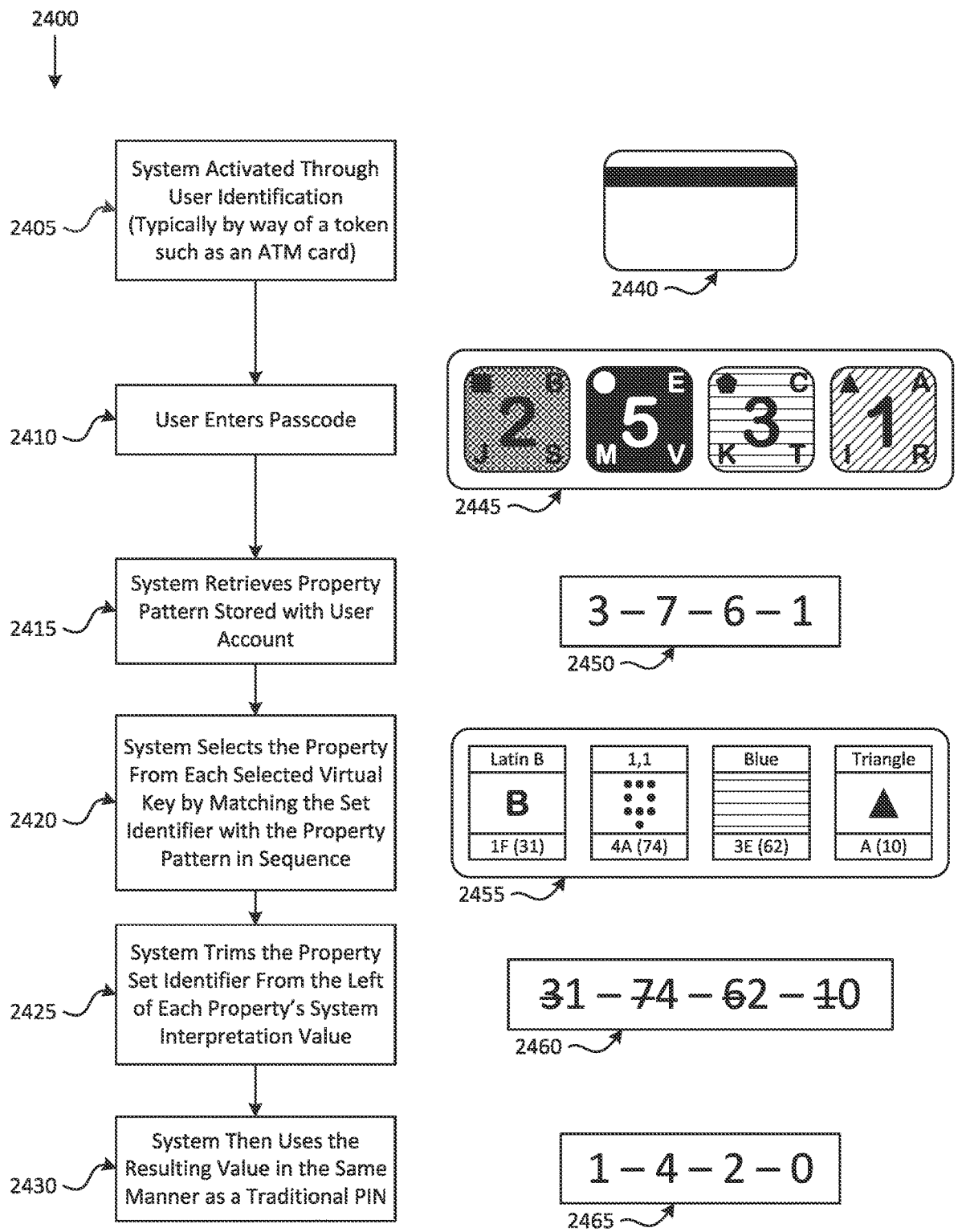
FIG. 24 illustrates a flow diagram of a method by which a passcode may be entered for account access and converted into a traditional PIN.

FIG. 24 illustrates a method 2400 by which a passcode can be converted into a traditional PIN during passcode entry and validation for use with current systems. As in currently utilized systems, at block 2405, the user presents to the system a means of identification, for example an ATM/debit card shown as 2440. Next, at block 2410, the user enters a passcode 2445 into the provided passcode interface. At block 2415, the system retrieves a property pattern, shown as 2450, stored with their user account information. Following the retrieval of the property pattern 2450 stored with their user account information at block 2415, the system selects the properties show as 2455 corresponding to the retrieved property pattern at block 2420. The system then, at block 2425, trims the property set identifier from the left of each of the entered properties' system interpretation values, resulting in a single decimal digit for each property shown as 2460, a four-digit PIN 2465 in cases of a four-property passcode, which is then utilized in the same manner as a traditional PIN at block 2430.

Figure 33:
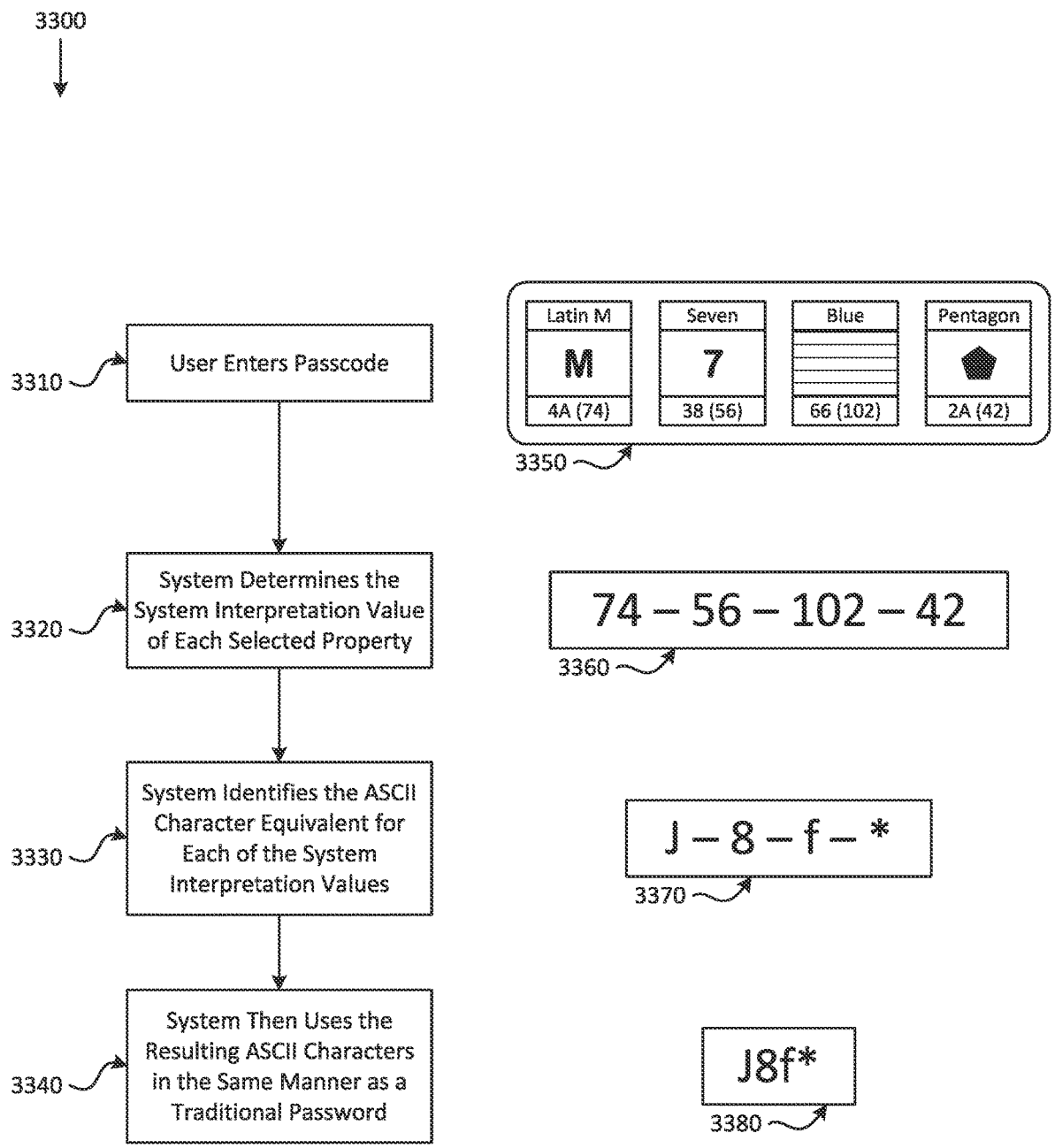
FIG. 33 illustrates a method for converting a passcode into an alphanumeric password.

FIG. 33 illustrates a method 3300 by which a passcode can be converted into a traditional ASCII password during passcode entry and validation for use with current systems. This example method 3300 is demonstrated using the standard ASCII printable character values 3200 provided for reference in FIG. 32 along with the property set configuration 3100 presented in FIG. 31. Many systems may require users to identify themselves through the use of a token or user ID before providing a password, while other systems may require only the password alone. In either scenario, the conversion of a passcode into and ASCII password is equally applicable. At block 3310, the user enters a passcode shown as 3350 into the provided passcode entry interface and the system determines the pertinent properties through processes previously described. The system then, at block 3320, identifies the interpretation values, shown as 3360, assigned to each of the passcode properties. Next, the ASCII character equivalents, shown as 3370, are found matching each of the interpretation values at block 3330. Finally, at block 3340, the ASCII characters are concatenated together into a single value, shown as 3380, which is then utilized in the same manner as a traditional password.

An example is shown in FIG. 31 in which the interpretation values of properties are changed while the interface representation remains unchanged. When compared to FIG. 22, it is apparent that the properties which are members of each property set remain the same while the interpretation values change. Additionally, in the example, the property set identifiers have been modified, however this is not a requirement of the system, as the necessity of such a change will be determined by the needs of each specific implementation. In addition to property interpretation values and property set identifiers, any other identifiers, such as interface identifiers, can also be changed as part of such a process. An important capability of the system as a result of the ability to change the interpretation values independently of the interface representation is that it allows the system to make this change without interrupting users continued use of existing passcodes.

An exemplary embodiment of the present invention periodically changing the property interpretation values 2200, either manually through administrative processes, or automatically by way of a computerized procedure, or a combination of both manual and automated processes would eliminate the usefulness of any data intercepted over the course of numerous transmissions. Users of the system would be unaware that the interpretation values are being changed, as the interface representations known by the users during passcode entry would remain constant. Such an embodiment might have, at some point, the property interpretation values shown in FIG. 22, then, at a later time, those defined in FIG. 31.

In the event that a system data breach occurs, and the property interpretation values are compromised, user authentication can be made secure simply through the assignment of new interpretation values. Due to the fact that interface representations are disparate from interpretation values, having no relationship with one another other than through configuration, it is impossible to directly determine one from the other for any property. This inherent attribute of the system ensures the integrity of user passcodes even if a system data breach occurs.

Another benefit of the present invention realized by the independence of property interpretation values from interface representations is that implementations may have uniquely distinct sets of interpretation values for a common set of property interface representations. This capability allows users to use the same passcode across multiple implementations, while at the same time having entirely different interpretation values stored by each system, effectively insulating implementations from one another in the event of a data breach.

An additional exemplary embodiment of the present invention would allow property interface representations to be changed without modification to the interpretation values. Such an embodiment could be utilized to provide alternative interface representations to accommodate individuals who are colorblind or to implement a system in which users can choose from a plurality of property set options allowing some customizability to users of the system. These alternative interface representations could share the same interpretation values, thereby being identified as identical properties by the system.

Embodiments may be implemented leveraging alternative input representations to integrate with any system allowing any form of input. Such embodiments simply require that the values produced by a method of input be associated as alternative input representations of properties through system configuration to be equivalent to the selection of the properties directly.

A primary example of the use of alternative input representations was previously described when utilizing a physical keypad depicted in FIG. 8. Through the previously described embodiment, the physical keys are associated to the virtual keys through similar relative positioning. However, the association is not required to be based on position, as the numeric values represented by both the physical and virtual keys may be used as a logical form of association. In this scenario, the selection of the physical key having a number would be identified by the system as a selection of the virtual key being associated with the property having an interface representation depicted by the graphical image of the same number. Following similar reasoning, any property set may be utilized in association with the physical keys, in which cases system users could be allowed the ability to choose specific associations between each physical key and a virtual key property.

Additional alternative input representation embodiment examples can be easily conceived. A second example would be the placement, in chronological sequence, relative position, etc., of objects representing properties upon a surface capable of identifying each placed object. A third example could utilize voice input in which a system user vocalizes a sound, word, or phrase to represent a property. Yet another implementation might identify each of the fingerprints of a system user with a property. In these cases, or any others imaginable, these alternate forms of input are identified by the system as equivalents to the more traditional graphical property interface representations.

Additionally, these alternative interface representations can be defined and customized by system users within the capabilities of the system. For instance, in the second example above, a user might choose a square object to represent a property which is graphically represented as a square, while a different user may choose the same object to represent the color green, the number 5, or the letter A, etc.

In the third example, a user could speak the word "blue" to represent the property graphically represented by the color blue, but they may just as easily speak the word "sky", or any other sound, word, or phrase which the user mentally associates with the color blue. In an embodiment such as described in the fourth example, a user might associate each fingerprint with different properties in their passcode, thereby logging in with a finger sequence. This concept can also be considered to include abstract properties, such as association to virtual key position.

Such embodiments would not accept the alternative input representation alone as a form of passcode input, but rather, the system would select virtual keys being associated with the properties identified by the alternative input representations as if they were input through the use of a graphical interface.

All of these methods, while keeping secret an actual passcode, would reveal to any observers a sequence of some form which would identify the passcode to the system. To prevent this, system users could instead choose to associate alternative input representations to all of the properties within a single property set. By doing so, a user is able to select any virtual key through one of the alternative input representations. Continuing with same second example embodiment above, a user could associate each object with a different number, and the placement of an object on the surface would indicate the selection of a virtual key associated with the property having the graphical property interface representation of a number, to which the user has associated the alternative input representation of the object. In the vocal example, a user could speak sounds, words, or phrases being alternative input representations of properties having graphical property interface representations depicted as letters. Since keypads commonly contain ten keys, a graphical interface designed similarly would easily allow users to associate each of their fingerprints with properties within a set, such as a property set representing colors.

While the provided example embodiments each focus on individual forms of alternative input representation, it is to be understood that systems supporting multiple forms of input could allow users to combine these forms to be used together during passcode entry. Selection of virtual keys in this manner provides system users with the ability to not only specify their passcode to the system without directly disclosing the passcode, but also provides a further level of protection by obscuring the selection of each virtual key. Due to this added level of obfuscation, systems may be easily secured through the use of single value passcodes, in which system users select virtual keys being associated with both the property targeted by the alternative input representation as well as the single property defined as the correct passcode.

Alternative input representations can also be used to facilitate additional multi-factor authentication mechanisms. Three standard primary authentication factor types have been identified: knowledge, ownership, and identity. A password is a model example of the knowledge factor, just as a digital device and user biometric are for ownership and identity factors, respectively. As previously described, the present invention supports multi-factor authentication through the combination of password (knowledge factor) and user-specific property sets and interfaces, which serve as an ownership factor in that the property sets or interface belongs to the user through their configuration. While voice or fingerprint recognition can be used through alternative input configuration to select virtual keys, the same voice or fingerprint reading may also be validated biometrically against previously enrolled biometric samples. The biometric authentication introduces no additional friction to the user experience of utilizing the same feature (voice, fingerprint, etc.) to specify their passcode. Similarly, digital devices can be incorporated as an ownership factor into the authentication process.

An exemplary embodiment of the present invention utilizing digital devices may present a user with an interface consisting of a plurality of virtual keys, where each of these keys may be blank, having no visible property interface representations. The virtual keys, however, are associated with properties in the manner of other embodiments, but the properties are configured to be manifested on one or more devices possessed by the user. For example, the user may be wearing an audio device, such as a pair of headphones, then when the user activates one of the virtual keys, possibly by hovering over it using a digital device, such as a computer mouse, using the TAB key on a keyboard to highlight a virtual key, or any other method provided to the user to specify a virtual key, a musical sequence specific to the virtual key could be played through the headphones. In such an embodiment, musical sequences would be the interface representations of properties associated to the virtual keys. It will be apparent to anyone skilled in the art, that any number of different devices having any conceivable form of output manifestation may be utilized by the present invention independently from, or in combination with, one another as property interface representations.

Another exemplary embodiment of the present invention may present a user with an interface such as is depicted in FIG. 1, while also having additional properties which are manifested through other devices. Such an embodiment would provide a wider variety of properties from which users could choose to utilize in passcodes, while also increasing the overall security, because any number of the passcode properties may be manifested in a way that is completely private to the users. Additionally, allowing users the ability to configure the system to utilize other personal devices produces mutual authentication between the user and the system, because only the legitimate system will be aware of the configured devices.

Yet a third embodiment may not present a user with any form of visual display, allowing the user to iterate through a sequence of entirely digital virtual keys using a device functionally similar to an iPod. In this case, the property associations to the virtual keys would be assigned randomly in a manner similar to that described for other embodiments, resulting in the virtual key selection sequence for passcode entry being different for each authentication.

Through property chaining, embodiments of the present disclosure can establish relationships between properties within different property sets through configuration. This chaining relationship between properties causes implementing embodiments to ensure that chained properties will always be associated with the same virtual key following a shuffle. An example would be the chaining of the property graphically represented by the color red to the property representing the number 6. Because the 6 and red properties are defined within different property sets, number and color respectively, they can be, and always will be, associated to the same virtual key in an embodiment which is configured to have these two properties chained.

Property chaining, while relatively trivial to most system users, provides a substantial benefit to those who are visually impaired. System users who may have difficulty working with visual interfaces can utilize other forms of input through alternate input representations. However, unless such individuals can easily determine how properties are associated to virtual keys on the interface, they will have to resort to direct entry of their passcode through the alternate input interface. By chaining properties to one another, these users can know in advance that properties within their passcode will always be associated with virtual keys also being associated with other specific properties. This allows users to decide at the time of passcode entry between a variety of entry options. For example, a system user having a passcode of 6-F-blue, and their configuration defined such that the 6 and red properties are chained, F and star properties are chained, and blue and 3 properties are chained, can select the virtual keys through the selection of either of the properties within each chain using alternate input representations, essentially providing two options for each passcode value for a total of eight combinations. Visually impaired users authenticating through such an embodiment could use a speech recognition interface to enter their passcode differently each time.

Property chaining can be applied at any level, from individual user settings up through system wide configuration, and may include multiple configuration layers within the system. Also, property chaining may be implemented to create chains of any length by chaining a first property to a second, then the second property to a third, and so forth. Additionally, as described in the previous examples, chained properties are not required to be between the same two property sets, but can include any properties from any property sets, the only restriction being that a given property set can only be represented a single time within any particular chain.

The present invention supports the implementation of embodiments leveraging one-time-passwords (OTPs). OTPs are typically achieved either by providing to a user a randomly generated password through a secure method, typically on-screen, through e-mail, or a mobile device text message. Then requesting the user to enter the provided password, or alternatively, through the issuance of a token to a user which, through an algorithm, manages an ever-changing value while at the same time maintaining synchronicity of the value with a value managed by a remote server. Through both methods, the value is not predictable, and a comparison is made between the value supplied by the user and the server value for verification.

Figure 35:
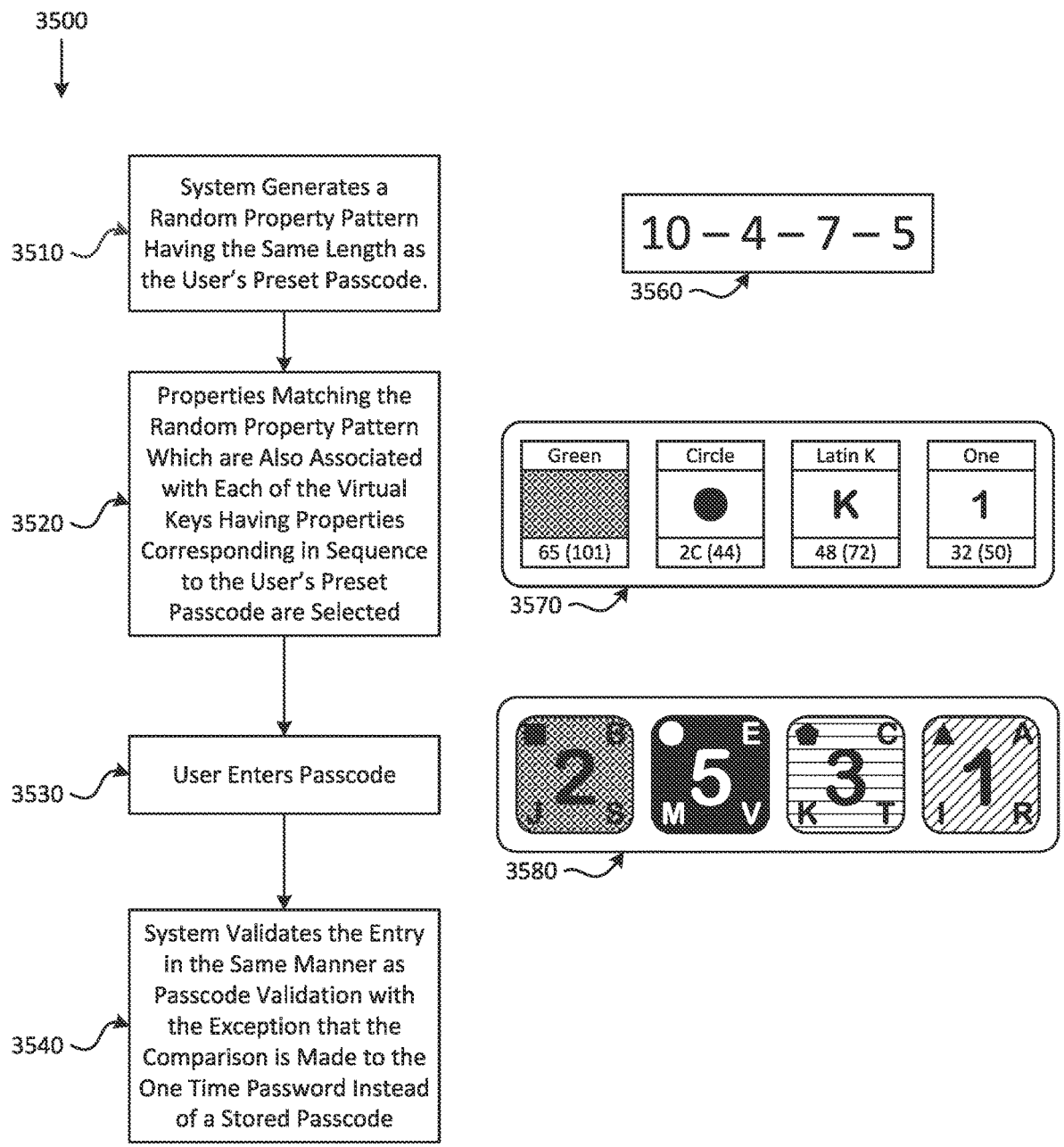
FIG. 35 illustrates a method for implementing one-time-passwords using a passcode entry interface.

While the present invention may be utilized in a traditional manner, in which the user enters a delivered OTP using the passcode interface, more secure alternative OTP methods are also possible, and less costly than the issuance of a token, while remaining equally effective. FIG. 35 illustrates a method 3500 by which OTP functionality can be employed with an embodiment of the present invention. At block 3510 of method 3500, after the properties are shuffled and associated with the virtual keys, but before the passcode interface is presented to the user for passcode entry, the system generates a random property pattern, shown as 3560, having the same length as the user's predefined stored personal passcode. At block 3520, the system then selects properties, shown as 3570, matching the random property pattern which are also associated with each of the virtual keys having properties corresponding in sequence to the user's predefined stored personal passcode. This randomly selected passcode is the OTP. The passcode entry interface is then presented to the user, and the user enters their predefined stored personal passcode, shown as 3580, at block 3530. Once the system receives the entered passcode, it validates the passcode entry through comparison with the previously randomly selected OTP, in the same manner as normal passcode validation at block 3540. The OTP may be validated instead of, or in addition to, the user's actual stored passcode, based on the needs of the implementation.

If it is a requirement of the system to explicitly deliver an OTP to a user, thereby proving ownership of a device or other delivery mechanism, the traditional delivery approach may be performed, then the user could utilize the passcode interface to provide their passcode followed by the OTP, or visa-versa, in a single entry.

A common, broadly used fraud prevention measure is session authentication. Through session authentication, a system can verify that information collected from a user is provided in the present, and not a replication of data sent at some time in the past during a previous event. Also, session authentication can be used to ensure the validity of the information as originating from the intended source. Session authentication requires that an event, such as a log in or transaction, be uniquely identified so that the current instance of the event can be differentiated from previous events. The most common forms of session authentication are encryption, in which new keys are generated for each session, and OTPs.

Figure 36:
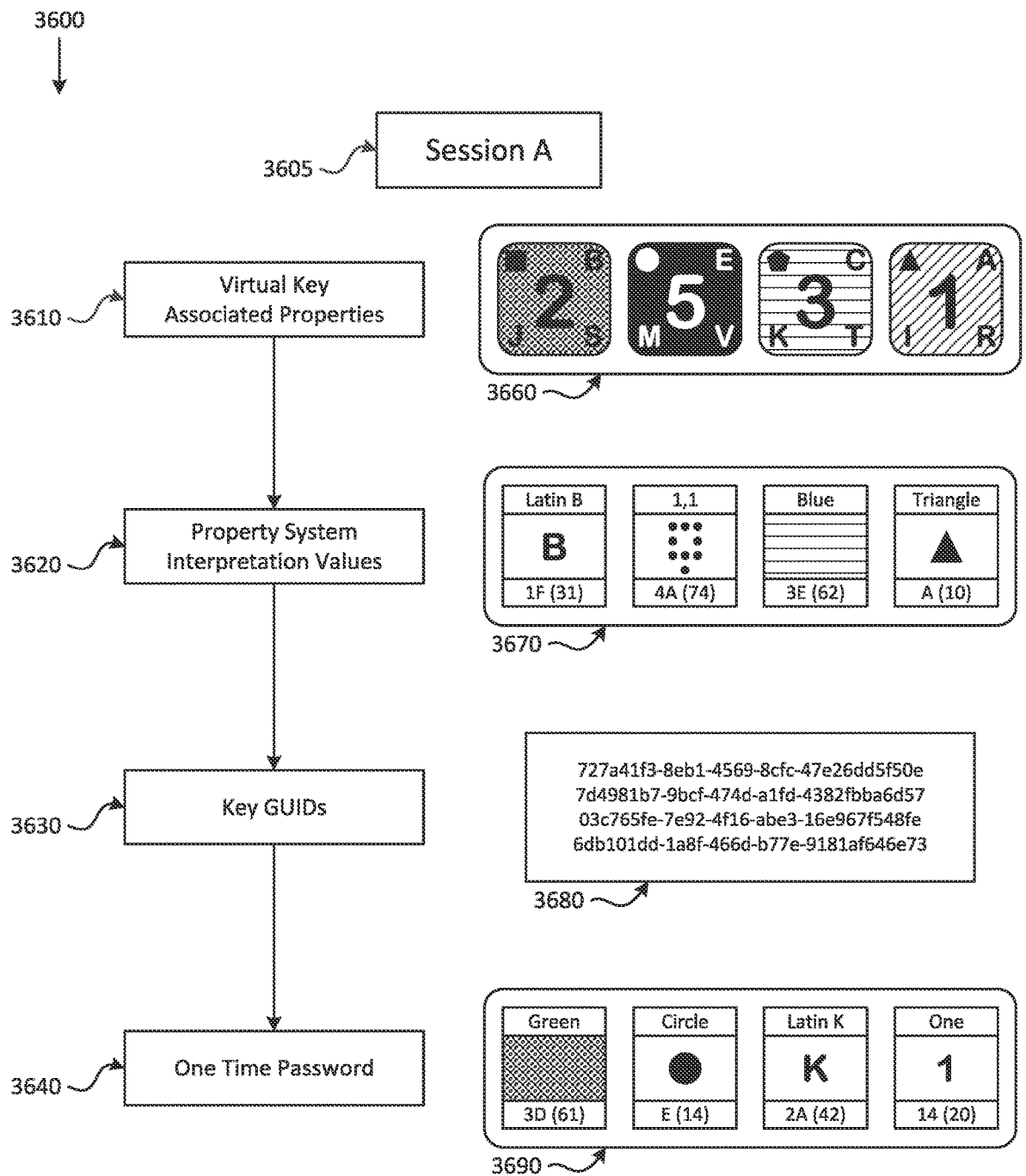
FIG. 36 illustrates example data for a passcode interface session.
Figure 37:
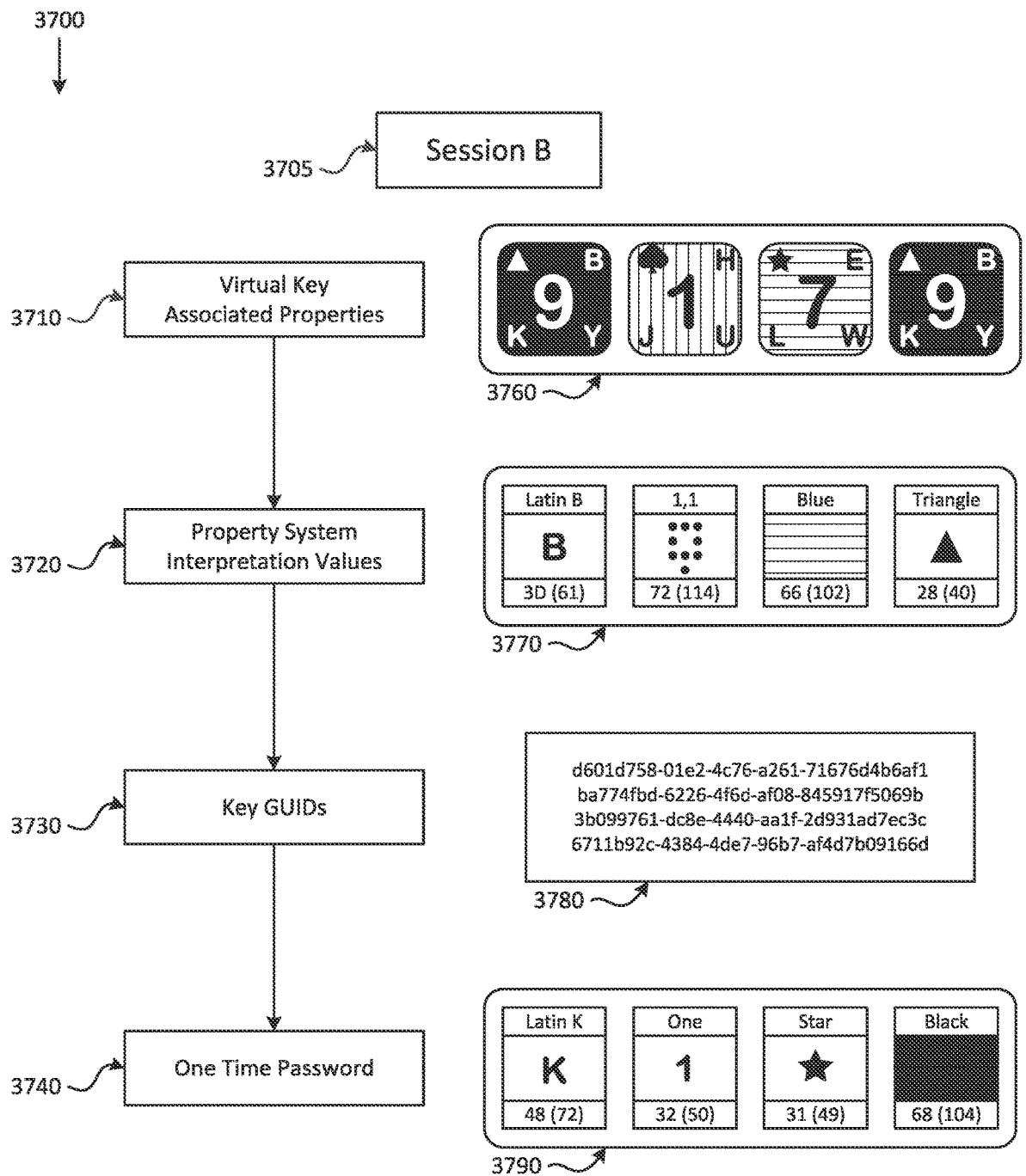
FIG. 37 illustrates example data for another passcode interface session.

The present disclosure provides multiple methods for achieving session authentication. Session A 3605 state 3600 depicted in FIG. 36 and session B 3705 state 3700 depicted in FIG. 37 present examples of some of the session authentication method capabilities of the present disclosure. Some of these examples are described in detail in the following paragraphs.

The first method is inherent in the present invention, without requiring any other features to be utilized. This method leverages the random shuffle of property association across the interface virtual keys 3610, 3710 to distinguish between sessions. Because the shuffle algorithm is generally random, it is impossible to predict future property association configurations based on the present configuration. Through the knowledge of the current associations of properties to virtual keys 3760, passcode entry by a user can be compared for session authentication by verifying that the virtual key associations of the selected keys 3660 have matching virtual key associations in the presented interface. If any of the selected virtual key property association combinations do not match a virtual key in the interface, the entry was not possible from that interface session.

A second session authentication method involves the comparison of the interpretation values 3670 of the properties associated with the selected keys against the current system interpretation values 3770 of the properties 3620, 3720. An embodiment of the present invention which implements changing property system interpretation values can use those values to verify that entries provided by users of the system also have matching interpretation values.

An embodiment assigning GUIDs for virtual key identification can achieve session authentication through a third method. Because new GUIDs 3780 are assigned to each virtual key upon each presentation of the passcode entry interface, GUIDs from previous sessions 3680 will not match those for the current session 3630, 3730.

One-time-passwords enforce session authentication automatically, by definition. During each session a new OTP 3790 is generated by which passcode entry can be compared for validation 3640, 3740 because a previous OTP 3690 will not match.

Figure 38:
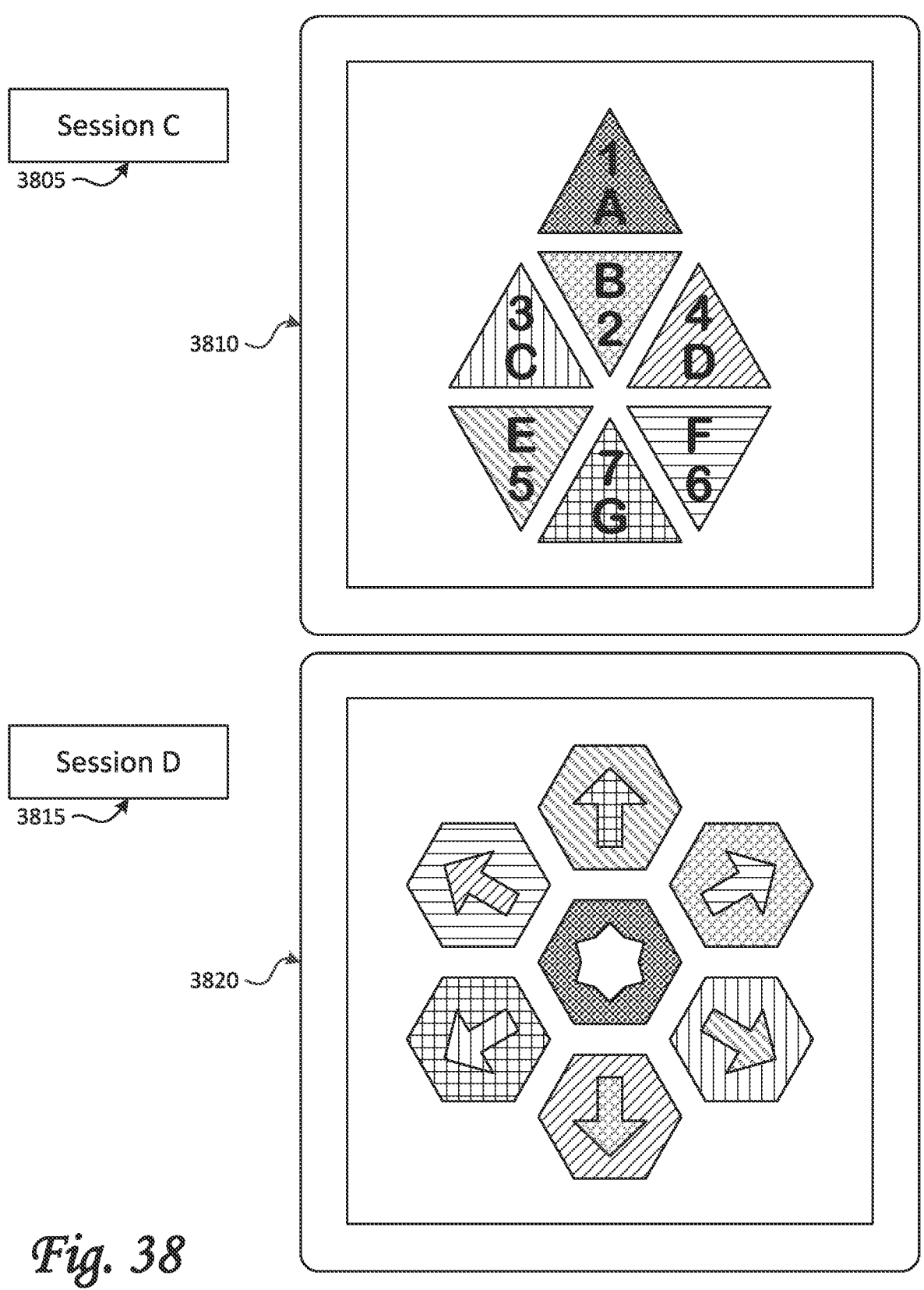
FIG. 38 illustrates a session authentication.

A more elaborate method of session authentication is depicted in FIG. 38 through the use of different interfaces. An embodiment of the present invention requiring users to enter a confirmation code, which may be sent to them during the session through standard means, would be able to enforce session authentication by utilizing several different interfaces and property sets. In such an embodiment, the confirmation code sent to the user could only be entered on the interface and property set configuration combination 3810 presented during the current session D 3805. During each new session D 3815, a different interface and/or property sets 3820 could be randomly selected and used for confirmation purposes.

All of the session authentication methods described may be used independently from one another or in any combination, depending upon the needs of each implementation.

It is normal during the course of providing an authentication system that users will occasionally need to recover their passwords or have them reset and changed. Sufficient processes and procedures have been established by which lost passwords can be managed, one of the most common being through the answering of questions by the user specifically for such a purpose. If the correct answers are provided, the user would follow the remaining procedure for either having a password delivered to them or resetting their password.

An embodiment of the present invention could allow users to enter answers to such questions through the use of an interface as described by the invention. This would provide the same level of security to the answers submitted by users of the system as exists with passcode entry itself, thereby eliminating any danger from eavesdropping, screen scraping, or other attacks utilized for fraudulent purposes. Also, users of the system would be able to incorporate properties into answers beyond alphanumeric characters only.

FIG. 26 demonstrates an embodiment providing an interface to be used for answering passcode recovery questions. The user would be presented with the designated interface 2610 as well as the required questions 2620, 2640. These questions could be predetermined by the system implementation, or previously defined through user account configuration. The user would select the input box associated with a question 2630, 2650 and use the virtual keys within the passcode entry interface to input the answer. Upon completion, the user would indicate that they are finished, and the answers would then be submitted and validated against previously provided answers.

At the time that the user establishes the correct answers to the questions, usually during account set up or maintenance, the system would also present the passcode interface for answer entry. When the baseline answers are stored, the system may also store the property patterns matching the answers. By having knowledge of the property pattern for an answer, the system will be able to determine the appropriate property to display in the input box as the answer is provided 2650, thereby allowing the user to visually ensure that the answer is being entered correctly. If the property pattern is not stored with the baseline answers, the system would either have to validate each virtual key entry as it is entered to be able to display the intended property or insert a placeholder for each virtual key entry 2650, then validate the answer as a whole after entry is complete.

In addition to knowledge-based questions and corresponding answers, other forms of password recovery can also benefit from the present invention. Some examples include recovery email address, phone number, or a previously used password. Essentially, any information known to a user which may be utilized during an account recovery process can be verified and secured.

Figure 39:
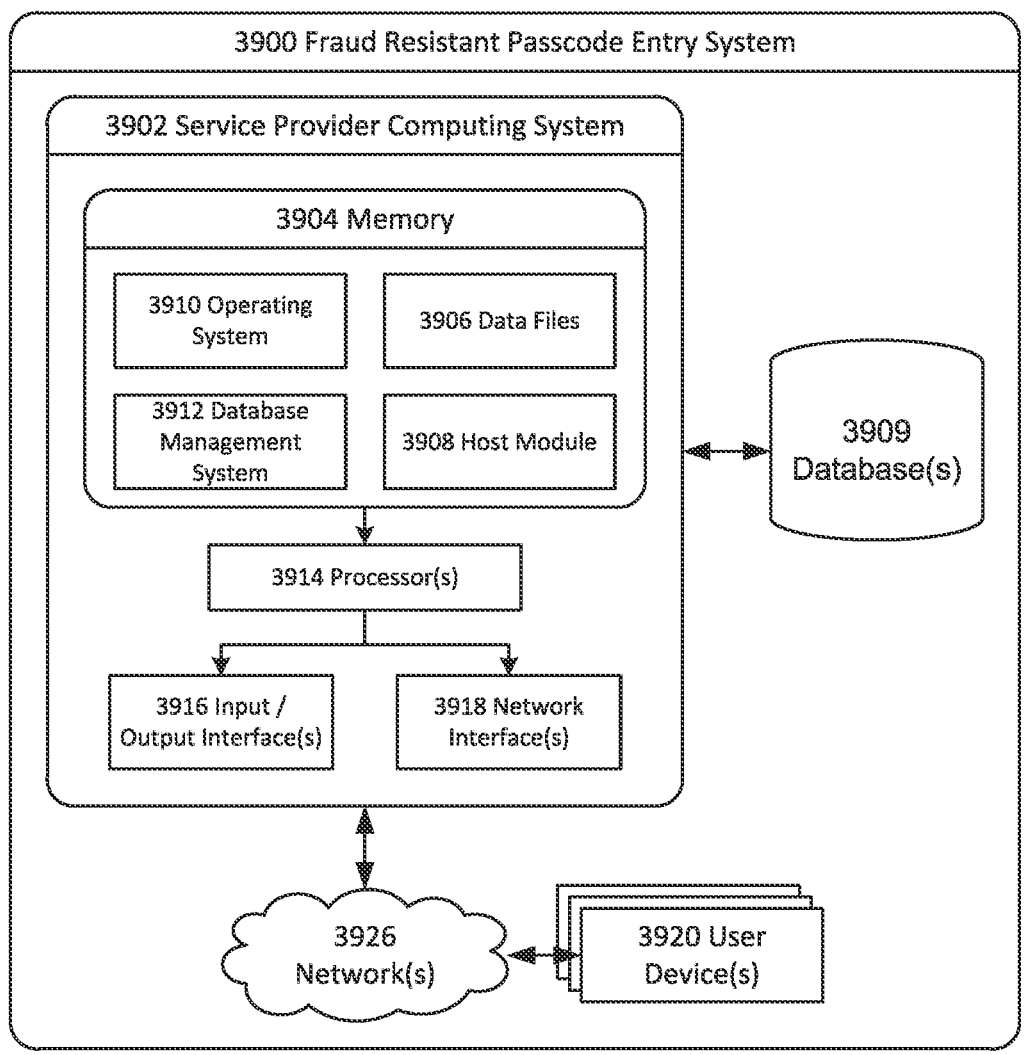
FIG. 39 is a schematic diagram of a fraud resistant passcode entry system.

As shown in FIG. 39, the above-described system 3900 can include a service provider computing system 3902, one or more user devices 3920 described above, all as described in more detail below. One or more of the components of the system 3900 can include one or more processing devices that can be configured for accessing and reading associated computer-readable media having data and/or computer-executable instructions stored thereon for implementing the various methods of the invention.

Example network devices and systems, including one or more of the service provider computing systems 3902, user devices 3920, can include, or otherwise be associated with, suitable hardware and/or software for transmitting and receiving data and/or computer-executable instructions over one or more communications links or networks 3926. These network-connected devices and systems 3902, 3920 can also include a predetermined number of processors for processing data and executing computer-executable instructions, as well as other internal and peripheral components. Further, these network devices and systems can include or be in communication with a predetermined number of suitable database(s) 3909 operable to store data and/or computer-executable instructions. The database 3909 can include a wide variety of different data in various embodiments, for example, user profiles and passwords, password-generation history and a bank of password icon options. By executing computer-executable instructions, each of the network devices can form a special purpose computer or particular machine. As used herein, the term "computer-readable medium" describes any suitable non-transitory memory or memory device.

The service provider computing system 3902 can be associated with a service provider that provides services to customers or users through password-protected portals. For purposes of this disclosure, the service provider computing system 3902 is generally referred to as a service provider. The service provider 3902 can be any suitable processor-driven device that facilitates the generation of a password-entry portal to an appropriate user device. For example, the service provider 3902 can be a computing device that includes server computers, mainframe computers, networked computers, desktop computers, personal computers, digital assistants, personal digital assistants, digital tablets, Internet appliances, application specific circuits, microcontrollers, minicomputers, ATM and/or any other processor-based device(s). The execution of the computer-implemented instructions by the service provider 3902 can form a special purpose computer or other particular machine that facilitates the password portal operation to a user. Additionally, in certain embodiments of the invention, the operations and/or control of the service provider 3902 can be distributed amongst several processing components.

In addition to one or more processor(s) 3914, the service provider 3902 can include one or more memory devices 3904, one or more input/output ("I/O") interfaces 3916, and one or more network interfaces 3918. The one or more memory devices 3904 can be any suitable memory devices for example, caches, read only memory devices, random access memory devices, magnetic storage devices, etc. The one or more memory devices 3904 can store data, executable instructions, and/or various program modules utilized by the service provider, for example, data files 3906, an operating system (OS) 3910, a database management system (DBMS) 3912, and/or host module 3908. The data files 3906 include a wide variety of different data in various embodiments, for example, user profiles and passwords, password-generation history and a bank of password icon options.

The operating system (OS) 3910 is a suitable software module that controls the service provider 3902. The OS 3910 can also facilitate the execution of other software modules by the one or more processors 3914. The OS 3910 can be, but is not limited to, Microsoft Windows®, Apple OSX™, Linux™, Unix™, or a mainframe operating system. The database management system ("DBMS") 3912 can facilitate the maintenance of information stored in the memory devices 3902 or one or more suitable databases 3909 associated with the service provider 3902. The host module 3908 can facilitate the receipt and/or processing of requests and/or other information that is received from a user via a suitable user device 3920. For example, the host module 3908 can include a web server or other dedicated program that is operable to receive requests and/or information from client modules, for example web browsers, associated with various user devices.

It is apparent to those of ordinary skill in the art that the depictions of the described embodiments are only meant to be taken as examples through which the present invention may be implemented, and not to limit the invention. Any conceivable interface configuration may be employed within the capabilities of any device that will successfully implement the present invention while maintaining its overall spirit and concept.

While the invention has been shown and described in exemplary forms, it will be apparent to those skilled in the art that many modifications, additions, and deletions can be made therein without departing from the spirit and scope of the invention as defined by the following claims.

What is claimed is:

1. A system for multi-factor authentication, the system comprising:
   a memory device; and
   a processing unit associated with the memory device, wherein the processing unit is operative to:
   receive, from a first user, a first request to authenticate the first user from a first user device;
   generate a first key interface, the first key interface comprising a first plurality of keys, each of the first plurality of keys comprising a first plurality of properties, wherein properties constituting a first user's passcode are randomly distributed on first keys of the first plurality of keys as a first property;
   generate a one time password comprising a randomly selected second property associated with each of the first keys;
   present, to the first user on the first user device, the first key interface;
   receive from the user a first selection comprising the first keys;
   compare each of the first plurality of properties associated with each of the first keys with properties included in the first user's passcode;
   determine the randomly selected second property associated with each of the first keys selected by the first user; and
   compare the one time password with the randomly selected second property associated with each of the first keys selected by the first user; and
   authenticate the first user when both each of the first plurality of properties associated with each of the first keys matches with properties included in the first user's passcode and the one time password matches with the randomly selected second property associated with each of the first keys selected by the first user.

2. The system of claim 1, wherein the randomly selected second property associated with each of the first keys for a first user session is different from a respective randomly selected second property associated with each of the first keys for a second user session.

3. The system of claim 1, wherein the randomly selected second property associated with each of the first keys for a second device is different from a respective randomly selected second property associated with each of the first keys for the first device.

4. The system of claim 1, wherein the one time password is randomly generated using a combination of the randomly selected second property associated with each of the first keys.

5. The system of claim 1, wherein the first interface for the first user is different from a second interface for a second user.

6. The system of claim 1, wherein the first interface for a first user session is different from a second interface for a second user session.

7. The system of claim 1, wherein the first plurality of properties comprise at least one of the following: numbers, characters, symbols, colors, patterns, sounds, textures, topology, images, animations, topography, haptic feedback, location, orientation, or relative position with respect to the interface.

8. A method for multi-factor authentication, the method comprising:
- receiving, from a first user, a first request to authenticate the first user from a first user device;
- generating a first key interface, the first key interface comprising a first plurality of keys, each of the first plurality of keys comprising a first plurality of properties, wherein properties constituting a first user's passcode are randomly distributed on first keys of the first plurality of keys as a first property;
- generating a one time password comprising a randomly selected second property associated with each of the first keys;
- presenting, to the first user on the first user device, the first key interface;
- receiving from the user a first selection comprising the first keys;
- comparing each of the first plurality of properties associated with each of the first keys with properties included in the first user's passcode;
- determining the randomly selected second property associated with each of the first keys selected by the first user; and
- comparing the one time password with the randomly selected second property associated with each of the first keys selected by the first user; and
- authenticating the first user when both each of the first plurality of properties associated with each of the first keys matches with properties included in the first user's passcode and the one time password matches with the randomly selected second property associated with each of the first keys selected by the first user.

9. The method of claim 8, wherein the randomly selected second property associated with each of the first keys for a first user session is different from a respective randomly selected second property associated with each of the first keys for a second user session.

10. The method of claim 8, wherein the randomly selected second property associated with each of the first keys for a second device is different from a respective randomly selected second property associated with each of the first keys for the first device.

11. The method of claim 8, wherein the one time password is randomly generated using a combination of the randomly selected second property associated with each of the first keys.

12. The method of claim 8, wherein the first interface for the first user is different from a second interface for a second user.

13. The method of claim 8, wherein the first interface for a first user session is different from a second interface for a second user session.

14. The method of claim 8, wherein the first plurality of properties comprise at least one of the following: numbers, characters, symbols, colors, patterns, sounds, textures, topology, images, animations, topography, haptic feedback, location, orientation, or relative position with respect to the interface.

15. A non-transitory computer-readable storage medium that stores a set of instructions which when executed perform a method executed by the set of instructions comprising:
- receiving, from a first user, a first request to authenticate the first user from a first user device;
- generating a first key interface, the first key interface comprising a first plurality of keys, each of the first plurality of keys comprising a first plurality of properties, wherein properties constituting a first user's passcode are randomly distributed on first keys of the first plurality of keys as a first property;
- generating a one time password comprising a randomly selected second property associated with each of the first keys;
- presenting, to the first user on the first user device, the first key interface;
- receiving from the user a first selection comprising the first keys;
- comparing each of the first plurality of properties associated with each of the first keys with properties included in the first user's passcode;
- determining the randomly selected second property associated with each of the first keys selected by the first user; and
- comparing the one time password with the randomly selected second property associated with each of the first keys selected by the first user; and
- authenticating the first user when both each of the first plurality of properties associated with each of the first keys matches with properties included in the first user's passcode and the one time password matches with the randomly selected second property associated with each of the first keys selected by the first user.

16. The non-transitory computer-readable medium of claim 15, wherein the randomly selected second property associated with each of the first keys for a first user session is different from a respective randomly selected second property associated with each of the first keys for a second user session.

17. The non-transitory computer-readable medium of claim 15, wherein the randomly selected second property associated with each of the first keys for a second device is different from a respective randomly selected second property associated with each of the first keys for the first device.

18. The non-transitory computer-readable medium of claim 15, wherein the one time password is randomly generated using a combination of the randomly selected second property associated with each of the first keys.

19. The non-transitory computer-readable medium of claim 15, wherein the first interface for the first user is different from a second interface for a second user.

20. The non-transitory computer-readable medium of claim 15, wherein the first interface for a first user session is different from a second interface for a second user session.

\* \* \* \* \*